United States Patent [19]

Dickinson et al.

[11] 4,001,569
[45] Jan. 4, 1977

[54] GENERAL PURPOSE CALCULATOR HAVING SELECTIVE DATA STORAGE, DATA CONVERSION AND TIME-KEEPING CAPABILITIES

[75] Inventors: Peter D. Dickinson, Monte Sereno; Thomas E. Osborne, San Francisco; France Rode; Allen J. Baum, both of Los Altos, all of Calif.

[73] Assignee: Hewlett-Packard Company, Palo Alto, Calif.

[22] Filed: Apr. 8, 1975

[21] Appl. No.: 566,144

Related U.S. Application Data

[62] Division of Ser. No. 364,570, May 29, 1973, abandoned.

[52] U.S. Cl. .............................. 235/156; 235/155
[51] Int. Cl.$^2$ .......................................... G06F 5/02
[58] Field of Search ......................... 235/155, 156

[56] References Cited

UNITED STATES PATENTS

| | | | |
|---|---|---|---|
| 3,700,872 | 10/1972 | May | 235/155 |
| 3,801,803 | 4/1974 | McDaniel | 235/155 X |
| 3,816,731 | 6/1974 | Jennings et al. | 235/156 |
| 3,855,459 | 12/1974 | Hakata | 235/154 |

Primary Examiner—David H. Malzahn
Attorney, Agent, or Firm—F. D. La Riviere

[57] ABSTRACT

A battery powered hand-held calculator is disclosed which includes a built-in metric to U.S. conversion function for converting units from one system to the other; a degrees-minutes-seconds conversion function for converting angles or units of time from degrees-minutes-seconds to the decimal system and conversely.

10 Claims, 37 Drawing Figures

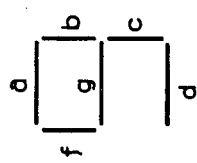
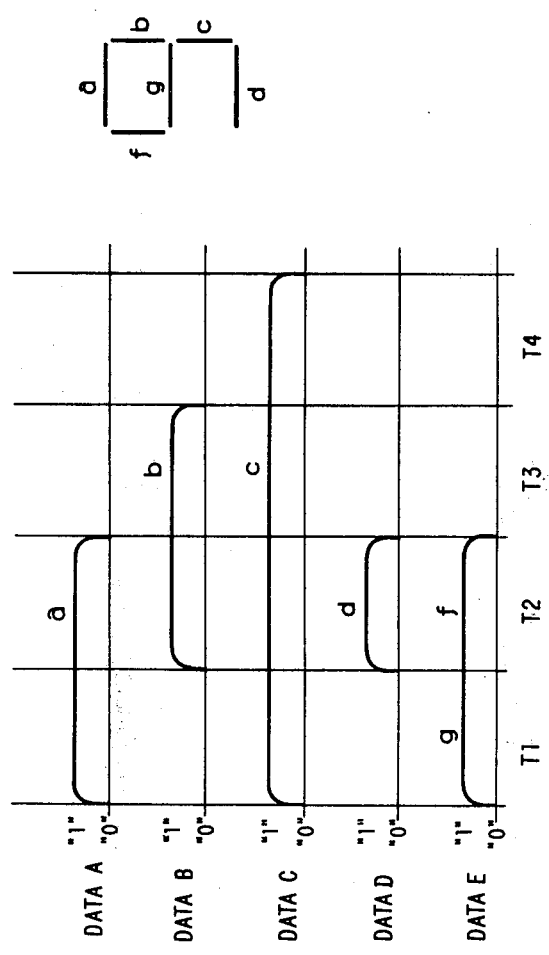
FIG.13

Timing for Decimal Point Drive

Keyboard Force-Deflection Curve

CALCULATOR PARAMETERS

L = 130 μh
$R_L$ = 4 Ω
RaSAT = 1 Ω
Rd = 1 Ω
RcSAT = 1 Ω
Vd = 1.7 Volts
Va SAT = .3 Volts
Vc SAT = .45 Volts Inductor Current And LED Anode Voltages

POSSIBLE TRANSFER PATHS BETWEEN ROMS

NOTE: ALL LOOPS CONTAIN NUMBER OF PROGRAM STEPS

GENERAL PURPOSE CALCULATOR HAVING SELECTIVE DATA STORAGE, DATA CONVERSION AND TIME-KEEPING CAPABILITIES

CROSS-REFERENCE TO RELATED APPLICATION

This application is a division of U.S. pat. application, Ser. No. 364,570 entitled "Improved Scientific Calculator" filed by Peter D. Dickinson, et al. on May 29, 1973 now abandoned in favor of continuation application Ser. No. 566,143 entitled "General Purpose Calculator Having Selective Data Storage, Data Conversion and Time-Keeping Capabilities" filed by Peter D. Dickinson et al. on Apr. 8, 1975.

BACKGROUND AND SUMMARY OF THE INVENTION

This invention relates generally to calculators and improvements therein and more particularly to non-programmable scientific calculators. While many prior art calculators can perform some complex calculations involving more than one mathematical function or operation several even redundant keystrokes are usually required. The preferred embodiment of the present invention is capable of performing mathematical operations necessary to convert from one unit of measure to another with a minimum of keystokes and without the user having to look up the appropriate factor to enter into the calculator to perform the conversion.

A calculator having the features of the preferred embodiment of the present invention incorporates easily accessible conversion factors to convert measurements in inches to centimeters, in gallons to liters and in pounds to kilograms. In addition, the calculator incorporates a conversion function for converting degrees-minutes-seconds (D MS) to decimal degrees, radians or grads. These conversions and their converse accurate to ten digits are initiated by actuation of only three keys on the keyboard and without having to enter the appropriate conversion factors via the keyboard. To preserve readout accuracy when converting from decimal degrees to D MS units the calculator automatically displays the answer in fixed point notation with four digits after the decimal point ("fixed-4" notation) regardless of the display format entered or otherwise specified by the user.

DESCRIPTION OF THE DRAWINGS

FIG. 13 is a waveform diagram illustrating the actual signals on the display decoder outputs A–E of FIGS. 2, 10, and 11 when the digit 9 is decoded.

DESCRIPTION OF THE PREFERRED EMBODIMENT

System Architecture

Figure 1:
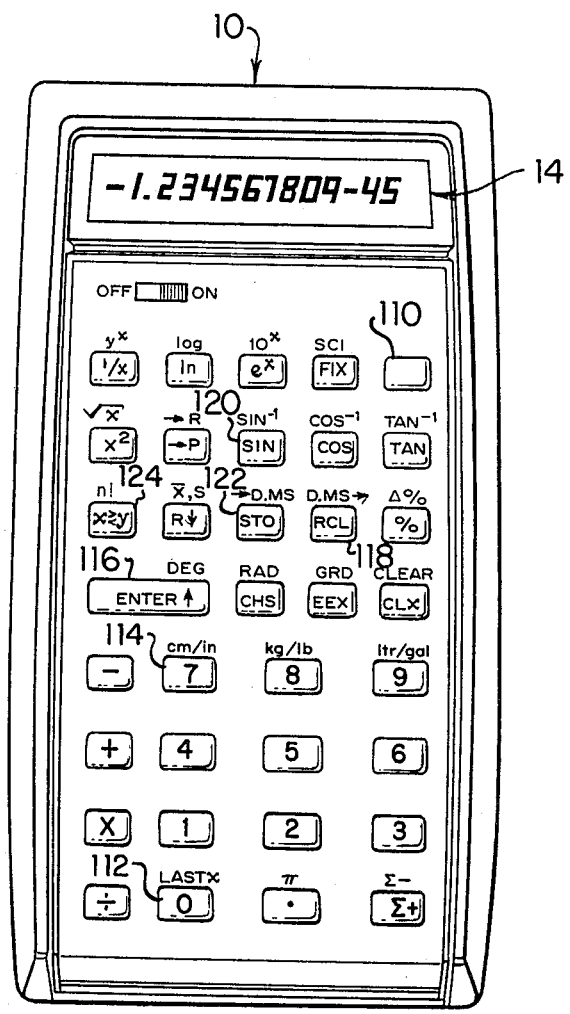
FIG. 1 is a top view of a scientific calculator according to the preferred embodiment of the invention.
Figure 2:
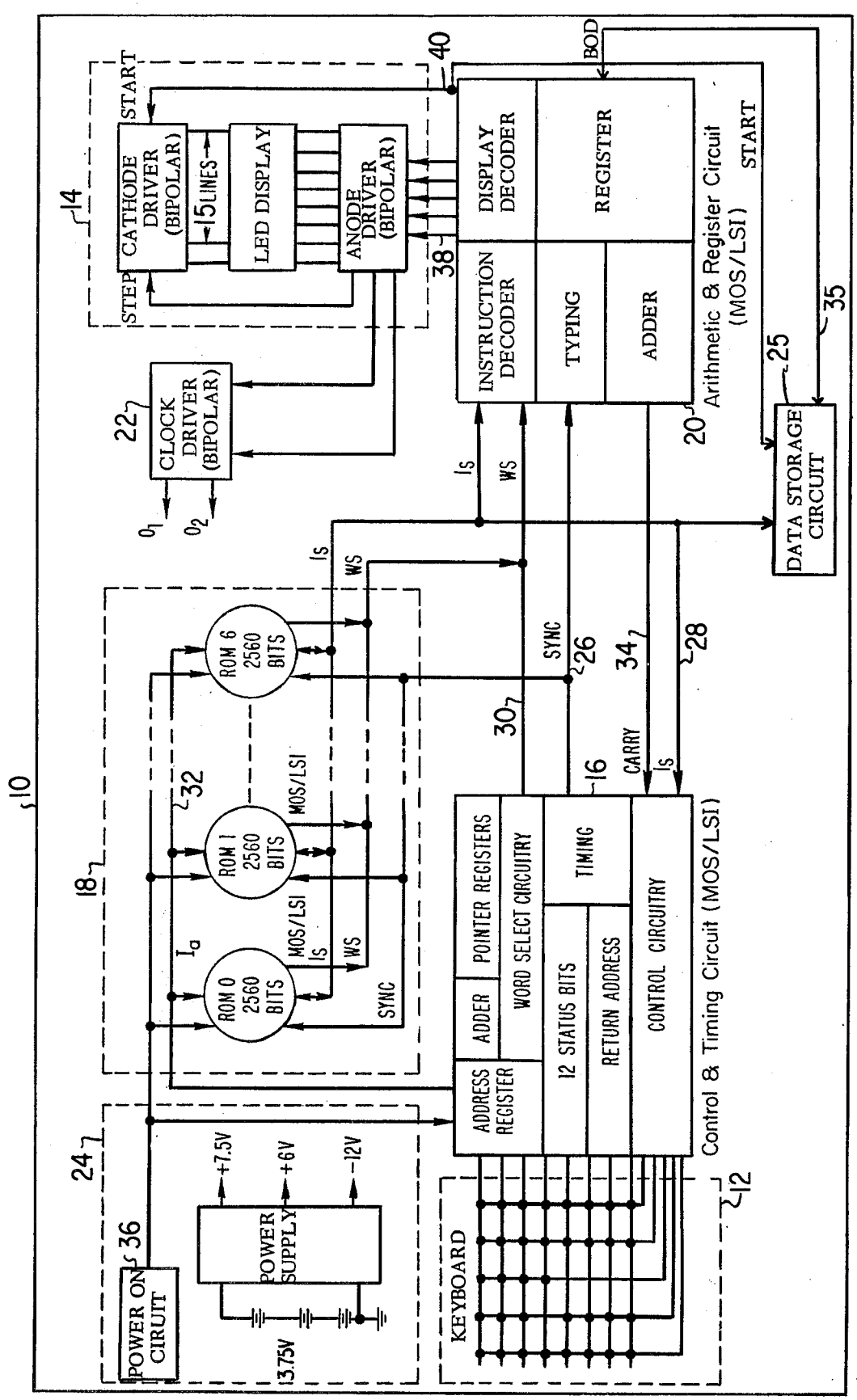
FIG. 2 is a block diagram of the calculator of FIG. 1.

Referring to FIGS. 1 and 2, there is shown a pocket-size electronic calculator 10 including a keyboard input unit 12 for entering data and instructions into the calculator and a seven-segment LED output display unit 14 for displaying each data entry and the results of calculations performed by the calculator. As shown in FIG. 2, calculator 10 also includes an MOS control and timing circuit 16, an MOS read-only memory circuit 18 (including ROM's 0–7), an MOS arithmetic and register circuit 20, a bipolar clock driver 22, a solid state power supply unit 24, and an MOS auxiliary data storage circuit 25.

The four MOS circuits are two-phase dynamic MOS/LSI circuits with low thresholds allowing compatibility with TTL bipolar circuits and allowing extremely low-power operation (less than 100 milliwatts for all three circuits). They are organized to process 14-digit BCD words in a digit-serial, bit-serial manner. The maximum bit rate or clock frequency is 200 kilohertz, which gives a word time of 280 microseconds (permitting a floating point addition to be completed in 60 milliseconds).

Figure 3:
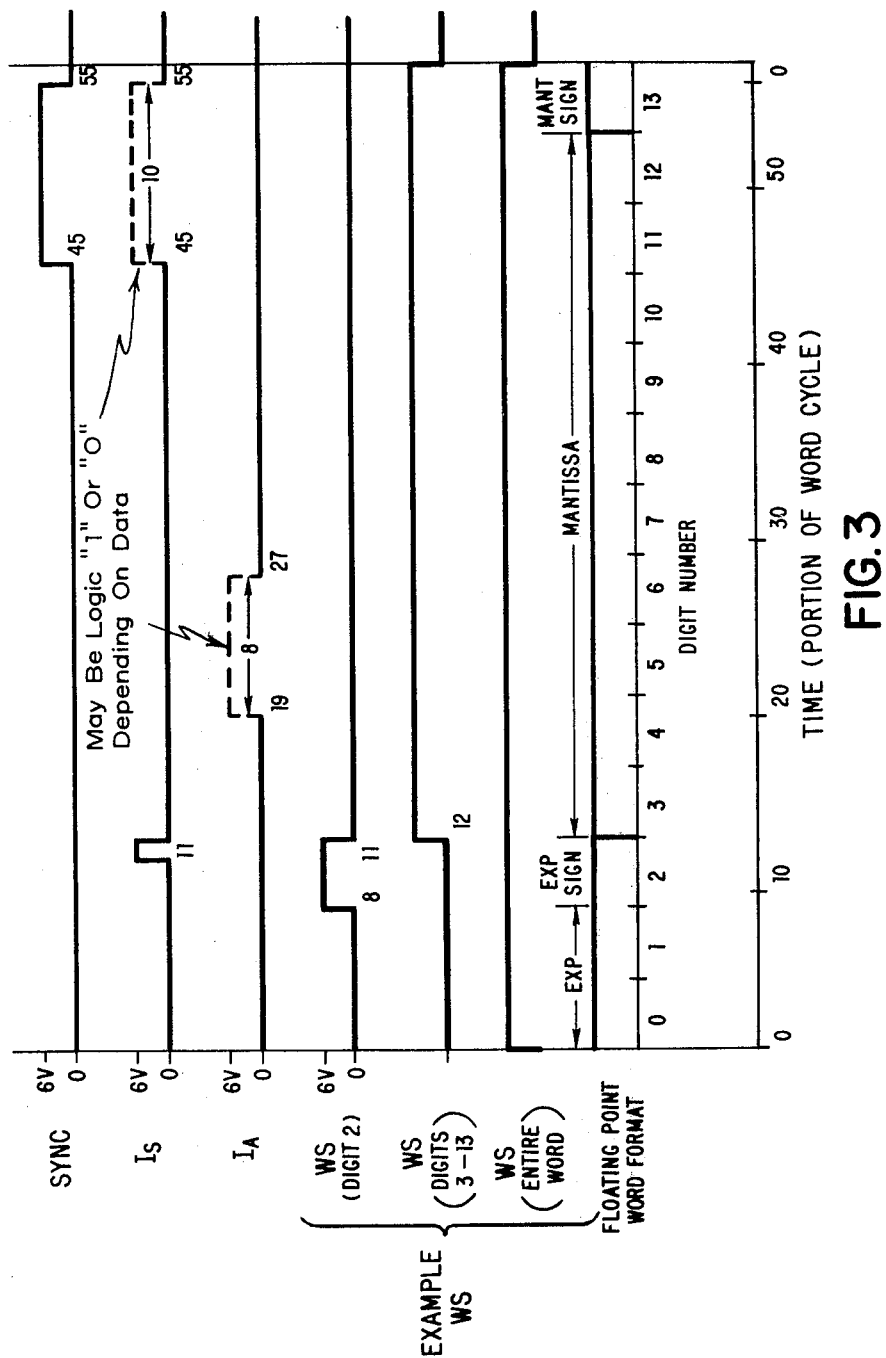
FIG. 3 is a waveform diagram illustrating the timing sequence of the interconnecting busses and lines of FIG. 2.

Control and timing circuit 16, read-only memory circuit 18, arithmetic and register circuit 20, and auxiliary data storage circuit 25 are tied together by a synchronization (SYNC) buss 26, an instruction ($I_s$) buss 28, a word select (WS) buss 30, an instruction address ($I_a$) line 32, and a carry line 34. All operations occur on a 56 bit ($b_0$–$b_{55}$) word cycle (fourteen four-bit BCD digits). The timing sequence for the interconnecting busses and lines 26-34 is shown in FIG. 3.

The SYNC buss 26 carries synchronization signals from control and timing circuit 16 to ROM's 0–7 in read-only memory circuit 18 and to arithmetic and register circuit 20 to synchronize the calculator system. It provides one output each word time. This output also functions as a 10-bit wide window ($b_{45}$–$b_{54}$) during which $I_s$ buss 28 is active.

The $I_s$ buss 28 carries 10-bit instructions from the active ROM in the read-only memory circuit 18 to the other ROM's, control and timing circuit 16, arithmetic and register circuit 20, and auxiliary data storage circuit 25, each of which decodes the instructions locally and responds to or acts upon them if they pertain thereto and ignores them if they do not. For instance, the ADD instruction affects arithmetic and register circuit 20 but is ignored by control and timing circuit 16. Similarly, the SET STATUS BIT 5 instruction sets status flip-flop 5 in control and timing circuit 16 but is ignored by arithmetic and register circuit 20.

The actual implementation of an instruction is delayed one word time from its receipt. For example, an instruction may require the addition of digit 2 in two of the registers in arithmetic and register circuit 20. The ADD instruction would be received by arithmetic and register circuit 20 during bit times $b_{45}$–$b_{54}$ of word time N and the addition would actually occur during bit times $b_8$ – $b_{11}$ of word time N + 1. Thus, while one instruction is being executed the next instruction is being fetched.

The WS buss 30 carries an enable signal from control and timing circuit 16 or one of the ROM's in read-only memory circuit 18 to arithmetic and register circuit 20 to enable the instruction being executed thereby. Thus, in the example of the previous paragraph, addition occurs only during digit 2 since the adder in the arithmetic and register circuit 20 is enabled by WS buss 30 only during this portion of the word. When WS buss 30 is low, the contents of the registers in arithmetic and register circuit 20 are recirculated unchanged. Three examples of WS timing signals are shown in FIG. 3. In the first example, digit 2 is selected out of the entire word. In the second example, the last 11 digits are selected. This corresponds to the mantissa portion of a floating point word format. In the third example, the entire word is selected. Use of the word select feature allows selective addition, transfer, shifting or comparison of portions of the registers within arithmetic and register circuit 20 with only one basic ADD, TRANSFER, SHIFT, or COMPARE instruction. Some customization in the ROM word select fields is available via masking options.

The $I_a$ line 32 serially carries the addresses of the instructions to be read from ROM's 0–7. These addresses originate from control and timing circuit 16, which contains an instruction address register that is incremented each word time unless a JUMP SUBROUTINE or a BRANCH instruction is being executed. Each address is transferred to ROM's 0–7 during bit times $b_{19}$–$b_{26}$ and is stored in an address register of each ROM. However, only one ROM is active at a time, and only the active ROM responds to an address by outputting an instruction on the $I_s$ line 28. Control is transferred between ROM's by a ROM SELECT instruction. This technique allows a single eight-bit address, plus eight special instructions, to address up to eight ROM's of 256 words each.

The carry line 34 transmits the status of the carry output of the adder in arithmetic and register circuit 20 to control and timing circuit 16. The control and timing circuit uses this information to make conditional branches, dependent upon the numerical value of the contents of the registers in arithmetic and register circuit 20.

A BCD input/output line 35 interconnects the auxiliary data storage circuit 25 and the C register of arithmetic and register circuit 20. This line always outputs the contents of the C register of arithmetic and register circuit 20 unless a specific instruction to input to the C register of the arithmetic and register circuit is being executed.

Control and timing circuit 16 is organized to scan a five-by-eight matrix of switches in search of an interconnection that designates actuation of a key. Any type of metal-to-metal contact may be used as a key. Bounce problems are overcome by programmed lockouts in the key entry routine. Each key has an associated six-bit code.

A power on circuit 36 in power supply unit 24 supplies a signal forcing the calculator to start up in a known condition when power is supplied thereto. Power is supplied to the calculator when the on-off switch of keyboard input unit 12 (see FIG. 1) is moved to the on position.

The primary outputs of the calculator are five output lines 38 connected between a display decoder of arithmetic and register circuit 20 and an anode driver of output display unit 14. Data for a seven-segment display plus a decimal point is time-multiplexed onto these five output lines. A start line 40 is connected from the display decoder of arithmetic and register circuit 20 to the auxiliary data storage circuit 25 and a cathode driver of output display unit 14 and indicates when the digit 0 occurs.

Control and Timing Circuit

Figure 4:
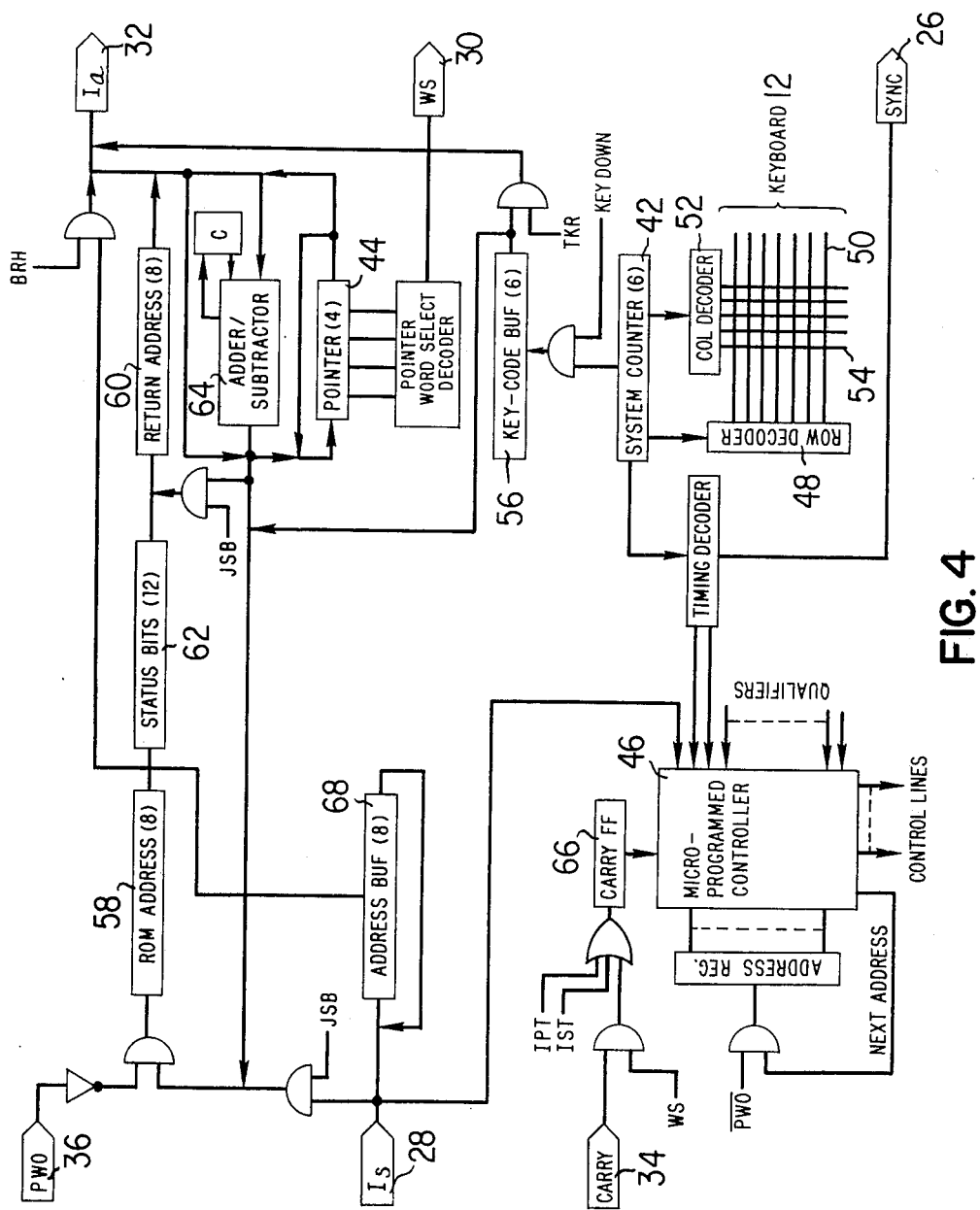
FIG. 4 is a block diagram of the control and timing circuit of FIG. 2.

Referring now to FIG. 4, control and timing circuit 16 contains the master system counter 42, scans the keyboard 12, retains status information about the system or the condition of an algorithm, and generates the next ROM address. It also originates the subclass of Word Select signals which involve the pointer 44, a four-bit counter that points to one of the register digit positions.

The control unit of control and timing circuit 16 is a microprogrammed controller 46 comprising a 58 word 25 bits per word) control ROM, which receives qualifier or status conditions from throughout the calculator and sequentially outputs signals to control the flow of data. Each bit in this control ROM either corresponds to a signal control line or is part of a group of N bits encoded into $2^N$ mutually exclusive control lines and decoded external to the control ROM. At each phase 2 clock, a word is read from the control ROM as determined by its present address. Part of the output is fed back to become the next address.

Several types of qualifiers are checked. Since most commands are issued only at certain bit times during the word cycle, timing qualifiers are necessary. This means the control ROM may sit in a wait loop until the appropriate timing qualifier comes true, then move to the next address to issue a command. Other qualifiers are the state of the pointer register, the PWO (power on) line, the CARRY flip flop, and the state of each of the 12 status bits.

Since the calculator is a serial system based on a 56 bit word, a six-bit system counter 42 is employed for counting to 56. Several decoders from system counter 42 are necessary. The SYNC signal is generated during bit times $b_{45}-B_{54}$ and transmitted to all circiuts in the system (see FIG. 3). Other timing qualifiers are sent to the microprogrammed control ROM 46 as mentioned in the previous paragraph.

Figure 5:
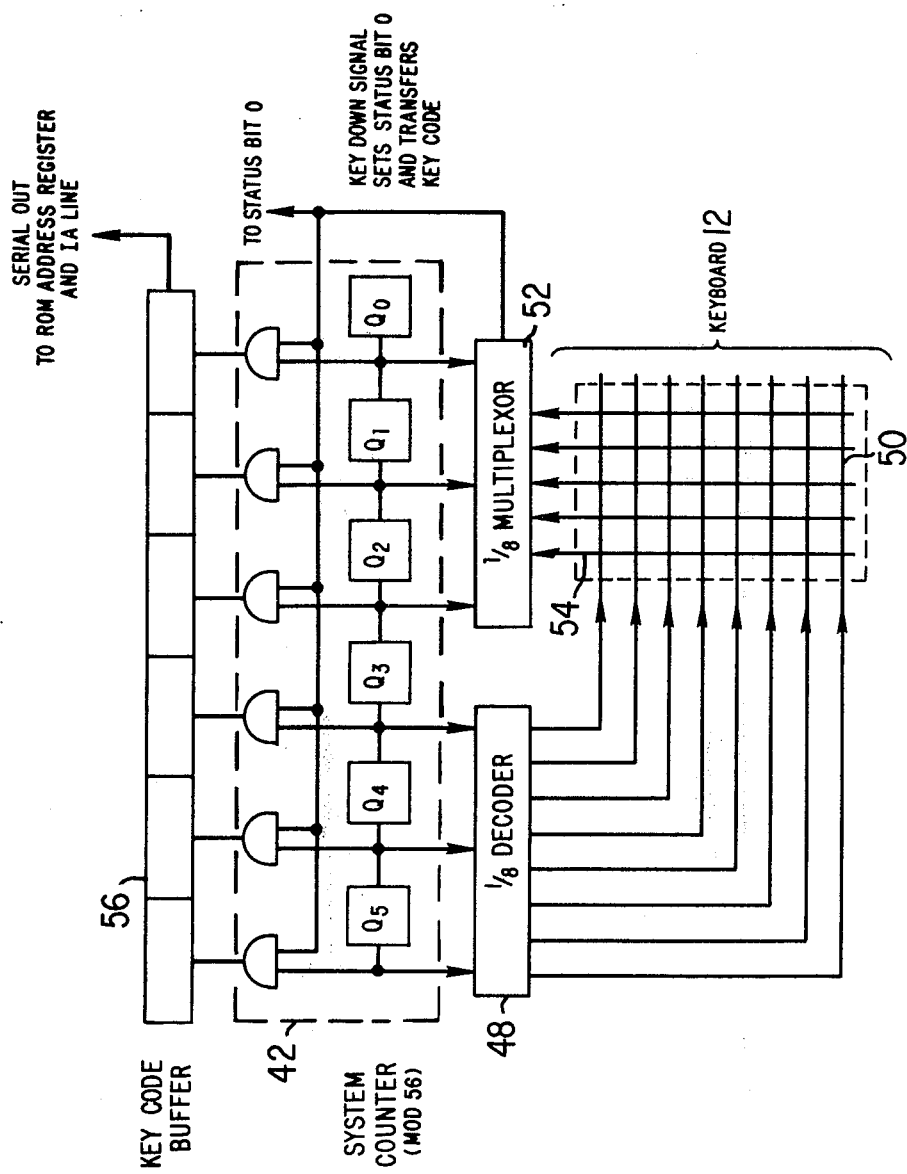
FIG. 5 is a more detailed block diagram of the keyboard scanning circuitry of FIG. 4.

System counter 42 is also employed as a keyboard scanner as shown in FIG. 5. The most significant three bits of system counter 42 go to a one-of-eight decoder 48, which sequentially selects one of the keyboard row lines 50. The least significant three bits of the system counter count modulo seven and go to a one-of-eight multiplexor 52, which sequentially selects one of the keyboard column lines 54 (during 16 clock times no key is scanned). The multiplexor output is called the key down signal. If a contact is made at any intersection point in the five-by-eight matrix (by depressing a key), the key down signal will become high for one state of system counter 42 (i.e., when the appropriate row and column lines are selected). The key down signal will cause that state of the system counter to be saved in key code buffer 56. This six-bit code is then transferred to the ROM address register 58 and becomes a starting address for the program which services the key that was down (two leading 0 bits are added by hardware so an eight-bit address exists). Thus, during each state of system counter 42, the decoder-multiplexor combination 48 and 52 is looking to see if a specific key is down. If it is, the state of the system counter becomes a starting address for execution of that key function (noted that 16 of the 56 states are not used for key codes). By sharing the function of the system counter and using a keyboard scanning technique directly interfaced to the MOS circuitry, circuit complexity is reduced significantly.

A 28 bit shift register which circulates twice each 56 bit word time, is employed in control and timing circuit 16. These 28 bits are divided into three functional groups: the main ROM address register 58 (eight bits), the subroutine return address register 60 (eight bits), and the status register 62 (12 bits).

THe main ROM's 0–7 each contain 256 (10 bit) words, thereby requiring an eight-bit address. This address circulates through a serial adder/subtractor 64 and is incremented during bit times $b_{47}-b_{54}$ (except in the case of branch and jump-subroutine instructions for which the eight bit address field of the ten-bit instruction is substituted for the current address). The next address is transmitted over the $I_a$ line 32 to each of the main ROM's 0–7 during bit times $b_{19}-b_{26}$.

The Status register 62 contains 12 bits or flags which are used to keep track of the state of the calculator. Such information as whether the decimal point has been hit, the minus sign set, etc. must be retained in the status bits. In each case the calculator remembers past events by setting as appropiate status bit and asking later if it is set. A yes answer to a status interrogation will set the carry flip-flop 66 as indicated by control signal IST in FIG. 4. Any status bit can be set, reset, or interrogated while circulating through the adder 64 in response to the appropriate instruction.

The instruction set allows one level of subroutine call. The return address is stored in the eight-bit return address register 60. Execution of a JUMP subroutine stores the incremented present address into return address register 60. Execution of the RETURN instruction retrieves this address for transmission over $I_a$ line 32. Gating is employed to interrupt the 28 bits circulating in the shift register 58–62 for insertion of addresses at the proper time as indicated by the JSB control signal in FIG. 4.

An important feature of the calculator system is the capability of select and operate upon a single digit or a group of digits (such as the exponent field) from the 14 digit registers. This feature is implemented through the use of a four-bit pointer 44 which points at the digit of interest. Instructions are available to set, increment, decrement, and interrogate pointer 44. The pointer is incremented or decremented by the same serial adder/subtracter 64 used for addresses. A yes answer to the instruction "is pointer $\neq$ N" will set carry flip-flop 66 via control signal IPT in FIG. 4.

The word select feature was discussed above in connection with FIGS. 2 and 3. Some of the word select signals are generated in control and timing circuit 16, namely those dependent on pointer 44, and the remainder in the main ROM's 0–7. The pointer word select options are (1) pointer position only and (2) pointer position and all less significant digits. For instance, assume the mantissa signs of the numbers in the A and C registers of arithmetic and register circuit 20 were to be exchanged. The pointer would be set to position 13 (last position) and the A EXCHANGE C instruction with a "pointer position" word select field would be given. If all of the word except the mantissa signs were to be exchanged, the A EXCHANGE C instruction would be given with the pointer set and 12 and the word select field set to pointer and less significant digits. The control and timing circuit word-select output 30 is or-tied with the ROM word-select output 30 and transmitted to arithmetic and register circuit 20.

Any carry signal out of the adder in arithmetic and register circuit 20, with word select, also high, will set carry flip-flop 66. This flip-flop is interrogated during the BRANCH instruction to determine if the existing address should be incremented (yes carry) or replaced by the branch address (no carry). The branch address is retained in an eight-bit address buffer 68 and gated to $I_a$ line 32 by the BRH control signal.

The power-on signal is used to synchronize and preset the starting conditions of the calcuiaor. It has two functions, one of which is to get the address of control ROM 46 set to a proper starting state and the other of which is to get the system counter 42 in control and timing circiut 16 synchronized with the counter in each main ROM 0–7. As the system power comes on, the PWO signal is held at logic 1 (0 volts in this system) for at least twenty milliseconds. This allows system counter 42 to make at least one pass through bit times $b_{45}$–$b_{54}$ when SYNC is high thereby setting main ROM 0 active and the rest of the ROM's inactive. When PWO goes to logic 0 (+6 volts), the address of control ROM 46 is set to 000000 where proper operation can begin.

READ-ONLY MEMORY CIRCUIT

Figure 6:
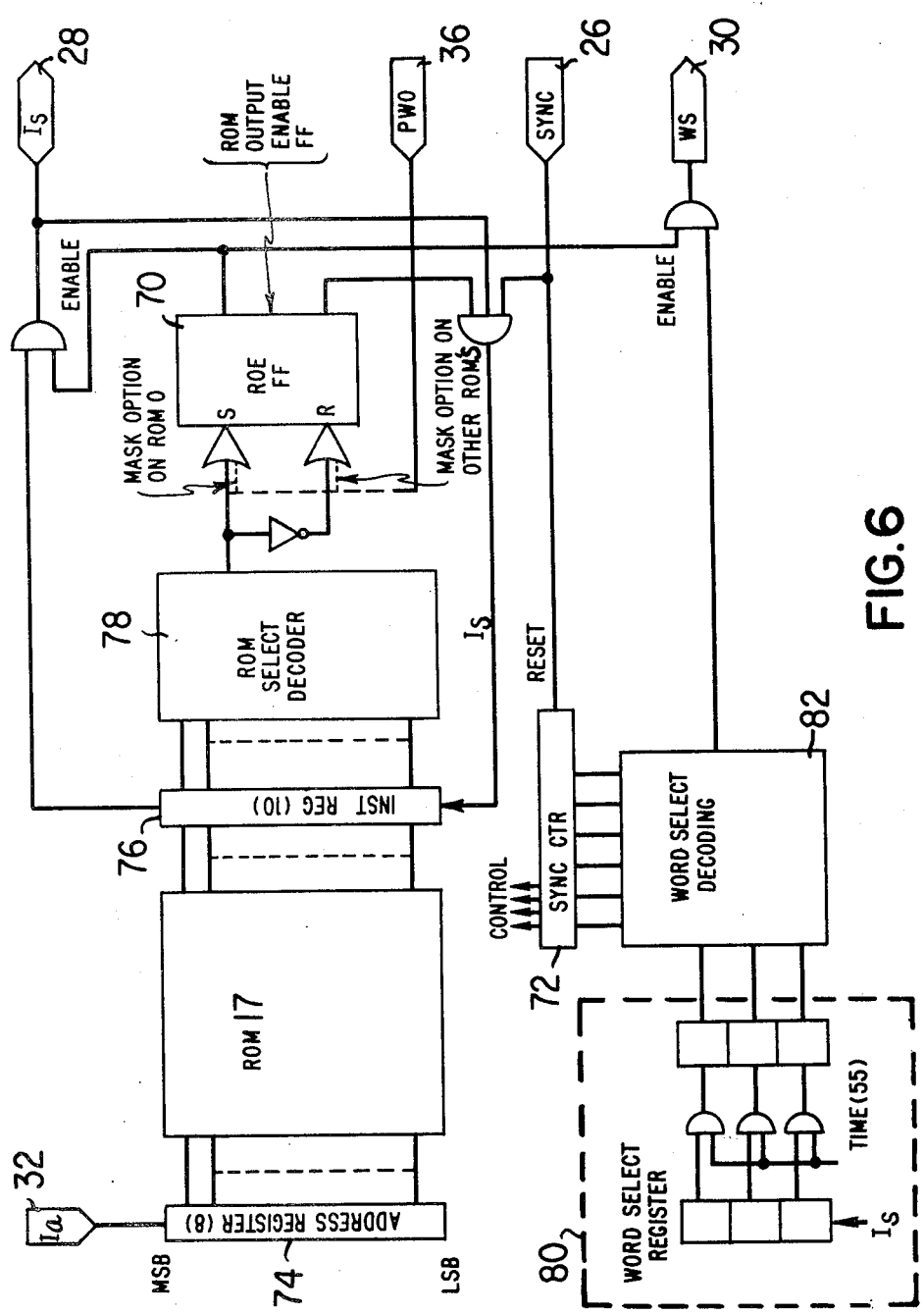
FIG. 6 is a block diagram of one of ROM's 0–7 of FIG. 2.

The ROM's 0–7 in read-only memory circiut 18 store the programs for executing the functions required of the system. Since each ROM contains 256 ten-bit words, there are 1,536 words or 15,360 bits of ROM. A block diagram of each of the ROM's 0–7 is shown in FIG. 6.

The basic operation of each ROM is a serial-address in, a serial-instruction out. During every 56 bit word time the address comes in, least significant bit first from bit $b_{19}$ through bit $b_{26}$. Every ROM 0–7 in the system receives this same eight-bit address and from bit time $b_{45}$ through $b_{54}$ tries to output onto $I_s$ line 28. However, a ROM enable (ROE) flip-flop 70 in each ROM insures that no more than one ROM actually sends an instruction on $I_s$ line 28 at the same time.

Figure 8:
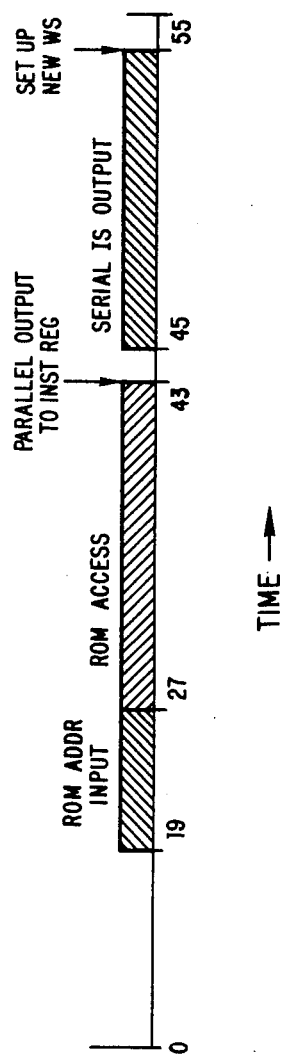
FIG. 8 is a timing diagram illustrating the important timing points for a typical addressing sequence.

All output signals are inverted so that the steady-state power dissipation is reduced. The calculator circiuts are P-channel MOS. Thus, the active signals that turn on a gate are the more negative. This is referred to as negative logic, since the more negative logic level is the logic 1. As mentioned above, logic 0 is +6 volts and logic 1 is 0 volts. The signals on $I_a$ and $I_s$ are normally at logic 0. However, when the output buffer circuits are left at logic 0 they consume more power. A decision was therefore made to invert the signals on the $I_a$ and $I_s$ outputs and re-invert the signals at all inputs. Thus, signals appear at the $I_a$ and $I_s$ outputs as positive logic. The oscilloscope pattern that would be seen for instruction 1101 110 011 from state 11 010 101 is shown in FIG. 8.

The serial nature of the calculator circiuts requires careful synchronization. This synchronization is provided by the SYNC pulse, generated in control and timing circuit 16 and lasting for bit times $b_{45}$–$b_{54}$. Each ROM has its own 56 state counter 72, synchronized to the system counter 42 in control and timing circuit 16. Decoded signals from this state counter 72 open the input to the address register 74 at bit time $b_{19}$, clock $I_s$ out at bit time $b_{45}$ and provide other timing control signals.

As the system power comes on, the PWO signal is held at 0 volts (logic 1) for at least 20 milliseconds. The PWO signal is wired (via a masking option) to set ROM Output Enable (ROE) flip-flop 70 on main ROM 0 and reset it on all other ROM's. Thus when operation begins, ROM 0 will be the only active ROM. In addition, control and timing circuit 16 inhibits the address output start-up so that the first ROM address will be zero. The first instruction must be a JUMP SUBROUTINE to get the address register 58 in control and timing circuit 16 loaded properly.

Figure 7:
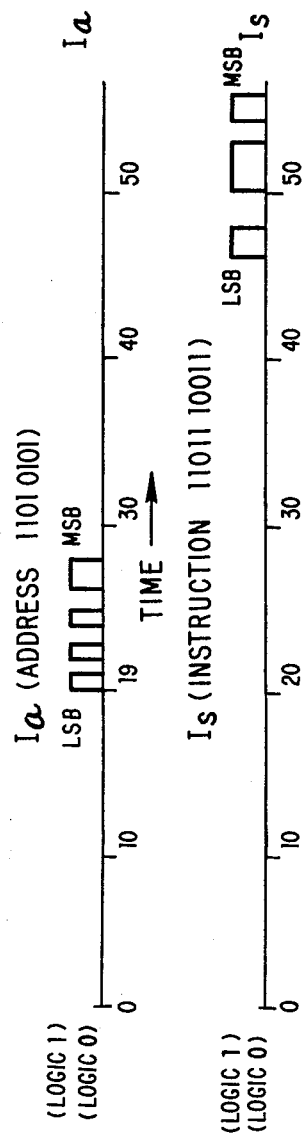
FIG. 7 is a waveform diagram illustrating a typical address signal and a typical instruction signal.

FIG. 7 shows the important timing points for a typical addressing sequence. During bit times $b_{19}$–$b_{26}$ the address is received serially from control and timing circuit 16 and loaded into address register 74 via $I_a$ line 32. This address is decoded and at bit time $b_{44}$ the selected instruction is gated in parallel into the $I_s$ register 76. During bit times $b_{45}$–$b_{54}$ the instruction is read serially onto $I_s$ buss 28 from the active ROM (i.e., the ROM with the ROM enable flip-flop set).

Control is transferred between ROM's by a ROM SELECT instruction. Effectively this instruction will turn off ROE flip-flop 70 on the active ROM and turn on ROE flip-flop 70 on the selected ROM. Implementation is dependent upon the ROE flip-flop being a master-slave flip-flop. In the active ROM, the ROM SELECT instruction is decoded by a ROM select decoder 78 at bit time 44, and the master portion of ROE flip-flop 70 is set. The slave portion of ROE flip-flop 70 is not set until the end of the word bit time ($b_{55}$). In the inactive ROM's the instruction is read serially into the $I_s$ register 76 during bit times $b_{45}$–$b_{54}$ and then decoded, and the ROE flip-flop 70 is set at bit time $b_{55}$ in the selected ROM. A masking option on the decoding from the least significant three bits of the $I_s$ register 76 allows each ROM to respond only to its own code.

The six secondary word-select signals are generated in the main ROM's 0–7. Only the two word-select signals dependent upon the POINTER come from control and timing circuit 16. The word select of the instruction is retained in the word select register 80 (also a master-slave). If the first two bits are 01, the instruction is of the arithmetic type for which the ROM must generate a word select gating signal. At bit time $b_{55}$ the next three bits are gated to the slave and retained for the next word time to be decoded into one of six signals. The synchronization counter 72 provides timing information to the word select decoder 82. the output WS signal is gated by ROE flip-flop 70 so only the active ROM can output on WS line 30, which is OR-tied with all other ROM's and also control and timing circuit 16. As discussed above, the WS signal goes to arithmetic and register circiut 20 to control the portion of a word time an instruction is active.

Figure 9:
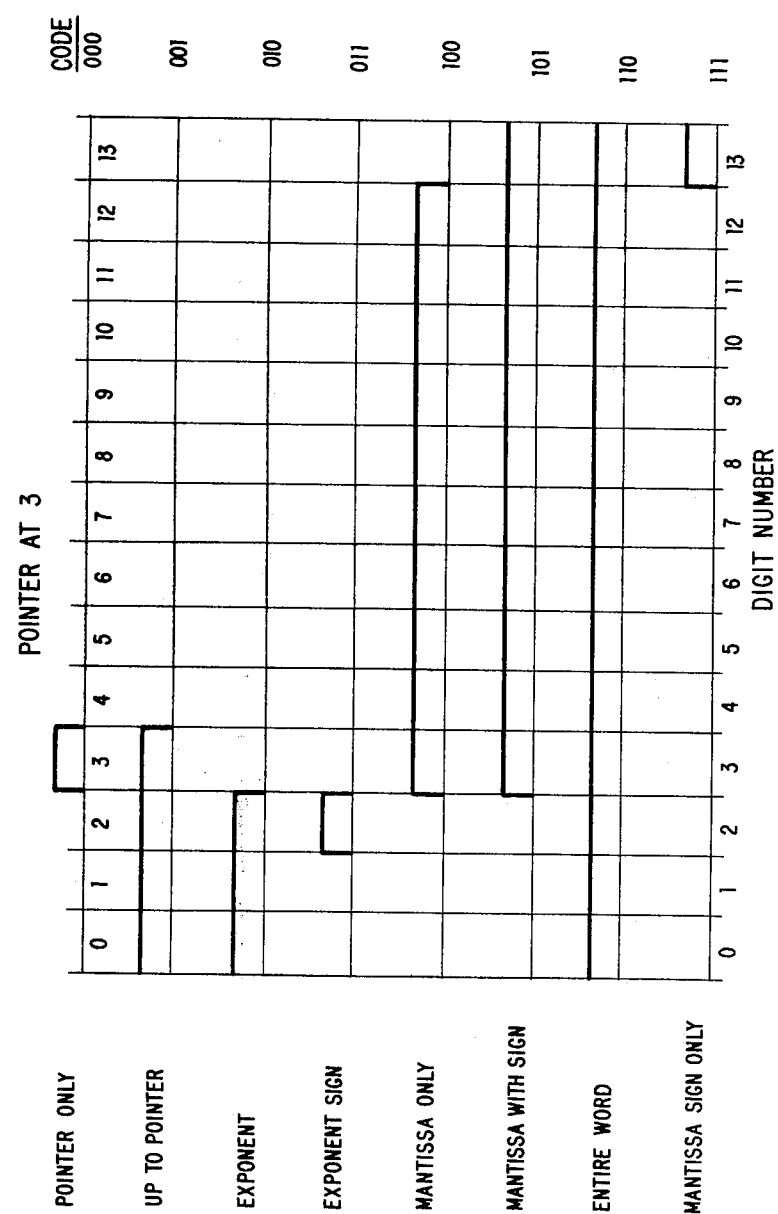
FIG. 9 is a waveform diagram illustrating the word select signals generated in the control and timing circuit of FIGS. 2 and 4 and in ROM's 0–7 of FIGS. 2 and 6.

The six ROM generated word select signals used in the calculator are shown in FIG. 9. ROM's 0–7 output a 1 bit-time pulse on $I_s$ buss 28 at bit time $b_{11}$ to denote the exponent minus sign time. This pulse is used in the display decoder of arithmetic and register circuit 20 to convert a 9 into a displayed minus sign. The time location of this pulse is a mask option on the ROM.

Arithmetic and Register Circuit

Figure 10:
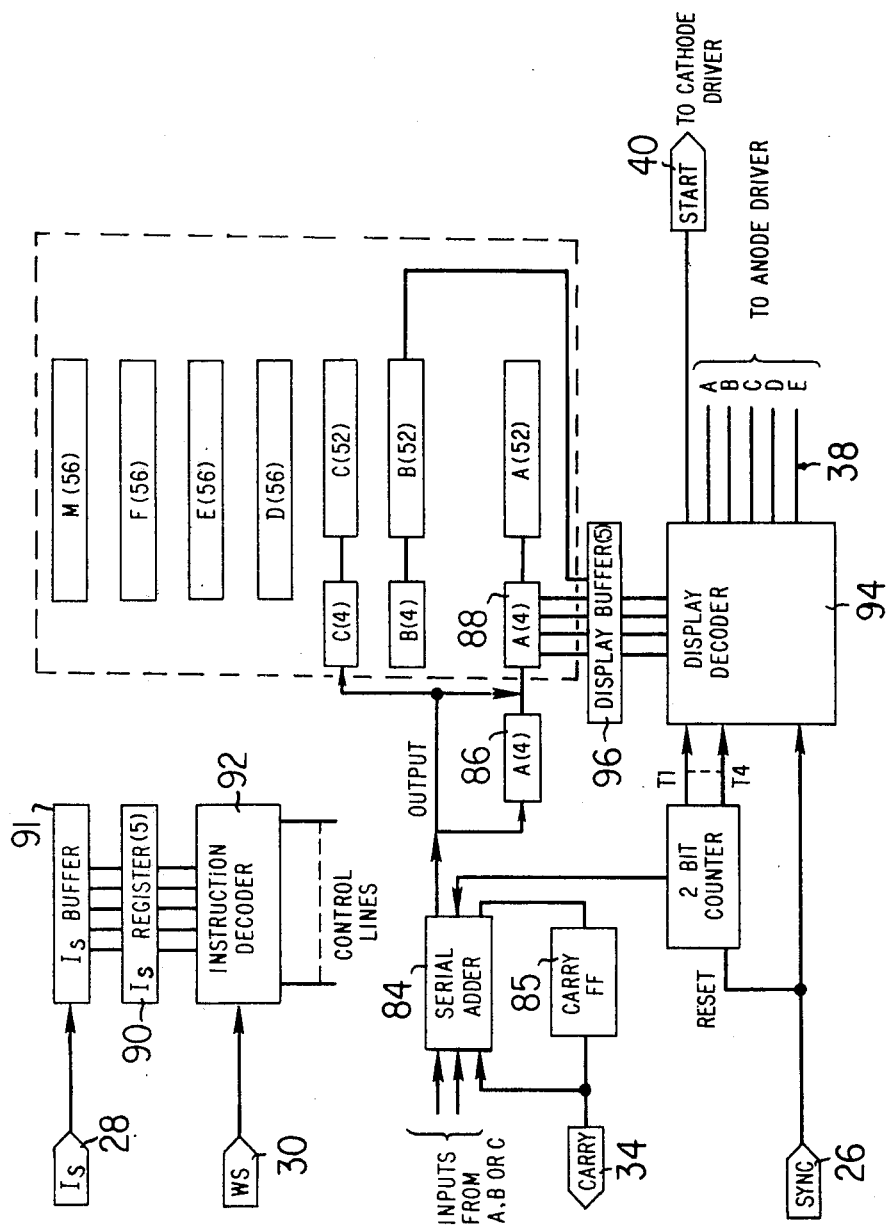
FIG. 10 is a block diagram of the arithmetic and register circuit of FIG. 2.

Arithmetic and register circuit 20 shown in FIG. 10 provides the arithmetic and data storage function for the calculator. It is controlled by WS, $I_s$, and SYNC lines 30, 28, and 26, respectively; receives instructions from ROM's 0–7 over the $I_s$ line 28; sends information back to control and timing circuit 16 via the CARRY line 34; partially decodes the display information before transmitting it via output lines 38 to the anode driver of output display unit 14; and provides a START pulse to the cathode driver of output display unit 14 to synchronize the display.

Arithmetic and register circuit 16 contains seven, fourteen-digit (56 bit) dynamic registers A–F and M and a serial BCD adder/subtractor 84. Actual data paths, not shown in FIG. 10 due to their complexity, are discussed below and shown in FIG. 11. The power and flexibility of an instruction set is determined to a great extent by the variety of data paths available. One of the advantages of a serial structure is that additional data paths are not very costly (only one additional gate per path). The structure of arithmetic and register circuit 20 is optimized for the type of algorithms required by the calculator.

Figure 11:
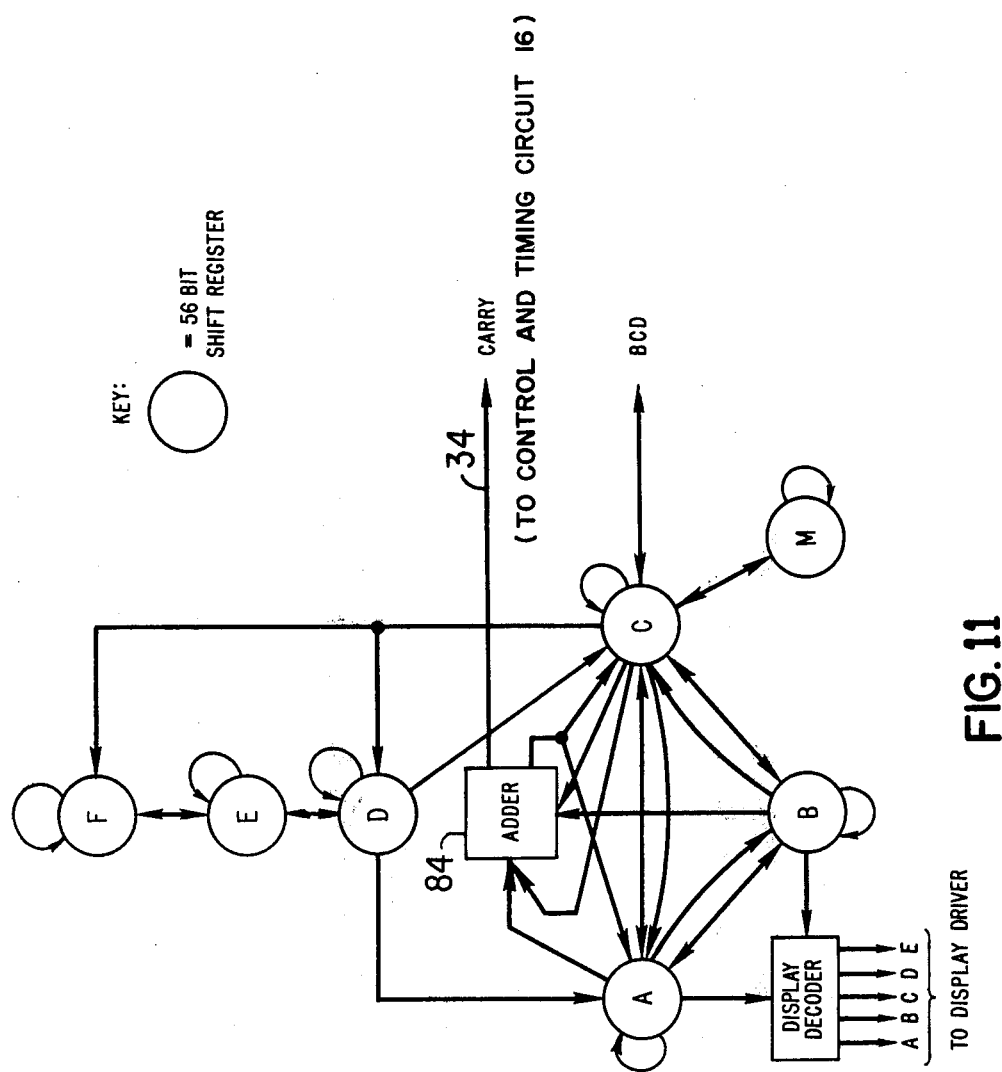
FIG. 11 is a path diagram of the actual data paths for the registers A–F and M of FIG. 10.

The seven registers A–F and M can be divided into three groups: the working registers A, B, and C with C also being the bottom register of a four-register stack; the next three registers D, E, and F in the stack; and a separate storage register M communicating with the other registers through register C only. In FIG. 11, which shows the data paths connecting all the registers A–F and M, each circle represents the 56 bit register designated by the letter in the circle. In the idle state (when no instruction is being executed in arithmetic and register circuit 20) each register continually circulates since with dynamic MOS registers information is represented by a charge on a parasitic capacitance and must be continually refreshed or lost. This is represented by the loop re-entering each register.

Registers A, B, and C can all be interchanged. Either register A or C is connected to one adder input, and either register B or C to the other. The adder output can be directed to either register A or C. Certain instructions can generate a carry via carry flip-flfp 85 which is transmitted to control and timing circuit 16 to determine conditional branching. Register C always holds a normalized version of the displayed data.

In the stack formed by registers C, D, E, and F a ROLL DOWN instruction is executed by the following transfers: F → E → D → C → F. A STACK UP instruction is executed by the following transfers: $C_7$ C → D → E → F. Thus, it is possible to transfer a register and also let it recirculate so that in the last example the contents of C are not lost. The structure and operation of a stack such as this are further described in copending U.S. patent application Ser. No. 257,606 entitled IMPROVED PORTABLE ELECTRONIC CALCULATOR, filed on May 30, 1972, by David S. Cochran et al, and issued as U.S. Pat. No. 3,781,820 on Dec. 25, 1973.

In serial decimal adder/substractor 84 a correction (addition of 6) to a BCD sum must be made if the sum exceeds nine (a similar correction for subtraction is necessary). It is not known if a correction is needed until the first three bits of the sum have been generated. This is accomplished by adding a four-bit holding register 86 ($A_{60}$–$A_{57}$) and inserting the corrected sum into a portion 88 ($A_{56}$–$A_{53}$) of register A if a carry is generated. This holding register 86 is also required for the SHIFT A LEFT instruction. One of the characteristics of a decimal adder is that non-BCD codes (i.e. 1101) are not allowed. They will be modified if circulated through the adder. The adder logic is minimized to save circuit area. If four bit codes other than 0000–1001 are processed, they will be modified. This is no constraint for applications involving only numeric data (however, if ASC11 codes, for instance, are operated upon, incorrect results will be obtained).

Arithmetic and register circuit 20 receives the instruction during bit times $b_{45}$—$b_{54}$. Of the ten types of instructions hereinafter described, arithmetic and register circuit must respond to only two types (namely, ARITHMETIC & REGISTER instructions and DATA ENTRY/DISPLAY instructions). ARITHMETIC & REGISTER instructions are coded by a 10 in the least significant two bits of $I_s$ register 90. When this combination is detected, the most significant five bits are saved in $I_s$ register 90 and decoded by instruction decoder 92 into one of 32 instructions.

The ARITHMETIC & REGISTER instructions are active or operative only when the Word Select signal (WS) generated in one of the ROM's 0–7 or in control and timing circuit 16 is at logic 1. For instance, suppose the instruction "A+C → C, mantissa with sign only" is called. Arithmetic and register circuit 20 decodes only A+C → C. It sets up registers A and C at the inputs to adder 84 and, when WS is high, directs the adder output to register C. Actual addition takes place only during bit times $b_{12}$ to $b_{55}$ (digits 3–13) since for the first three digit times the exponent and exponent sign are circulating and are directed unchanged back to their original registers. Thus, the word select signal is an "instruction enable" in arithmetic and register circuit 20 (when it is at logic 1, instruction execution takes place, and when it is at logic 0, recirculation of all registers continues).

The DATA ENTRY/DISPLAY instructions, except for digit entry, affect an entire register (the word select signal generated in the active ROM is at logic 1 for the entire word cycle). Some of these instructions are: up stack, down stack, memory exchange M↔C, and display on or toggle. A detailed description of their execution is given hereinafter.

Figure 12:
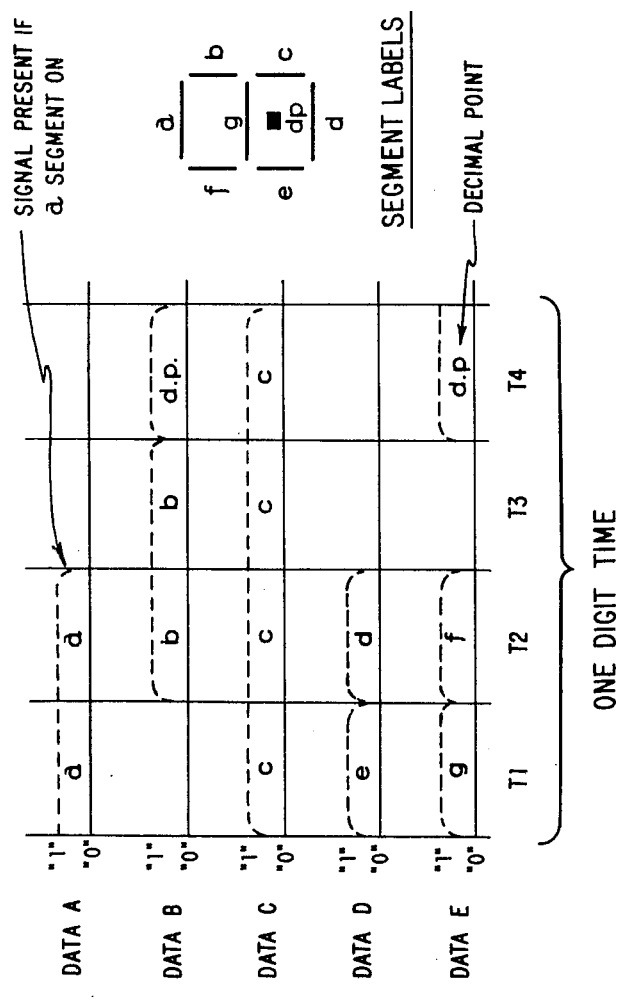
FIG. 12 is a waveform diagram illustrating the output signals for the display decoder outputs A–E of FIGS. 2, 10, and 11.

For increased power savings display decoder 94 is partitioned to partially decode the BCD data into seven segments and a decimal point in arithmetic and register circuit 20 by using only five output lines (A–E) 38 with time as the other parameter. Information for seven segments (a–g) and a decimal point (dp) are time shared on the five output lines A–E. The output wave forms for output lines A–E are shown in FIG. 12. For example, output line D carries the segment e information during $T_1$ (the first bit time of each digit time) and the segment D information during $T_2$ (the second bit time of each digit time); and output E carries the segment G information during $T_1$, the segment F information during $T_2$, and the decimal point (dp) during $T_4$. The actual signals which would appear if a digit 9 were decoded are shown in FIG. 13. The decoding is completed in the anode driver of output display unit 14 as explained hereinafter.

The registers in arithmetic and register circuit 20 hold 14 digits comprising 10 mantissa digits, the mantissa sign, two exponent digits, and the exponent sign. Although the decimal point is not allocated a register position, it is given a full digit position in the output display. This apparent inconsistency is achieved by using both the A and B registers to hold display information. The A register is set up to hold the displayed number with the digits in the proper order. The B register is used as a masking register with digits 9 inserted for each display positiion that is to be blanked and a digit 2 at the decimal point location. When the anode driver of output display unit 14 detects a decimal point code during $T_4$, it provides a signal to the cathode driver of the output display unit to move to the next digit position. One digit and the decimal point share one of the 14 digit times. The digit 9 mask in register B allows both trailing and leading zeros to be blanked (i.e., by programming 9's into the B register). Use of all three working registers for display (i.e., the C register to retain the number in normalized form, the A register to hold the number in the displayed form, and the B register as a mask) allows the calculator to have both a floating point and a scientific display format at the expense of only a few more ROM states.

The display blanking is handled as follows. At time $T_4$ the BCD digit is gated from register A into display buffer 96. If this digit is to be blanked, register B will contain a 9 (1001) so that at $T_4$ the end bit ($B_{01}$) of the B register will be a 1 (an 8 would therefore also work). The input to display buffer 96 is OR-ED with $B_{01}$ and will be set to 1111 if the digit is to be blanked. The decimal point is handled in a similar way. A 2 (0010) is placed in register B at the decimal point location. At time $T_2$ the decimal point buffer flip-flop is set by $B_{01}$. Any digit with a one in the second position will set the decimal point (i.e., 2, 3, 6, or 7).

Figure 14:
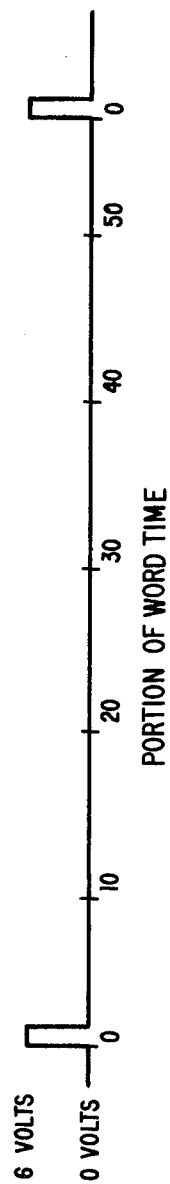
FIG. 14 is a waveform diagram illustrating the timing of the START signal generated by the display decoder of FIG. 10.

Display decoder 94 also applies a START signal to line 40. This signal is a word synchronization pulse, which resets the digit scanner in the cathode driver of putput display unit 14 to assure that the cathode driver will select digit 1 when the digit 1 information is on outputs A, B, C, D, and E. The timing for this signal is shown in FIG. 14.

One other special decoding feature is required. A minus sign is represented in tens complement notation or sign and magnitude notation by the digit 9 in the sign location. However, the display must show only a minus sign (i.e., segment g). The digit 9 in register A in digit position 2 (exponent sign) or position 13 (mantissa sign) must be displayed as minus. The decoding circuitry uses the pulse on $I_s$ buss 28 at bit time $b_{11}$ (see FIG. 3) to know that the digit 9 in digit position 2 of register A should be a minus and uses the SYNC pulse to know that the digit 9 in digit position 13 of register A should also be a minus. The pulse on $I_s$ buss 28 at bit time $b_{11}$ can be set by a mask option, which allows the minus sign of the exponent to appear in other locations for other uses of the calculator circuits.

Clock Driver

Figure 15:
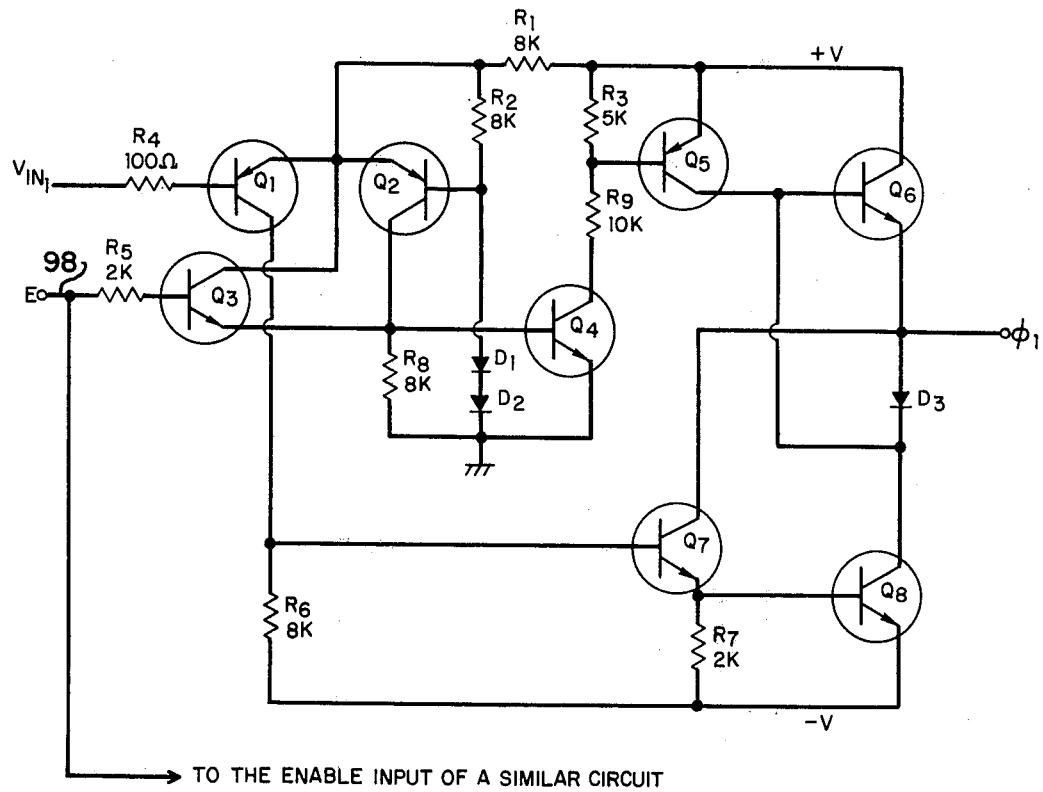
FIG. 15 is a schematic diagram of the clock driver of FIG. 2.
Figure 16:
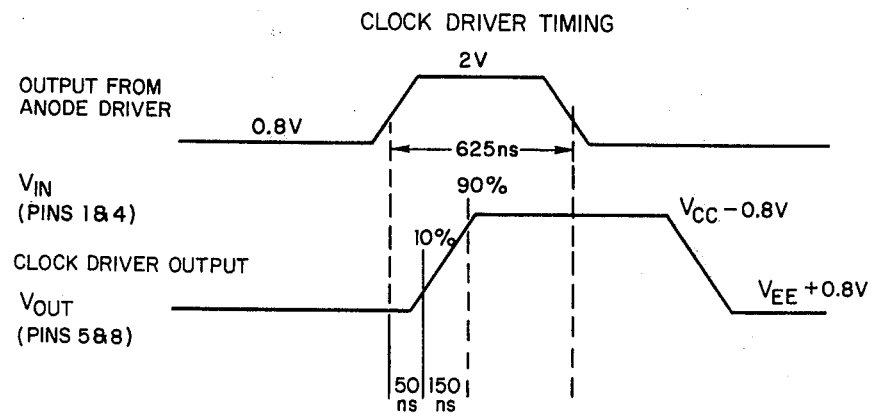
FIG. 16 is a waveform diagram illustrating the timing relationship between the input and output signals of the clock driver of FIG. 15.

The bipolar clock driver 22, one phase of which is shown in FIG. 15, requires less than 25 milliwatts and can drive loads up to 300 picoforads with a voltage swing of +7 to −14 volts. An ENABLE input 98 allows both outputs $Q_1$ and $Q_2$ to be held to $V_{cc}$, the MOS Logic 0 state. This is an effective means of strobing the clock. During dc operation, the transistor pair $Q_1$–$Q_2$ allows only one of the output transistor pairs $Q_5$–$Q_6$ or $Q_7$–$Q_8$ to conduct. Diode $D_3$ prohibits conduction from transistor $Q_6$ to transistor $Q_8$ during transient operation. Thus, the only possible transient short circuit current must flow from transistor $Q_5$ to transistor $Q_7$. However, the limited current handling capability of $Q_5$ (a lateral PNP) limits this current to less than 5 milliamps peak. The input signals for clock driver 22 are generated on the anode driver of output display unit 14, and the outputs of the clock driver go to each of the MOS circuits in the system. The timing relationships are shown in FIG. 16.

Anode Driver

Figure 17:
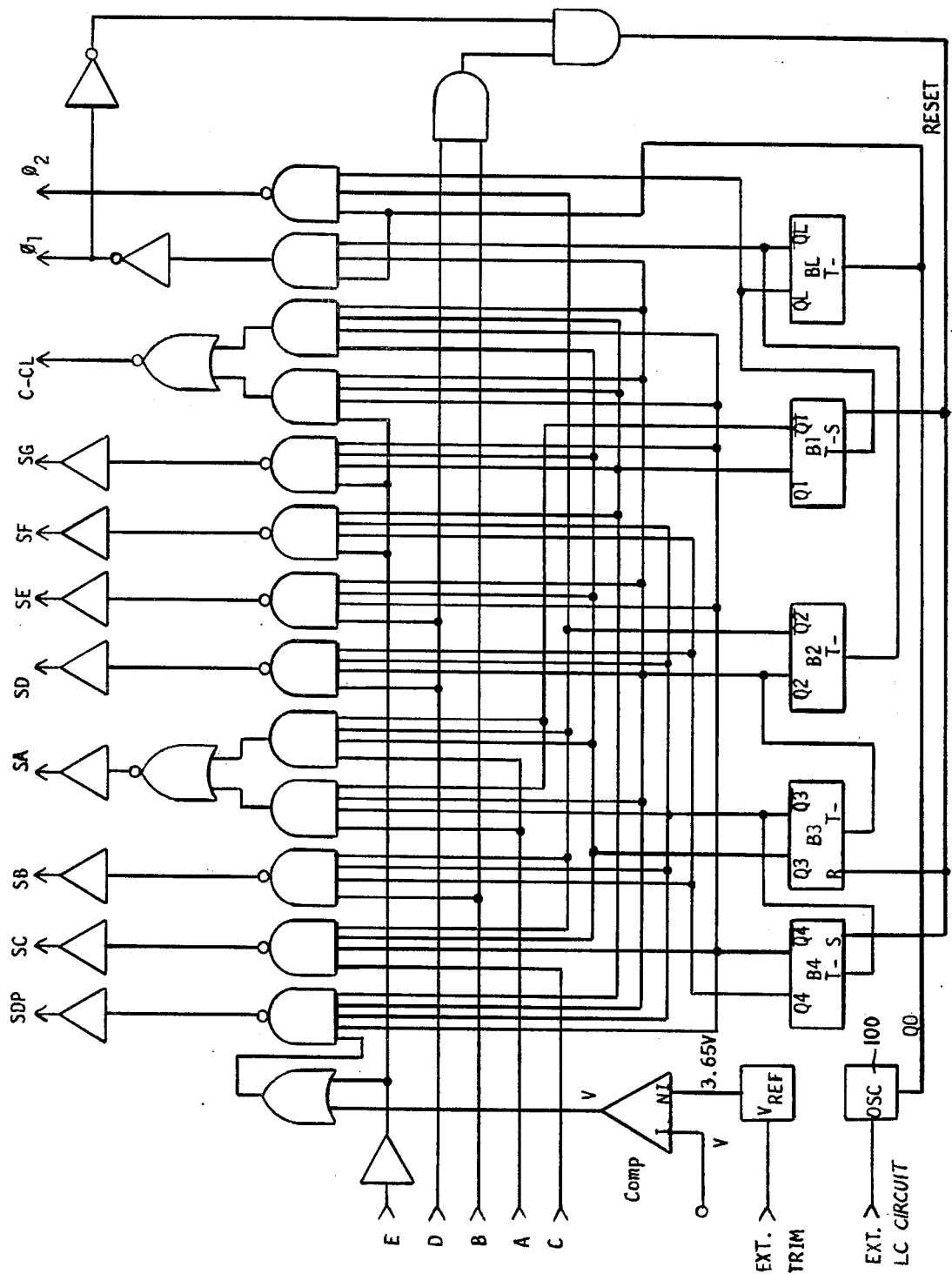
FIG. 17 is a logic diagram of the anode driver of FIG. 2.

As discussed above, the display information is partially decoded in arithmetic and register circuit 20 and completely decoded into seven segment plus decimal point signals in the bipolar anode driver of output display unit 14. The anode driver also includes the basic clock generator for the system and a circuit for detecting low battery voltage to turn on all the decimal points. Such a circuit is shown and described in co-pending U.S. patent application Ser. No. 206,407 entitled LOW BATTERY VOLTAGE INDICATOR FOR A PORTABLE DIGITAL ELECTRONIC INSTRUMENT, filed on Dec. 9, 1971, by Thomas M. Whitney, and now abandoned. A logic diagram of the anode driver is shown in FIG. 17.

The clock generator uses an external LC series circuit to set the oscillator frequency. The advantages of an LC series circuit to set the frequency are: (1) the components can be specified to up to 2% tolerance; and (2) a crystal can be connected to the same external pin to set the frequency to 0.001% for timing applications.

Figure 18:
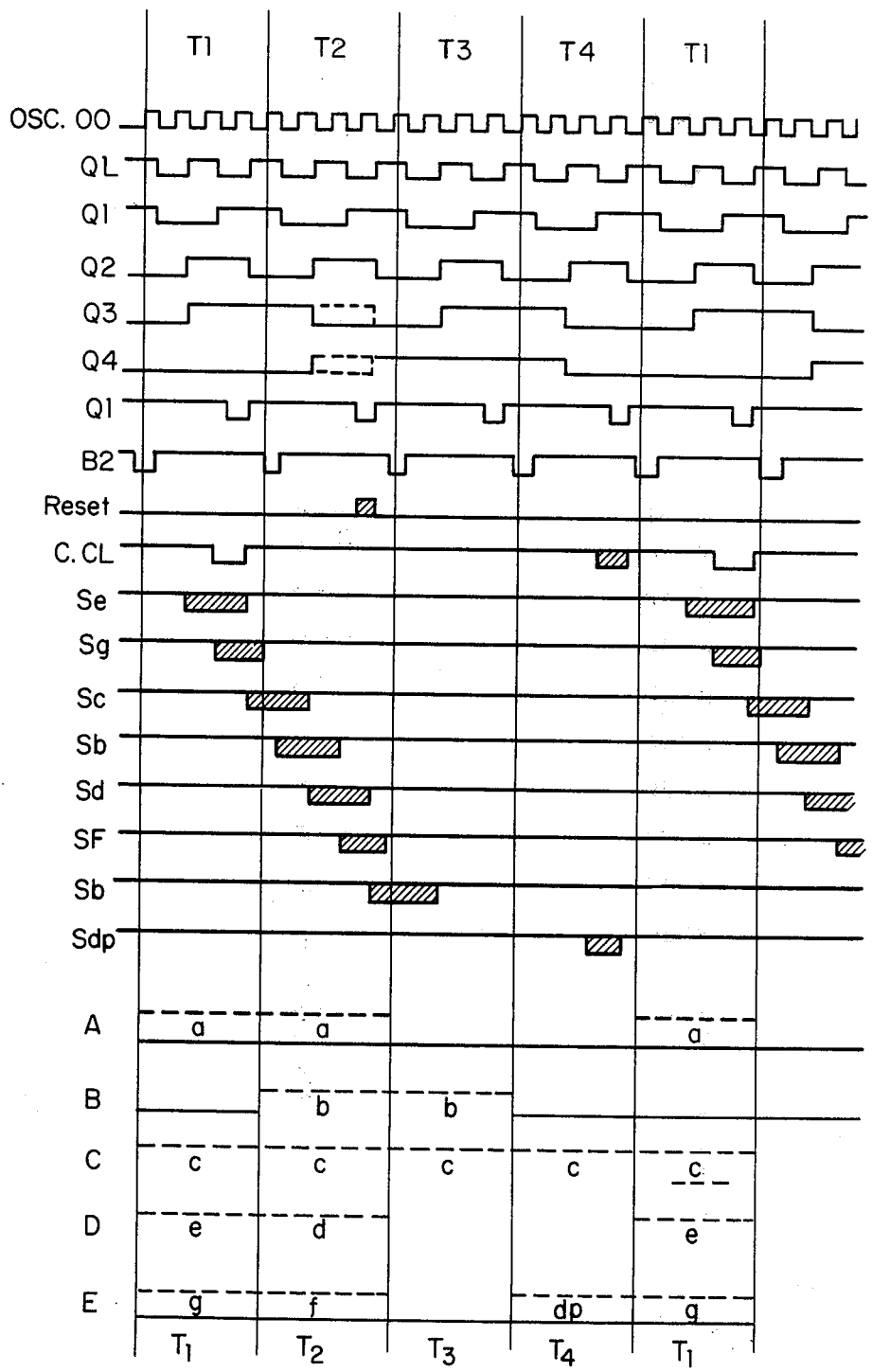
FIG. 18 is a waveform diagram illustrating the timing relationship between the input, output, and other signals of the anode driver of FIG. 17.

The square-wave oscillator frequency (all times in this section will be referred to an 800 KHz oscillator frequency, which translates to a 200 KHz clock for the calculator, the actual frequency being somewhat less) is divided by flip-flop BL to 400 KHz. Flip-flops B1 and B2 are clocked off alternate phases of flip-flop B1 to provide two 200 KHz square waves as shown in FIG. 18. Flip-flop B3 is clocked from flip-flop B2 and in turn clocks flip-flop B4 to provide further count-down of the basic clock frequency. The two-phase clock signals $Q_1$ and $Q_2$ are generated from flip-flops BL and B1 and the 800 KHz oscillator 100. They are on for 625 nsec and separated by 625 μsec as shown in FIG. 18. One other periodic signal is derived in the anode driver. Once each digit time a signal (counter-clock) is sent to the cathode driver of output display unit 14 (the trailing edge of this signal will step the display to the next digit).

The display consists of 15 characters while the basic calculator word cycle consists of 14 digits. The extra character is the decimal point. As explaind above, a BCD two is placed in register B at the digit position of the decimal point. The display decoder 94 in arithmetic and register circuit 20 indicates this by a signal on outputs B and E during bit time $T_4$ (see FIG. 12). When this condition is decoded by the anode driver, the decimal point is excited and an extra counter clock signal is given to step the display to the next position (see FIGS. 18, 19, and 20). Therefore all remaining digits in register A are displaced one digit in the display.

Figure 19:
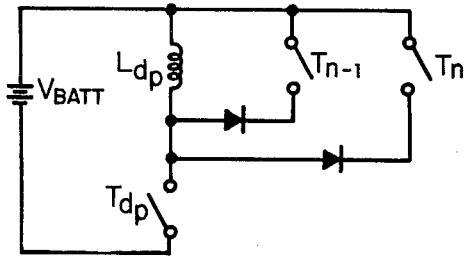
FIG. 19 is a schematic diagram of the basic inductive drive circuit for one of the LED's employed in the LED display of FIG. 2.
Figure 20:
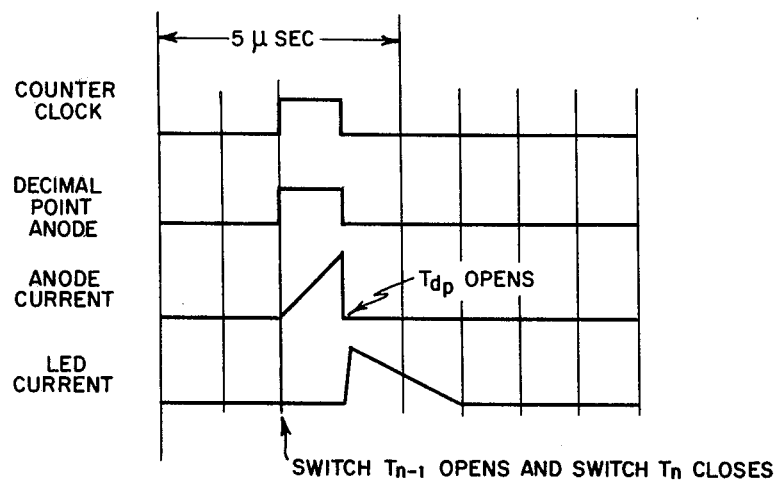
FIG. 20 is a waveform diagram illustrating the timing relationship between the decimal point drive signals for the LED display of FIG. 2.

FIGS. 19 and 20 show the simplified circuit and the timing relationship for the decimal point. The timing is critical since all the inductor current in segment $b$ (the last to be excited) must be decayed before the counter clock signal is given to step to the next digit or the remaining current would be discharged through the wrong digit and a faint lighting of segment $b$ on the same digit with the decimal point would occur. The decimal point insertion technique is the reason all other seven segments are excited during the first half of the digit time. The decimal point charging time is one-half that of the other segments. The decimal point segment gets the same current in one-half the time and is one-half as bright as the other segments.

Figure 21:
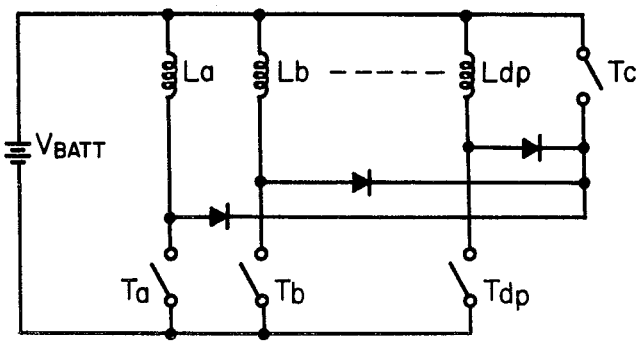
FIG. 21 is a schematic diagram of the inductive drive circuit for one digit in the LED display of FIG. 2.

An inductive circuit method of driving the light-emitting diodes is employed. Basically the method involves using the time it takes current to build up in an inductor to limit current, rather than using a resistor as is normally done with LED read-outs. This saves power since the only lossy components in the drive system are the parasitic inductor and transistor resistances. The drive circuit for one digit is shown in FIG. 21. Assuming the cathode transistor switch $T_c$ is closed, an anode switch $T_a$ is closed for 2.5 $\mu$sec allowing the current to build up to a value $I_p$ along a nearly triangular waveform (the early part of an exponential buildup). When anode switch $T_a$ is opened, the current is dumped through the LED, decaying in about 5 $\mu$sec. The anodes are strobed according to the sequence in FIG. 18. The primary reason for sequentially exciting the anodes is to reduce the peak cathode transistor current. Since the decay time is approximately twice the buildup time, it works out that the peak cathode current is about 2.5 times the peak current in any segment. The LED's are more efficient when excited at a low duty cycle. This means high currents for short periods (80 ma. anode current, 250 ma. cathode current). FIG. 18 also shows the relationship between the anode strobing sequence and the display output signals (A–E) from arithmetic and register circuit 20.

Since the anode driver operates from the battery voltage directly and drives the decimal point segment, a circuit is provided that senses when the voltage drops below a certain limit and thereupon turns on all decimal points. An external pin is provided to connect a trimming resistor to set the voltage where the indication is to occur.

Cathode Driver

Figure 22:
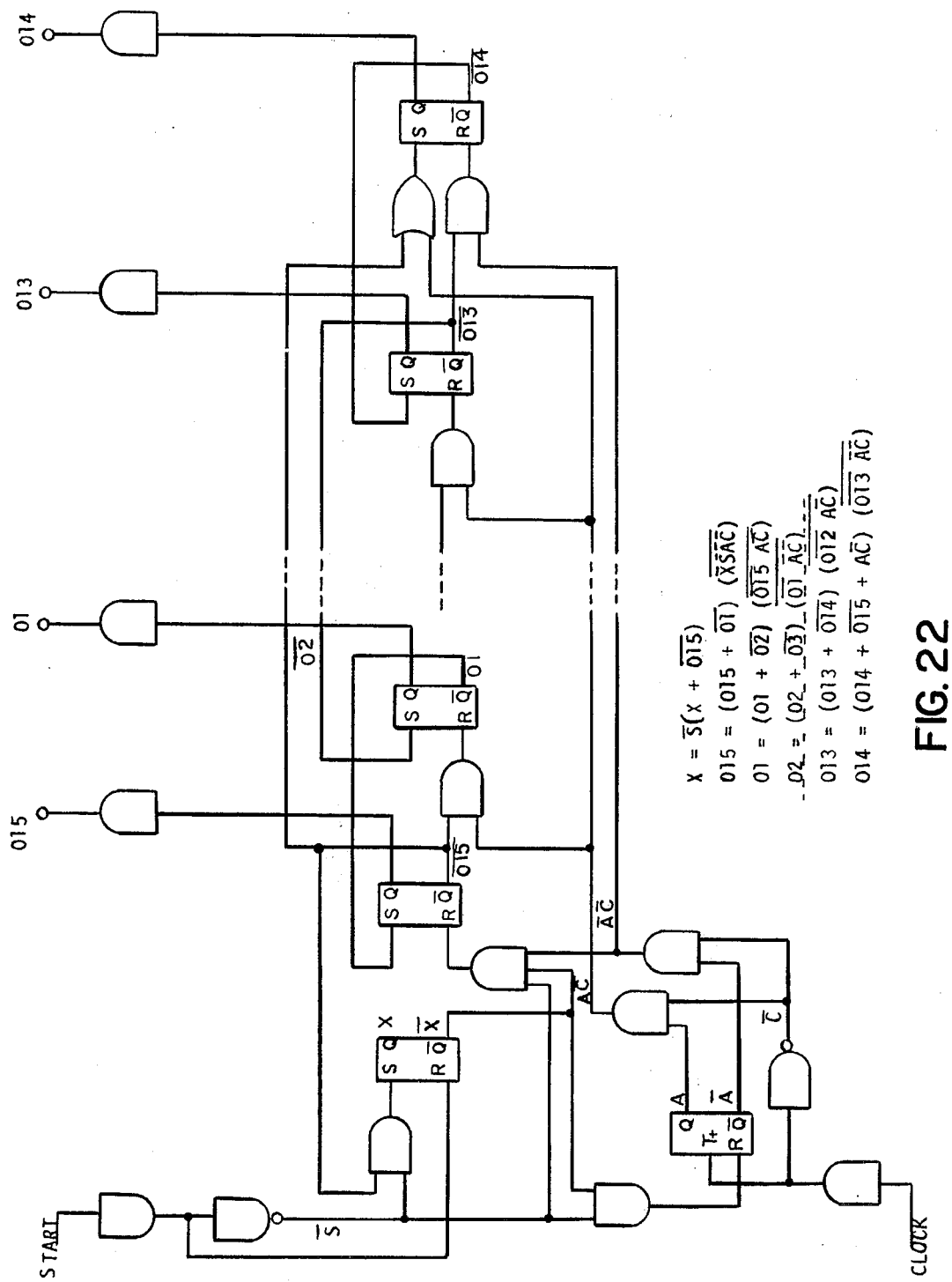
FIG. 22 is a logic diagram of the cathode driver of FIG. 2.

The cathode driver of output display unit 14 comprises a 15 position shift register for scanning the 15 digit display once each word time. This scanning operation moves from digit to digit in response to counter clock signals from the anode driver. Once each word time a START signal arrives from arithmetic and register circuit 20 to restart the procedure. A block diagram is shown in FIG. 22.

Keyboard

Figure 23:
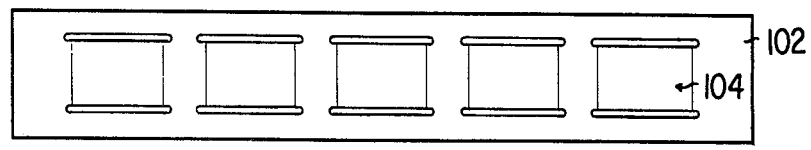
FIG. 23 is a top view of a metal strip employed in the keyboard input unit of FIGS. 1 and 2.
Figure 24:
FIG. 24 is a side view of the metal strip of FIG. 23.

The calculator employs a reliable, low-profile, low cost keyboard with tactile feedback such as that shown and described in copending U.S. patent application Ser. No. 173,754 entitled KEYBOARD HAVING SWITCHES WITH TACTILE FEEDBACK and filed on Aug. 23, 1971, by William W. Misson et al. The keyboard employs metal strips 102 with slots 104 etched or punched out as shown in FIG. 23, leaving an area which can be stretched to form small humps as shown in FIG. 24. The strips are spot welded to a printed circuit board such that orthogonal traces run under each hump. Pressing a key makes electrical contact between one of the horizontal strips and the corresponding vertical trace. The bounce is less than one millisecond (the calculator contains a wait loop to prevent double entries). Extensive life testing of the keyboard indicates more than a million cycles can be expected. Tolerances must be maintained carefully to prevent the possibility that a key is depressed but no contact is made and to insure uniformity.

Figure 25:
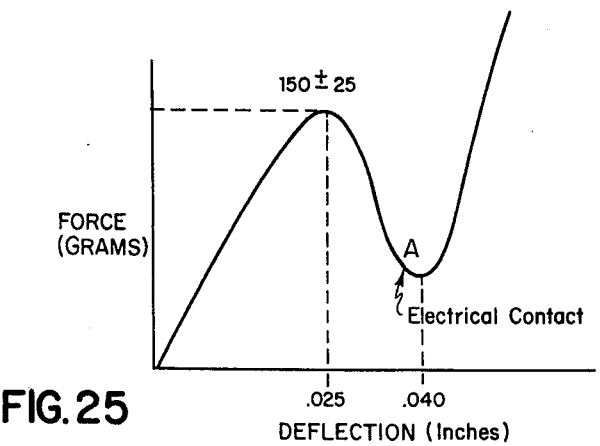
FIG. 25 is a force-deflection curve for a typical key in the keyboard input unit of FIGS. 1 and 2.

One of the main advantages of the keyboard is the "over-center" or "fall away" feel. FIG. 25 shows a force-deflection curve for a typical key. As can be seen a force of about 100 grams must be exceeded before the metal hump "breaks" through. After this critical value the operator cannot prevent contact from being made. Similarly when the key is released, contact is maintained until a critical value when the hump bounces back. Again, past a critical point the operator cannot prevent the key from releasing. This type of action prevents a condition known as "teasing" in which a key is nearly depressed and slight movement causes multiple entries. The point on the force deflection curve at which contact is made or released is most desirably on the negative slope portion. In the calculator it is either there or exactly at the bottom (point A in FIG. 25), but never on the final positive slope portion.

LED Display

As mentioned above, the inductive drive technique employed for the LED display is inherently efficient because there are no dissipative components other than parasitic resistances and the forward voltage drop across saturated transistor switches. An inductive driver like that used in the calculator is shown and described in copending U.S. patent application Ser. No. 202,475 entitled LIGHT EMITTING DIODE DRIVER, filed on Nov. 26, 1971, by Donald K. Miller, and issued as U.S. Pat. No. 3,755,697 on Aug. 28, 1973.

Figure 26:
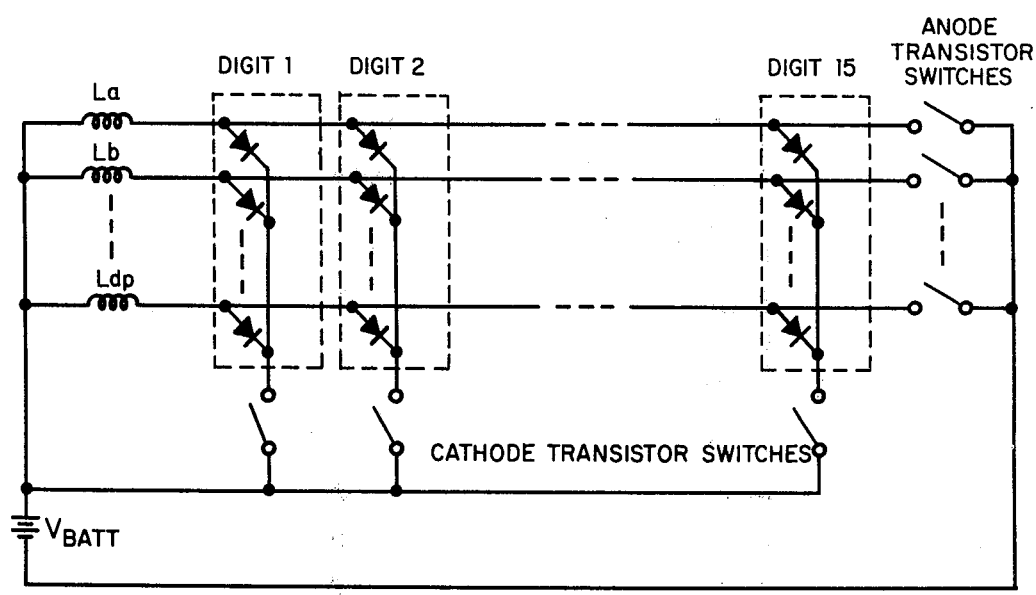
FIG. 26 is a schematic diagram of the LED display of FIGS. 1 and 2 and the inductive drive circuits therefor.
Figure 27:
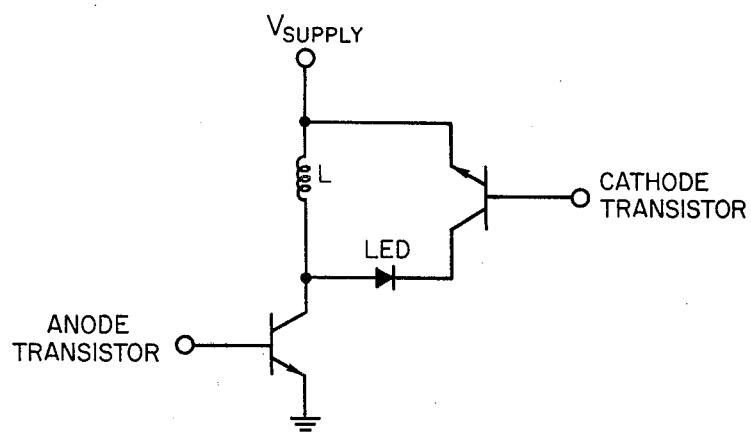
FIG. 27 is a schematic diagram of one segment of the LED display of FIG. 26.
Figure 28:
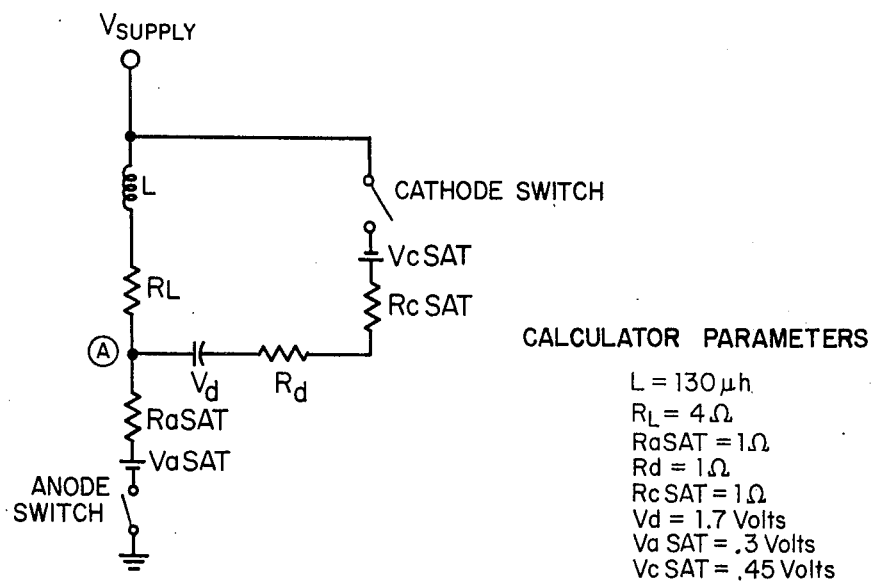
FIG. 28 is an equivalent piecewise-linear model for the circuitry of FIG. 27.

The display circuitry used in the calculator is shown in FIG. 26. It comprises an 8 × 15 array of LED's in which the eight rows are scanned by the anode driver and the 15 columns by the cathode driver. The timing for this scanning was discussed above. A simplified circuit diagram for one segment is shown in FIG. 27. The equivalent piecewise-linear circuit model is shown in FIG. 28. An analysis of this model shows the inductor current buildup and discharge to be nearly linear for the parameters used in the calculator. The discharge-time to charge-time ratio is approximately:

$$\frac{t_{discharge}}{t_{charge}} = \frac{V_s - V_{asat}}{V_d + V_{csat}} = \frac{3.8 - 0.1}{1.6 + 0.2} = \frac{3.7}{1.8} = 2.06$$

Figure 29:
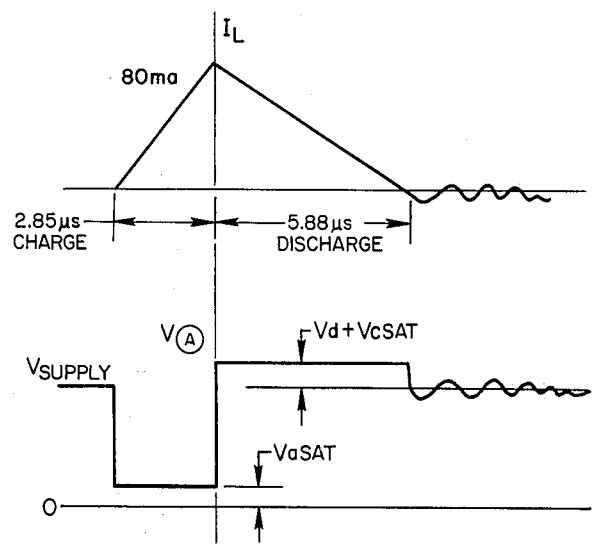
FIG. 29 is a waveform diagram illustrating the inductor current and LED anode voltages in the circuitry of FIG. 27.

FIG. 29 shows the inductor current for a basic calculator clock frequency of 175 KHz. The average LED current can be calculated from the formula $$Ave\ I_{LED} = pulse\ current \times duty\ cycle$$

-continued $$= \left(\frac{1}{2} \times 80 \text{ ma}\right) \frac{5.88 \text{ sec}}{\frac{1}{175 \text{ KHz}} \times 56}$$

$$= \frac{(80)(5.88)(.175)}{(2)(56)} = .735 \text{ ma}$$

instruction is either a subroutine jump or a conditional branch as selected by the second bit, with eight bits left for an address. The next largest set of instructions, the arithmetic set, starts with a zero followed by a one (right to left), leaving eight bits for encoded instructions. The ten different types of instructions, employed by the calculator are shown in the table below.

TABLE OF INSTRUCTION TYPES (X = DON'T CARE)

| TYPE | AVAILABLE INSTRUCTIONS | NAME | FIELDS |
|---|---|---|---|
| 1 | 256(ADDRESSES) | JUMP SUBROUTINE | 8<br>\| SUBROUTINE ADDRESS \| 0 1 \| |
|  | 256(ADDRESSES) | CONDITIONAL BRANCH | \| BRANCH ADDRESS \| 1 1 \|<br>$I_9 \quad\quad\quad I_0$ |
| 2 | 32 × 8 = 256 | ARITHMETIC/REGISTER | 5   3<br>\| OPERATION CODE \| WORD SELECT \| 1 0 \|<br>4   2 |
| 3 | 64<br>(37 used) | STATUS OPERATIONS | \| N \| F \| 0 1 0 0 \|<br>$I_5 I_4 \; I_3 \; I_2 \; I_1 \; I_0$ |
|  |  | SET BIT N | F = 00 |
|  |  | INTERROGATE N | F = 01 |
|  |  | RESET N | F = 10 |
|  |  | CLEAR ALL | F = 11   (N = 0000) |
|  |  |  | 4   2 |
| 4 | 64<br>(30 used) | POINTER OPERATIONS | \| P \| F \| 1 1 0 0 \| |
|  |  | SET POINTER TO P | F = 00 |
|  |  | INTERROGATE P | F = 10 |
|  |  | DECREMENT P | F = 01 |
|  |  | INCREMENT P | F = 11   P = XXXX |
|  |  |  | 4   2 |
| 5 | 64<br>(20 used) | DATA ENTRY/DISPLAY | \| N \| F \| 1 0 0 0 \| |
|  |  | LOAD CONSTANT | F = 01 |
|  |  | IS → A | F = 1X (N = XX01) |
|  |  | BCD INPUT TO C REG | F = 1X (N = XX11) |
|  |  | STACK INSTRUCTIONS AVAILABLE | F = 10 N = (---0)<br>F = 00 |
|  |  |  | 3   2 |
| 6 | 32<br>(11 used) | ROM SELECT, MISC. | \| N \| F \| 1 0 0 0 0 \| |
|  |  | SELECT ROM "N" | F = 00 |
|  |  | KEYBOARD ENTRY | F = 10 (N = XX1) |
|  |  | EXTERNAL ENTRY | (N = XX0) |
|  |  | SUBROUTINE RETURN | F = 01 (N = XXX) |
|  |  |  | 4 |
| 7 | 16 | RESERVED FOR PROGRAM STORAGE MOS CIRCUIT AVAILABLE | \| X X X X \| 1 0 0 0 0 0 \|<br>3 |
| 8 | 8 |  | \| X X X \| 1 0 0 0 0 0 0 \| |
| 9 | 7 |  | \| X X X \| 0 0 0 0 0 0 0 \| |
| 10 | 1 | NO OPERATION (NOP) | \| 0 0 0   0 0 0 0 0 0 0 \| |

The worst case display power (i.e., 13 8's and two minus signs) is about 110 milliwatts. FIG. 29 also shows the ringing inherent with inductive drive.

Instruction Set

Every function performed by the calculator is implemented by a sequence of one or more ten-bit instructions stored in ROM's 0–7 of read-only memory circuit 18. The serial nature of the MOS calculator circuits allows the instruction bits to be decoded from LSB to MSB (right to left) serially. If the first bit is a one, the There are two type 1 instructions, jump subroutine and conditional branch. They are decoded only by control and timing circuit 16. No word select is generated and all registers in arithmetic and register circuit 20 merely recirculate. The object of the jump subroutine instruction is to move to a new address in the ROM and to save the existing address (plus one) as a return address. The last instruction in a subroutine must be a RETURN to continue the program where it was left previously.

As discussed above, control and timing circuit 16 contains a 20 eight-bit shift register 58–62 which holds the current eight-bit ROM address and also has eight bits of storage for one return address (see FIG. 4). During bit times $b_{47}$–$b_{54}$ the current ROM address flows through the adder 64 and is incremented by one. Normally, this address is updated each word time. However, if the first two bits of the instruction, which arrive at bit times $b_{45}$–$b_{46}$ are 10, the incremented current address is routed to the return address portion 60 of the 20 eight-bit shift register and the remaining eight bits of the instruction, which are the subroutine address, are inserted into the address portion 58. These data paths with the JSB control line are shown in FIG. 4. In this way the return address has been saved and the jump address is ready to be transmitted to the ROM at bit times $b_{19}$–$b_{26}$ of the next word time.

The most frequently used instruction is the conditional branch, which based upon data or system status implements the decision-making capability of the calculator. In the calculator system described here this instruction also functions as an unconditional branch.

The format of the branch instruction, as shown in the instruction table above, is two ones followed by an eight-bit branch address. The instruction is received at bit times $b_{45}$–$b_{54}$. The last eight bits of the instruction are stored in the address buffer register 68 (see FIG. 4). During the next word time the carry flip-flop 66 is checked at bit time $b_{19}$. If the carry flip-flop was set during the previous word time, the current ROM address is transmitted to ROM's 0–7. If the carry flip-flop was not set, the branch address is read from the address buffer register 68 onto the $I_a$ buss 32 and loaded into the ROM address register 74 (see FIG. 6). Thus, the instruction is a BRANCH IF NO CARRY. There are three ways the carry flip-flop 66 can be set: (1) by a carry generated in the arithmetic and register circuit 20; (2) by a successful interrogation of the pointer position; and (3) by a successful interrogation of one of the 12 status bits. An example is given in the table below.

only if the sign is positive (i.e., was a zero), otherwise execution continues at P+2.

Note that during word time N+1 the calculator did nothing more than to select which of two addresses to send next (all registers merely recirculate). To perform a branch actually takes two word cycles to execute, one to ask a question and set the carry flip-flop 66 if the answer is YES, and the other to test if the CARRY flip-flop was set and transmit the proper address. In many cases the asking of the question is an arithmetic operation (i.e., A+B → A) which must be performed anyway. Then the branch takes only one extra instruction.

Contrary to most instruction sets, this set has no unconditional branch instruction. However, since an ordinary "jump" is one of the most used instructions, the conditional branch is also used as an unconditional branch or jump by insuring that the carry flip-flop 66 is reset when an unconditional branch is desired. This is the reason the sense of the conditional branch is BRANCH ON NO CARRY. The carry flip-flop 66 is reset during execution of every instruction except arithmetic (type 2) and interrogation of pointer or status (types 3 and 4). Since only arithmetic and interrogation instructions can set the carry flip-flop 66, the constraint is not severe. The jump subroutine instruction can also be used as an unconditional branch if the previous return address does not have to be saved. In summary, conditional branch can be used as an unconditional branch provided the state of the carry flip-flop 66 is known to be reset (i.e., provided the conditional branch does not follow an arithmetic or an interrogation of pointer or status instruction).

Arithmetic and register (Type 2) instructions apply to the arithmetic and register circuit 20 only. There are 32 arithmetic and register instructions divided into eight classes encoded by the left-hand five bits of the instruction. Each of these instructions can be combined with any of eight word select signals to give a total

| | | Example Conditional Branch Execution | | |
|---|---|---|---|---|
| WORD | ADDRESS RECEIVED AT ROM | INSTRUCTION SENT BY ROM | INSTRUCTION EXECUTED | RESULT |
| N−1 | P | INCREMENT SIGN DIGIT | — | — |
| N | P+1 | CONDITIONAL BRANCH TO ADDRESS Q | INCREMENT SIGN DIGIT | CARRY GENERATED IF "A" REG. NEGATIVE |
| N+1 | P+2 or Q | CONTENTS OF P+2 or CONTENTS OF Q | CONDITIONAL BRANCH | SEND P+2 or SEND Q |

A typical test condition is to determine the sign of a number. Suppose at address P in the program a branch to location Q is desired if the sign of A is positive, while program execution is to continue if the sign is negative. In the example given in the table above, the instruction "increment the A register, word select of sign digit only" is given at location P. During word time N−1 the instruction is received by arithmetic and register circuit 20 and is executed at word time N (the same word time when the CONDITIONAL BRANCH instruction is received by control and timing circuit 16). If the sign of A is negative, there will be a nine in the sign digit. Incrementing this position will generate a carry and set the carry flip-flop 66 in control and timing circuit 16. Since the instruction is a branch if no carry is generated, the program execution will jump to location Q capability of 256 instructions. The 32 arithmetic and register instructions are listed in the table below.

| TABLE OF TYPE TWO INSTRUCTIONS (in order of binary code) | | | |
|---|---|---|---|
| CODE | INST | CODE | INST |
| 0 0000 | 0−B | 1 0000 | A−B |
| 0 0001 | 0→B | 1 0001 | B⇄C |
| 0 0010 | A−C | 1 0010 | SHIFT C RIGHT |
| 0 0011 | C−1 | 1 0011 | A−1 |
| 0 0100 | B→C | 1 0100 | SHIFT B RIGHT |
| 0 0101 | 0−C→C | 1 0101 | C+C→C |
| 0 0110 | 0→C | 1 0110 | SHIFT A RIGHT |

-continued

TABLE OF TYPE TWO INSTRUCTIONS
(in order of binary code)

| CODE | INST | CODE | INST |
|---|---|---|---|
| 0 0111 | 0−C−1 → C | 1 0111 | 0 → A |
| 0 1000 | SHIFT A LEFT | 1 1000 | A−B → A |
| 0 1001 | A → B | 1 1001 | A ⟷ B |
| 0 1010 | A−C → C | 1 1010 | A ⟷ C |
| 0 1011 | C−1 → C | 1 1011 | A−1 → A |
| 0 1100 | C → A | 1 1100 | A+B → A |
| 0 1101 | 0−C | 1 1101 | A ⟷ C |
| 0 1110 | A+C → C | 1 1110 | A+C → A |
| 0 1111 | C+1 → C | 1 1111 | A+1 → A |

KEY: A,B,C, are registers; → means goes into; ⟷ means interchange

The eight classes of arithmetic and register instructions are:
1. Clear (3);
2. Transfer/Exchange (6);
3. Add/Subtract (7);
4. Compare (6);
5. Complement (2);
6. Increment (2);
7. Decrement (2); and
8. Shift (4).

There are three clear instructions. These instructions are O → A, O → B, and O → C. They are implemented by simply disabling all the gates entering the designated register. Since these instructions can be combined with any of the eight word select options, it is possible to clear a portion of a register or a single digit.

There are six transfer/exchange instructions. These instructions are A → B, B → C, C → A, A ↔ B, B ↔ C, and C ↔ A. This variety permits data in registers A, B, and C to be manipulated in many ways. Again, the power of the instruction must be viewed in conjunction with the word select option. Single digits can be exchanged or transferred.

There are seven add/subtract instructions which use the adder circuitry 84. They are A±C → C, A±B → A, A±C → A, and C+C → C. The last instruction can be used to divide by five. This is accomplished by first adding the number to itself via C+C → C, multiplying by two, then shifting right one digit, and dividing by 10. The result is a divide by five. This is used in the square root routine.

There are six compare instructions. These instructions are always followed by a conditional branch. They are used to check the value of a register or a single digit in a register and still not modify or transfer the contents. These instructions may easily be found in the type two instruction table above since there is no transfer arrow present. They are:
1. 0-B (Compare B to zero);
2. A-C (Compare A and C);
3. C-1 (Compare C to one);
4. 0-C (Compare C to zero);
5. A-B (Compare A and B); and
6. A-1 (Compare A to one).

If, for example, it is desired to branch if B is zero (or any digit or group of digits is zero as determined by WS), the 0-B instruction is followed by a conditional branch. If B was zero, no carry (or borrow) would be generated and the branch would occur. The instruction can be read: IF U V THEN BRANCH. Again it is easy to compare single digits or a portion of a register by appropriate word select options.

There are two complement instructions. The number representation system in the calculator is sign and magnitude notation for the mantissa, and tens complement notation in the exponent field. Before numbers can be substracted, the subtrahend must be tens-complemented (i.e., 0−C → C). Other algorithms require the nines complement (i.e., 0−C−1 → C).

There are four increment/decrement instructions (two of each). They are A±1 → A and C±1 → C.

There are four shift instructions. All three registers A, B, and C can be shifted right, while only A has a shift left capability. The arithmetic and register instructions set is summarized by class in the table below.

| TABLE OF TYPE TWO INSTRUCTIONS (divided by class) | | |
|---|---|---|
| Class | Instruction | Code |
| 1) Clear | 0 → A | 10111 |
| | 0 → B | 00001 |
| | 0 → C | 00110 |
| 2) Transfer/ Exchange | A → B | 01001 |
| | B → C | 00100 |
| | C → A | 01100 |
| | A ↔ B | 11001 |
| | B ↔ C | 10001 |
| | C ↔ A | 11101 |
| 3) Add/ Subtract | A+C → C | 01110 |
| | A−C → C | 01010 |
| | A+B → A | 11100 |
| | A−B → A | 11000 |
| | A+C → A | 11110 |
| | A−C → A | 11010 |
| | C+C → A | 10101 |
| 4) Compare | 0−B | 00000 |
| | 0−C | 01101 |
| | A−C | 00010 |
| | A−B | 10000 |
| | A−1 | 10011 |
| | C−1 | 00011 |
| 5) Complement | 0−C → C | 00101 |
| | 0−C−1 → C | 00111 |
| 6) Increment | A+1 → A | 11111 |
| | C+1 → C | 01111 |
| 7) Decrement | A−1 → A | 11011 |
| | C−1 → C | 01011 |
| 8) Shift | Sh A Right | 10110 |
| | Sh B Right | 10100 |
| | Sh C Right | 10010 |
| | Sh A Left | 01000 |

The 20 eight-bit register 58–62 in control and timing circuit 16 contains 12 status bits or flags used to remember conditions of an algorithm or some past event (e.g., the decimal point key has already been depressed). These flags can be individually set, reset, or interrogated or all bits can be cleared (reset simultaneously). The format for the status operation (type 3) instructions given in the instruction types table above is repeated below

TABLE OF STATUS INSTRUCTION DECODING

| Bit No. | $I_9 I_8 I_7 I_6$ | $I_5 I_4$ | $I_3$ | $I_2 I_1 I_0$ |
|---|---|---|---|---|
| FIELD | N | F | 0 | 1 0 0 |

| F | INSTRUCTION |
|---|---|
| 0 0 | SET FLAG N |
| 0 1 | INTERROGATE FLAG N |
| 1 0 | RESET FLAG N |
| 1 1 | CLEAR ALL FLAGS (N=0000) |

If status bit N is one when the instruction "interrogate N" is executed, the CARRY flip-flop 66 in control and timing circuit 16 will be set. The status bit will remain set. Interrogate is always followed by a conditional branch instruction. The form of the interrogation is: "If status bit N=0, then branch", or "If status bit N ≠ 1, then branch." The reason for this negative orientation is that all branches occur if the test is false (i.e., CARRY flip-fop=0), a result derived from using the conditional and unconditional branches as the same instruction.

Status bit 0 is set when a key is depressed. If cleared it will be set every word time as long as the key is down.

A four-bit counter 44 in control and timing circuit 16 acts as a pointer or marker to allow arithmetic instructions to operate on a portion of a register. Instructions are available to set and interrogate the pointer at one of 14 locations or to increment or decrement the present position. The pointer instruction decoding is given in the table below.

TABLE OF POINTER INSTRUCTION DECODING

| BIT NO. | 9 8 7 6 | 5 4 | 3 | 2 1 0 |
|---|---|---|---|---|
| FIELD | P | F | 1 | 1 0 0 |

| F | INSTRUCTION |
|---|---|
| 00 | Set pointer to P |
| 10 | Interrogate if pointer at P |
| 01 | Decrement pointer } P = XXXX |
| 11 | Increment pointer } i.e. don't care |

As with the status interrogate instruction, the CARRY flip-flop 66 is set if the pointer is at P when the "pointer at P?" instruction is executed (as with status interrogation, the actual question is in the negative form: "IF P ≠ N, THEN BRANCH " or "IF P = OTHER THAN N, THEN BRANCH"). This instruction would be followed by a conditional branch. In a math routine the pointer allows progressive operation on a larger and larger portion of a word. After each iteration (cycle) through a loop, the pointer is decremented (or incremented) and then tested for completion to force another iteration or a jump out of the loop.

The data entry and display (type 5) instructions are used to enter data into arithmetic and register circuit 20, manipulate the stack and memory registers, and blank the display (16 instructions in this set are not recognized by any of the existing circuits, and are therefore available for other external circuits that might be employed with other embodiments of the calculator). The table below contains a detailed decoding of the data entry and display (type 5) instructions.

TABLE OF TYPE FIVE INSTRUCTION DECODING
(X = don't care, which in this context means the instruction does not depend on this bit; either a 1 or a 0 here will cause the same execution.)

| $I_9 I_8 I_7 I_6 I_5 I_4$ | 1 0 0 0 |
|---|---|

| $I_9 I_8$ | $I_7 I_6$ | $I_5$ | $I_4$ | INSTRUCTION |
|---|---|---|---|---|
| 0000 → 1111 | | 0 | 0 | 16 Available instructions |
| 0000 →N 1001 | | 0 | 1 | Enters 4 bit code N into C Register at pointer position (LOAD CONSTANT) |
| 0 0 | 0 0 | 0 | 1 | X Display Toggle |
| 0 0 | 0 1 | 0 | 1 | X Exchange Memory, C→M→C |
| 0 0 | 1 0 | 0 | 1 | X Up Stack, C→C→D→E→F |
| 0 0 | 1 1 | 0 | 1 | X Down Stack, F→F→E→D→A |
| 1 0 | 0 0 | 0 | 1 | X Display OFF |
| 1 0 | 0 1 | 0 | 1 | X Recall Memory, M→M→C |
| 1 1 | 1 0 | 0 | 1 | X Rotate Down, C→F→E→D→C |
| 1 1 | 1 1 | 0 | 1 | X Clear all registers 0→A,B,C,D,E,F,M |
| X X | X 0 | 1 | 1 | X $I_8$→A register (56 bits) |

-continued

TABLE OF TYPE FIVE INSTRUCTION DECODING
(X = don't care, which in this context
means the instruction does not depend
on this bit; either a 1 or a 0 here
will cause the same execution.)

| | | | | | $I_9 I_8 I_7 I_6 I_5 I_4$ | 1 0 0 0 | |
|---|---|---|---|---|---|---|---|
| $I_9 I_8$ | $I_7 I_6$ | $I_5$ | $I_4$ | INSTRUCTION | | | |
| $\frac{1}{20}$ | X X 1 | 1 | X | BCD →C register (56 bits) | | | |

The first set of 16 instructions ($I_5 I_4 = 00$) in this table are not used by any of the main MOS circuits. They may be used by additional circuits or external circuitry listening to the $I_s$ line such as may be employed with other embodiments of the calculator.

The next instruction ($I_5 I_4 = 01$) in this table is called the LOAD CONSTANT (LDC) or DIGIT ENTRY instruction. The four bits in $I_9 - I_6$ will be inserted into the C register at the location of the pointer, and the pointer will be decremented. This allows a constant, such as $\pi$ (pi), to be stored in ROM and transfered to arithmetic and register circuit 20. To transfer a ten-digit constant requires only 11 instructions (one to preset the pointer). Several exclusions exist in the use of this instruction. When used with the pointer in position 13, it cannot be followed by an arithmetic and register instruction (i.e., by Type 2 or 5 instructions as there are problems in common use of the five-bit $I_s$ buffer 91 in arithmetic and register circuit 20). With P=12, LDC can be followed by another LDC but not by any other type 2 or 5 instruction. When used with the pointer in position 14, the instruction has no effect. However, when P=12 and LDC is followed by a type 2 or 5 instruction, position 13 in register C is modified. Loading non-digit codes (1010—1111) is not allowed since they will be modified passing through the adder. The next set of instructions ($I_6 I_5 I_4 = 01X$) in the type 5 instruction decoding table contains two display instructions and six stack or memory instructions. The display flip-flop in arithmetic and register circuit 20 controls blanking of all the LED's. When it is reset, the 1111 code is set into the display buffer 96, which is decoded so that no segments are on. There is one instruction to reset this flip-flop $I_9 I_8 I_7 = 100$) and another to toggle it (000). The toggle feature is convenient for blinking the display.

The remaining instructions in the type 5 instruction decoding table include two affecting memory (Exchange C↔M and Recall M → C), three affecting the stack (Up, Down, and Rotate Down), one general clear, one for loading register A from $I_s$ buss 28 (namely, $I_7 I_6 I_5 = 011$), and one for loading register C from BCD (111). Neither of the two last-mentioned instructions depends on bits $I_9$, $I_8$, or $I_4$. The $I_s \rightarrow A$ instruction is designed to allow a key code to be transmitted from a program storage circuit to arithmetic and register circuit 20 for display. The entire 56 bits are loaded although only two digits of informaton are of interest. The BCD → C instruction allows data input to arithmetic and register circuit 20 from a data storage circuit or other external source such as might be employed with other embodiments of the calculator.

The ROM select and other type six instructions are denoted by the pattern 10000 in instruction bits $I_4 - I_0$. The decoding table for these instructions is shown below.

TABLE OF TYPE SIX INSTRUCTION DECODING

| Circuit Affected | $I_9$ | $I_8$ | $I_7$ | $I_6$ | $I_5$ | $I_4$ | $I_3$ | $I_2$ | $I_1$ | $I_0$ | Instruction |
|---|---|---|---|---|---|---|---|---|---|---|---|
| ROM | 0 | 0 | 0 | 0 | 0 | 1 | 0 | 0 | 0 | 0 | ROM select. One of 8 as specified |
| | | ↓ | | | 0 | 0 | 1 | 0 | 0 | 0 | 0 | in bits 19–17. |
| | 1 | 1 | 1 | 0 | 0 | 1 | 0 | 0 | 0 | 0 | |
| C&T | X | X | X | 0 | 1 | 1 | 0 | 0 | 0 | 0 | Subroutine return |
| | X | X | 0 | 1 | 0 | 1 | 0 | 0 | 0 | 0 | External key code entry to C&T |
| | X | X | 1 | 1 | 0 | 1 | 0 | 0 | 0 | 0 | Keyboard entry |
| DATA STORAGE | 1 | X | 0 | 1 | 1 | 1 | 0 | 0 | 0 | 0 | Send Address from C Register to Data Storage Circuit |
| | 1 | 0 | 1 | 1 | 1 | 1 | 0 | 0 | 0 | 0 | Send Data from C Register Auxiliary Data Storage Circuit |
| | 1 | 0 | 1 | 1 | 1 | 1 | 1 | 0 | 0 | 0 | Send Data from Auxiliary Data Storage Circuit into C Register |

The ROM SELECT instruction allows transfer of control from one ROM to another. Each ROM has a masking option which is programmed to decode bits $I_9 - I_7$. A Select ROM 3 instruction read from ROM 1 will reset the ROE flip-flop 70 in ROM 1 and set the ROE flip-flop 70 in ROM 3. The address is incremented in control and timing circuit 16 as usual. Thus, if Select ROM 3 is in location 197 in ROM 1, the first instruction read from ROM 3 will be location 198.

Figure 30:
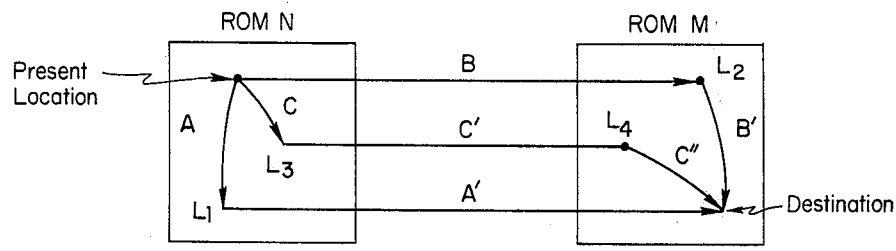
FIG. 30 is a path diagram illustrating the possible transfer paths between ROM'0–7 of FIG. 2.

There are three ways to arrive at a desired address, on a different ROM as shown in FIG. 30. In path AA', a transfer (via an unconditional branch or a jump subroutine) to an address one before the desired address (L1) is executed in ROM N first. Then a ROM select M is given. In BB', the opposite order is shown (first ROM N select, then a transfer). Because the desired transfer location (L1 or L2) may already be occupied by an instruction, a third possibility may be used that is less efficient in states but does not depend on program locations. A transfer to L3 is made, then a ROM select, and then an additional transfer from L4 to the final desired location. With this method, L3 and L4 are overhead states.

Bits $I_6I_5 = 01$ designate a subroutine return (RET). There are eight bits of storage in the 20 eight-bit shift register 58-62 of control and timing circuit 16 for retaining the return address when Jump Subroutine is executed. This address has already been incremented so execution of RET is simply a matter of outputting the address on $I_a$ line 32 at bit times $b_{19}$-$b_{26}$ and also inserting it into the ROM address portion 58 of the shift register. It is also still retained in the return address portion 60.

A key code is entered into control and timing circuit 16 by depressing a key on the keyboard. A key depression is detected by a positive interrogation of status bit 0. During a computation the keyboard is locked out because this status bit would ordinarily not be interrogated until return to the display loop. The actual key depression saves the state of the system counter (which is also the key code) in the key code buffer 56 (see FIG. 4) and also sets status bit 0. Execution of the KEYBOARD ENTRY instruction routes the key code (6 bits) in the key code buffer 56 onto $I_a$ line 32 and into ROM address register 58 at bit times $b_{19}$-$b_{26}$. The most significant two bits $b_{25}$ and $b_{26}$ are set to zero so that a keyboard entry always jumps to one of the first 64 states.

The data storage instructions given at the end of the TABLE OF TYPE SIX INSTRUCTION DECODING are used by auxiliary data storage circuit 25, which contains 10 56 bit shift registers. The first of these instructions alerts auxiliary data storage circuit 25 to listen to BCD line 35 for an address transmitted from the C register of arithmetic and register circuit 20. When an address is transmitted over BCD line 35, the selected shift register in auxiliary data storage circuit 25 is enabled. The other two of these instructions allow the selected register in auxiliary data storage circuit 25 to receive data from or send data to the C register of arithmetic and register circuit 20 over BCD line 35.

Thus, an address type instruction is normally followed by a SEND DATA (i.e., BCD → C Register) or a RECEIVE DATA (i.e., C → BCD) instruction. More than one data transfer can take place with the same register without additional addressing instructions.

Two algorithms used in the calculator will now be discussed to further illustrate the instruction set. The first of these algorithms is a display wait loop, used after a key has been processed and while waiting for another key to be actuated. The second of these algorithms is a floating point multiply operation.

Figure 31:
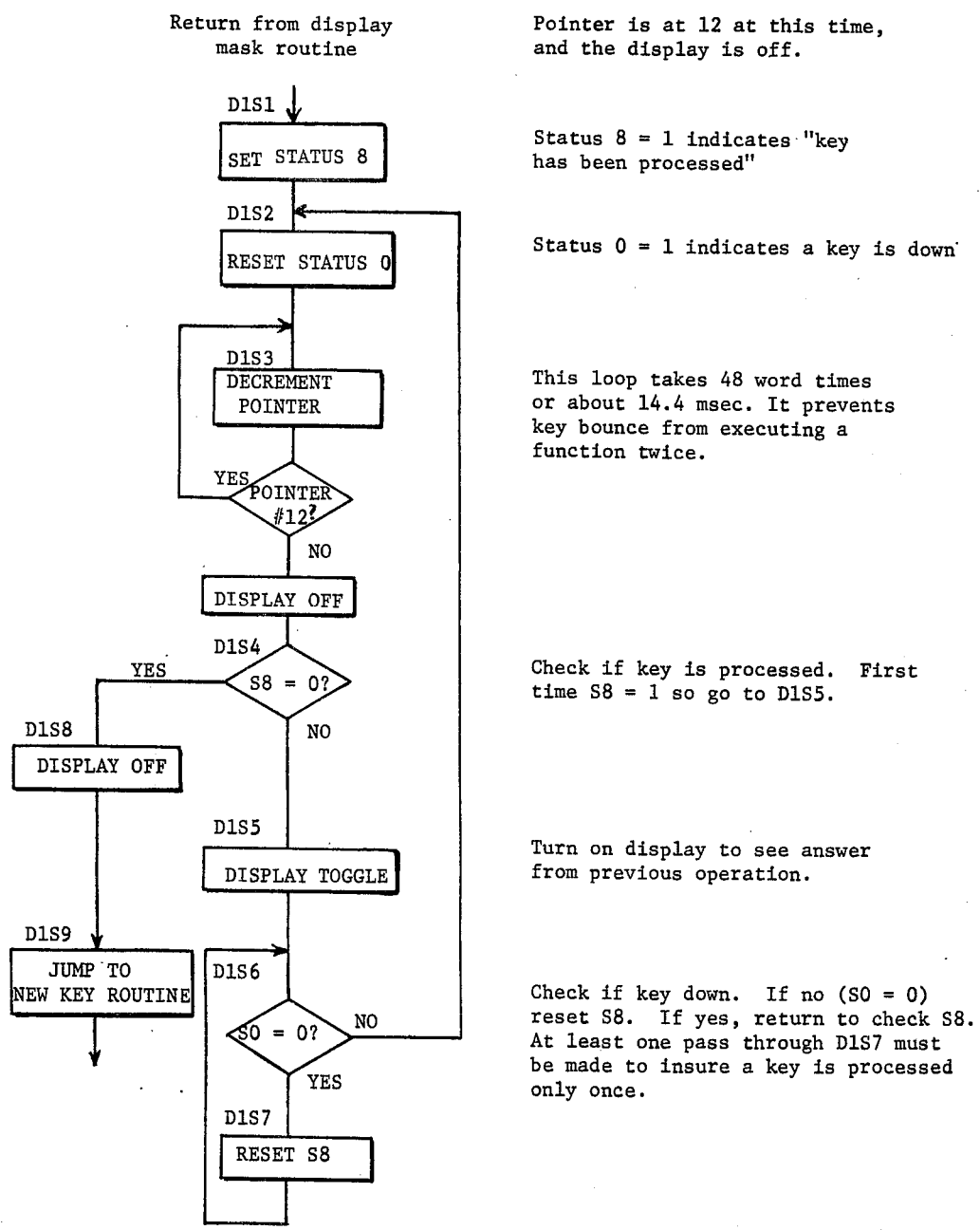
FIG. 31 is a flow diagram of the display wait loop employed in the calculator of FIGS. 1 and 2.

A flow diagram of the display wait loop is shown in FIG. 31. This loop is entered after a keystroke has been processed, register A has been properly loaded with the number to be displayed, and register B contains the display "mask" as discussed above. Two flags or status bits are required. Status bit 0 (S0) is hardwired in control and timing circuit 16 to automatically set whenever a key is down. Status bit 8 (S8) is used in this program to denote the fact that the key which is presently down has already been processed (since a routine may be finished before the key is released). In states D1S1 and D1S2 these two status bits are initialized. Then a loop is used as a time delay (about 14.4 ms.) to wait out any key bounce. In D1S4 status bit 8 (S8) is checked. The first time through the algorithm it must be 1 since it was set in D1S1 to denote the key has been processed. In state D1S5 the display is turned on (actually it is toggled since it must previously have been off; there is no DISPLAY ON instruction). At this time the answer appears to the user. In D1S6 status bit 0 (S0) is checked to see if a key is down. If not (i.e., S0=0), the previous key has been released, and status bit 8 (S8) is reset to 0 D1S7). The machine is now ready to accept a new key since the previous key has been processed and released. The algorithm cycles through D1S6 and D1S7 waiting for a new key. This is the basic wait cycle of the calculator. If S0=1 in D1S6, the key which is down may be the old key (i.e., the one just processed) or a new key. This can be determined upon return to D1s4 where status bit 8 (S8) is checked. If a new key is down (S8=0), execution jumps to D1S8, the display is blanked, and a jump out is made to service the key. A listing of the algorithm is given in the table below.

| LABEL | TABLE OF DISPLAY WAIT LOOP ALGORITHM OPERATION | COMMENT |
|---|---|---|
| D1S1: | 1 → S8 | Set Status 8 |
| D1S2: | 0 → S0 | Reset Status 0 |
| D1S3: | P−1 → P | Decrement pointer, |
|  | IF P NO. 12 | 48 word loop (3 × 16) |
|  | THEN GO TO D1S3 | to wait out key bounce |
|  | DISPLAY OFF |  |
| D1S4: | IF S8 NO. 1 | If key not processed, |
|  | THEN GO TO D1S8: | leave routine |
| D1S5: | DISPLAY TOGGLE | Turn on display |
| D1S6: | IF S0 NO. 1 | If key up, reset |
|  | THEN GO TO D1S7: | S8 and wait |
|  | GO TO D1S2: | Key down. Check if same key |
| D1S7: | 0 → S8 | Indicate key not processed |
|  | GO TO D1S6: | Back to wait for key |
| D1S8: |  | Blank display |
| D1S9: | KEYS → ROM ADDRESS ↓ CONTINUE | Jump to start of program to process key that was down. |

The floating point multiply algorithm multiplies $x$ times $y$, where register C contains $x$ in scientific notation and register D contains $y$ (note that in the calculator register C corresponds to the user's X register and register D to the user's Y register). When the multiply key is depresssed, the wait loop algorithm will jump to a ROM address corresponding to the first step of the multiply algorithm because of the way the instruction KEYS → ROM ADDRESS (state D1S9 in FIG. 31) is executed. The key code actually becomes the next ROM address. At this time the contents of registers A–D are indicated by the following:

| Register A | floating point form of x |
|---|---|
| Register B | display mask for x |
| Register C | scientific form of x |
| Register D | scientific form of y |

The algorithm for executing floating point multiply is given in the table below. The letters in parentheses indicate word select options as follows:

| | | | |
|---|---|---|---|
| P | pointer position | M | mantissa field without sign |
| WP | Up to pointer position | MS | mantissa with sign |
| X | Exponent field | W | entire word |
| XS | Exponent sign | S | mantissa sign only |

TABLE OF FLOATING POINT MULTIPLY ALGORITHM

| LABEL | OPERATION | COMMENT |
|---|---|---|
| MPY1: | STACK →A | Transfer y to A. Drop stack |
| MPY2: | A+C →C(X) | Add exponents to form exponent of answer |
| | A+C →C(S) | Add signs to form sign |
| | IF NO CARRY GO TO MPY3 | of answer. |
| | 0 →C(S) | Correct sign if both negative |
| MPY3: | 0 →B(W) | Clear B, then transfer |
| | A →B(M) | mantissa of y. B(X) = 0. |
| | 0 →A(W) | Prepare A to accumulate product |
| | 2 →P | Set pointer to LSD (Least Significant Digit) Multiplier (Minus 1) |
| MPY4 | P+1 →P | Increment to next digit. |
| MPY5 | A+B →A(W) | Add multiplier mantissa to partial product C(P) times. When C(P)=0, |
| | C−1 →C(P) | |
| | IF NO CARRY GO TO MPY5 | stop and go to next digit |
| | SHIFT RIGHT A(W) | Shift partial product right. |
| | IF P NO. 12 | Check if multiply is complete |
| | THEN GO TO MPY4 | i.e. is pointer at MSD. |
| | IF A(P) >1 | Check if MSD = 0. If so must |
| | THEN GO TO MPY6 | shift left and correct exp. |
| | SHIFT LEFT A(M) | Multiply by 10 and decrement exponent |
| | C−1 →C(X) | |
| MPY6 | C+1 →C(X) | Always do this to correct for factor of 10 too small |
| | A →B(XS) | Duplicate extra product digits |
| | A+B →A(XS) | add 11th digits |
| | IF NO CARRY GO TO MPY7 | If sum less than 10, then done |
| | A+1 →A(M) | If sum more than 10, add 1 |
| | IF NO CARRY GO TO MPY7 | If answer was not all 9's, then done |
| | A+1 →A(P) | If answer was all 9's add 1 |
| | C+1 →C(X) | and increment exponent |
| MPY7 | A EXCHANGE C(M) | Get answer mantissa into C |
| | GO TO MASK 1 | Go to routine to position the answer in A and make the proper mask in B. Then to the DISPLAY program. |

Figure 32:
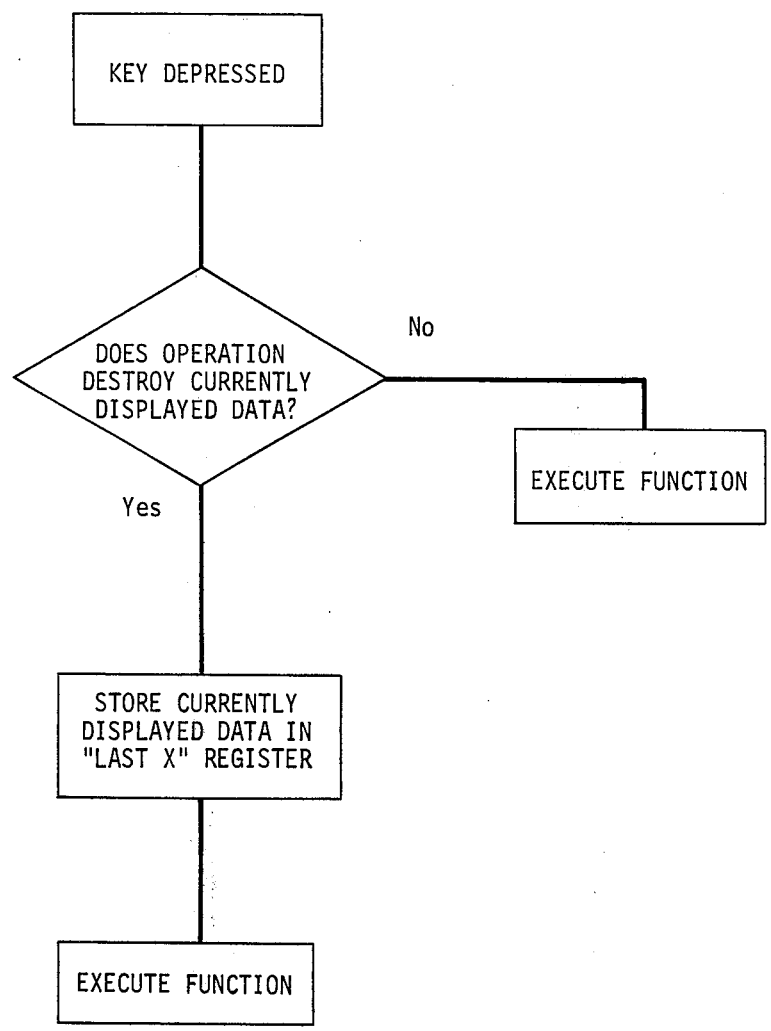
FIG. 32 is a flow diagram of the Last-X function of the calculator of FIGS. 1 and 2.
Figure 33:
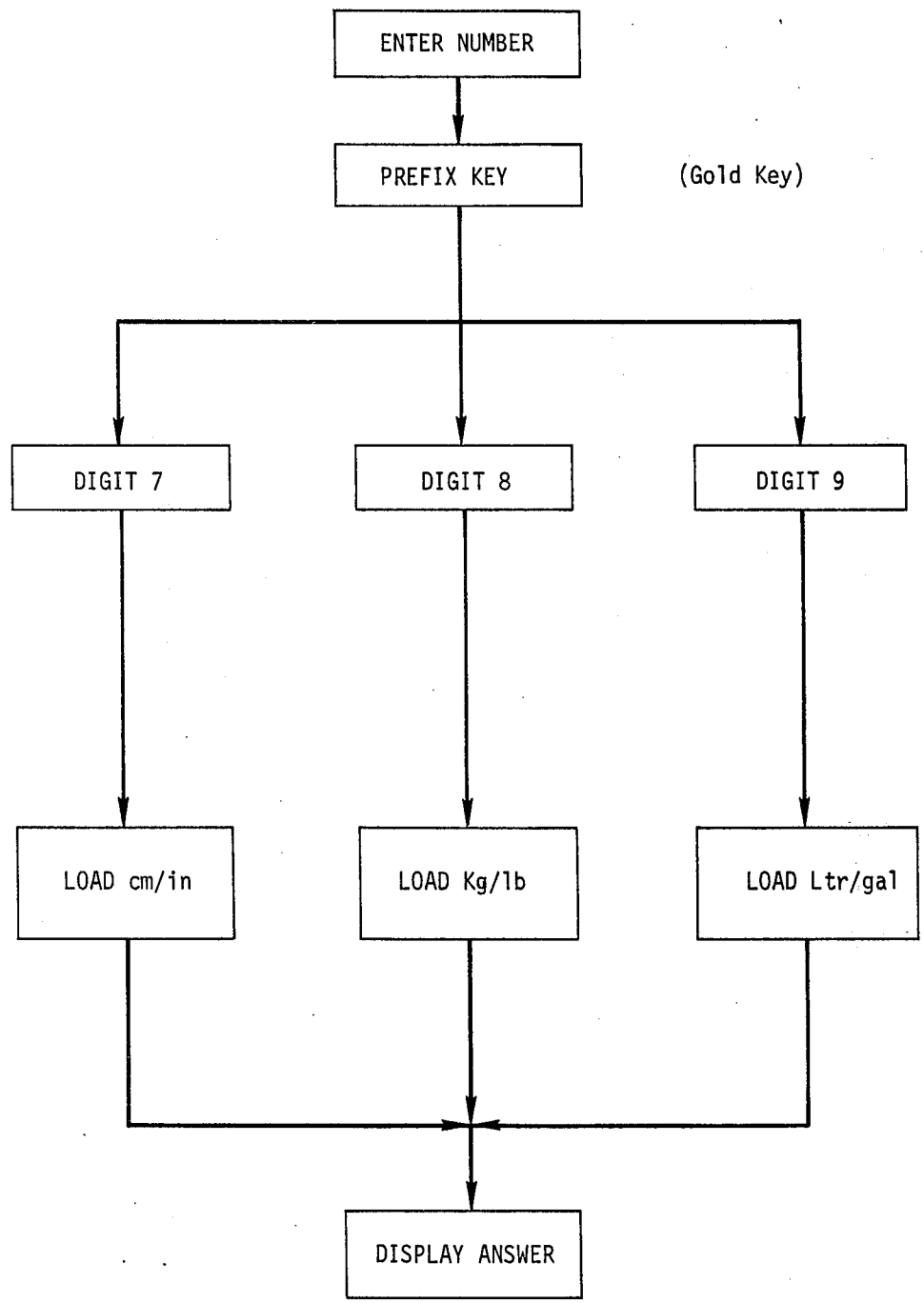
FIG. 33 is a flow diagram of the metric-U.S. conversion constant function of the calcuator of FIGS. 1 and 2.

Referring now to FIGS. 1, 2, and 32, a calculator according to the present invention includes a Last-X function which automatically stores the currently displayed number (for example, the last entered from keyboard input unit 12 or the result of the last function performed by the calculator) in a Last-X shift register of auxiliary data storage circuit 25 whenever the next function to be performed by the calculator would destroy the currently displayed number. That stored number may then be immediately recalled and displayed by simply pressing a prefix key 110 and a Last-X key 12 of the keyboard input unit.

In order to perform this Last-X function, a Last-X subroutine is stored in ROM's 3 and 6, as shown in the detailed listing given below for those ROM's. In ROM 3 this subroutine begins on line 4 and ends on line 91, and in ROM 6 begins on line 99 and then jumps to line 165 and continues through line 187 where the subroutine terminates and the recalled number is then displayed. ROM's 3 and 6 are connected by IS instruction line 28 to auxiliary data storage circuit 25 where the Last-X function to be saved is stored. The latter circuit is connected to Start line 40 to synchronize operation of this circuit with the rest of the calculator and is also connected to arithmetic and register circuit 20 by BCD line 35. Referring to FIG. 32, the Last-X subroutine determines whether the currently displayed number would be destroyed by the next function to be performed by the calculator. The number is automatically stored in the Last-X register of auxiliary data storage circuit 25 if the key code of the next key actuated (i.e. the state of the system counter as described above with reference to FIG. 5) corresponds to any key except SCI/FIX, $x><y$, R↓, STO, RCL, ENTER, CHS, EEX, CLX and any numeric key or alternate function associated a numeric key.

The Last-X function is useful for correcting errors, such as pressing the wrong arithmetic operator key or entering the wrong number. For example, suppose one were performing a long calculation where the number 3 must be subtracted from the number 12, but instead of pressing the subtaction key, the division key is pressed and as a result the number 4 appears in the display. This error can be corrected by pressing the prefix key 110 and the Last-X key 112 to recall the number 3; by pressing the multiplication key to reverse the division and cause the number 12 to appear in the display; by again pressing the pefix key 110 and the Last-X key 112, to again recall the number 3 to the display; and, finally, by pressing the subtraction key to accomplish the operation originally intended. The convenience afforded by the Last-X function will be appreciated even more if instead of a single number like 3, the number destroyed by pressing the wrong function key were, for instance, 3,56789. The Last-X function is also useful for calculations involving the same number more than once. For exaple, sine N is multiplied by cosine N, were N equals 3.15672, by consecutively entering N, pressing the sine key, pressing the prefix key 110 and the Last-X key 112, pressing the cosine key, and pressing the multiplication key to obtain the final result. While the value of N was used twice in this calculation, it was entered into the calculator only once.

This invention also provides built-in conversion constants, accurate to ten digits, for conversion of a number to and from the following metric and U.S. systems of units: inches and centimeters; gallons and liters; and pounds and kilograms. These constants are: 1 inch = 2.540000000 centimeters; 1 pound = 0.453592370 kilograms; and 1 gallon = 3.785411784 liters. With reference to FIGS. 1, 2, and 33, 12 inches are converted to centimeters by consecutively entering the number 12, pressing the prefix key 110, pressing the centimeter/inches key 114 to obtain and display the conversion factor 2.540000000, and pressing the multiplication function key to obtain and display the result 30.48. Other conversion operations are similarly performed.

These conversions are implemented by storing each conversion constant directly in ROM 6, as part of a conversion subroutine. When the appropriate key is pressed, the instructions of this conversion subroutine load the constant into a particular register for appropriate combination with the entered number. Each conversion subroutine is given in detail below on lines 129–163 of the listing for ROM 6.

Figure 34:
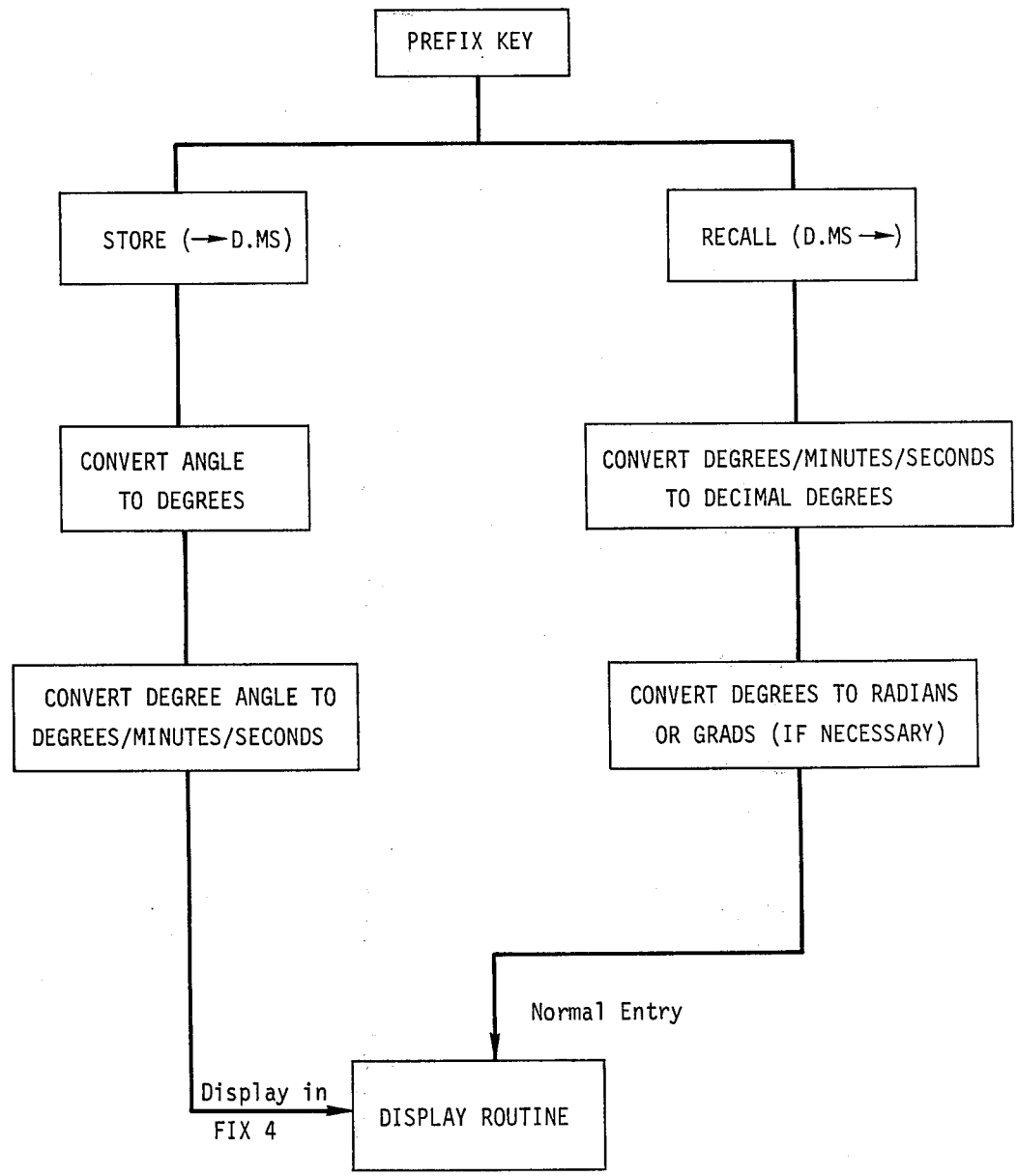
FIG. 34 is a flow diagram of the conversion function between the decimal system and the degrees, minutes, and seconds system of the calculator of FIGS. 1 and 2.
Figure 35:
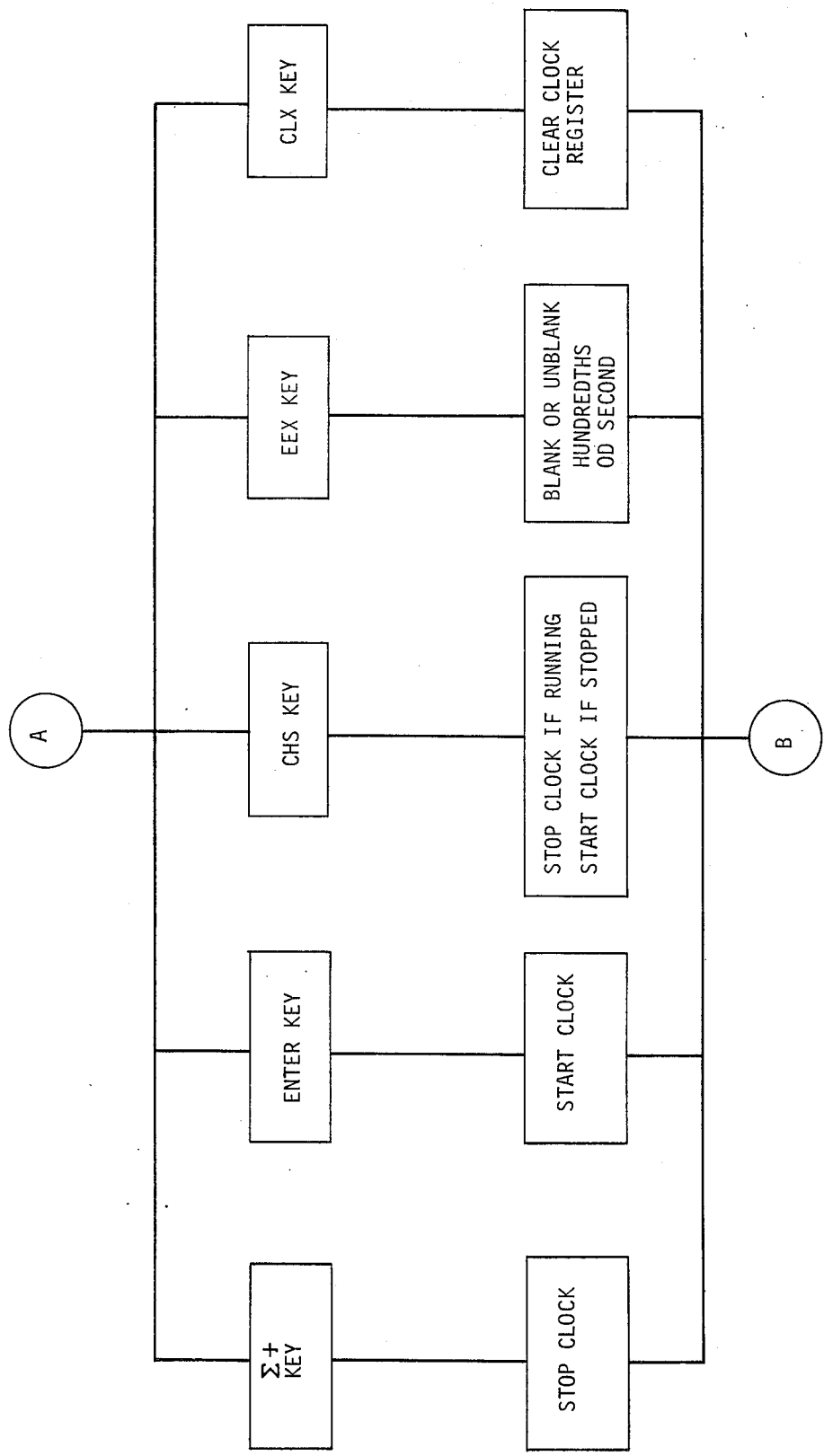
FIG. 35 is a flow diagram showing the keys to be operated in performing functions when the calculator of FIGS. 1 and 2 is in the clock mode.

A similar feature of the present invention permits conversion of numerical quantities expressed in DMS to decimal notation and conversely. With reference to FIGS. 1, 2, and 34, a number expressed in DMS is converted to decimal notation by consecutively pressing the prefix key 110, pressing the DEG key 116 to set the calculaor in the degree mode, entering the digits representing the number one by one as if they were a homogeneous number, pressing the pefix key 110 again, and pressing the D MS$^\rightarrow$ key 118 to compute and display the decimal degrees. The converse operation is accomplished by pressing the prefix key 110, pressing the DEG key 116, entering the decimal argument, pressing the prefix key 110 again, and pressing the $^\rightarrow$ DMS key 122 to compute and display the final result in DMS The D.MS value is displayed in fixed point notation with four digits to the right of the decimal point regardless of what display format the operator may have otherwise specified. This is accomplished by means of a branch which avoids instructions that check the format setting and directs special entry of the DMS value downstream of the display program. Of the four digits shown to the right of the decimal point, the first two represent minutes and the last two represent seconds.

The implementation of the DMS conversion is accomplished by means of a conversion subroutine stored in ROM 0. The instructions relating to this conversion subroutine are given below on lines 1–19 and 80–96 of the listing for ROM 0.

Figure 37:
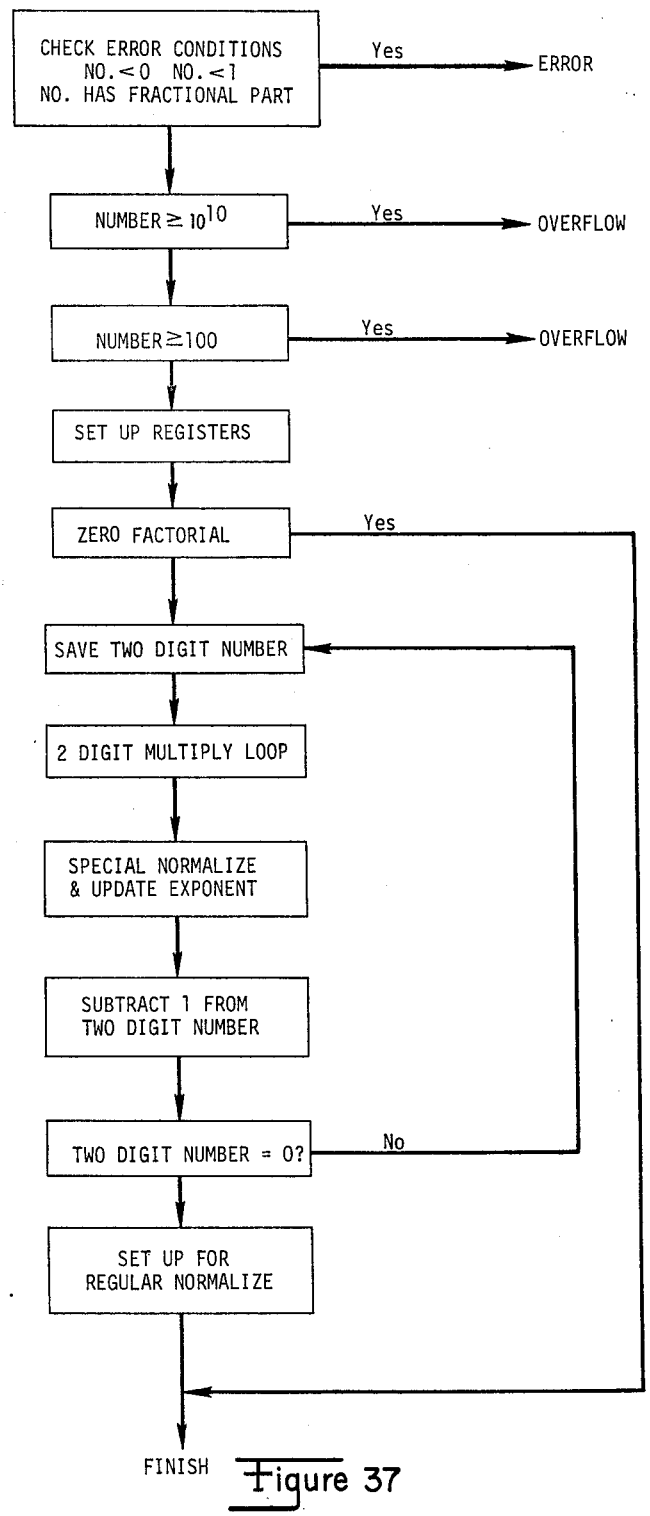
FIG. 37 is a flow diagram of the factorial function of the calculator of FIGS. 1 and 2.

A calculator according to the preferred embodiment of the present invention also calculates factorials and easily solves combination and permutation problems. Factorials can be calculated for positive integers from 0 to 69. For example, the factorial of the number 5 (i.e., 5!) can be calculated as shown in FIGS. 1, 2, and 37 by consecutively entering the number 5 into the calculator, pressing the prefix key 110, and pressing the factorial (n!) key 124 to obtain and display the result 120. This feature is implemented by a subroutine given below on lines 188–201 and 203–243 of the listing for ROM 6.

In the clock mode of the present invention, the calculator operates as a clock or a stopwatch which stores and displays split times. Referring to FIGS. 1, 2, 35 and 36, the clock mode operates as follows: a time of day is entered into the calculator display where the two digits to the left of the decimal point represent hours, the two digits immediately to the right of the decimal point represent minutes, the next two digits represent seconds, and the last two digits represent hundredths of a second. The clock mode is initiated by pressing Recall key (RCL) 118 followed by Enter key 116. Enter key 116 will always start the clock; Change Sign key (CHS) will toggle the clock and make it start or stop (whichever it is not doing when this key is pressed); Enter Exponent key (EEX) will blank or unblank the hundredths of a second portion of the display (whichever is not being done when this key is pressed), although the clock will continue running. The clear X key (CLX)

clears the clock to zero, and the summation key (Σ+) always stops the clock.

Split times are stored by pressng a digit key while the clock is running, which stores the time at which the digit key is pressed in a storage register of the same number as the digit key pressed. If the clock is not running, pressing a digit key will recall the constant (e.g. previously stored split) in the register of the same number as the digit key pressed.

There are many applications for the clock mode of the present invention. For use as a stopwatch the clock is started when a race begins. When the first runner crosses the finish line, the "one" digit key is pressed and his time of arrival is stored in register one, without interrupting clock operation. When the second runner crosses the finish line, the "two" digit key is pressed and his time is stored in register two, and so forth up to ten finishers. At the end of the race, pressing the summation key (Σ+) stops the clock. Pressing the digit keys corresponding to the respective arrivals then recalls the elapsed time for each runner during the race.

Figure 36:
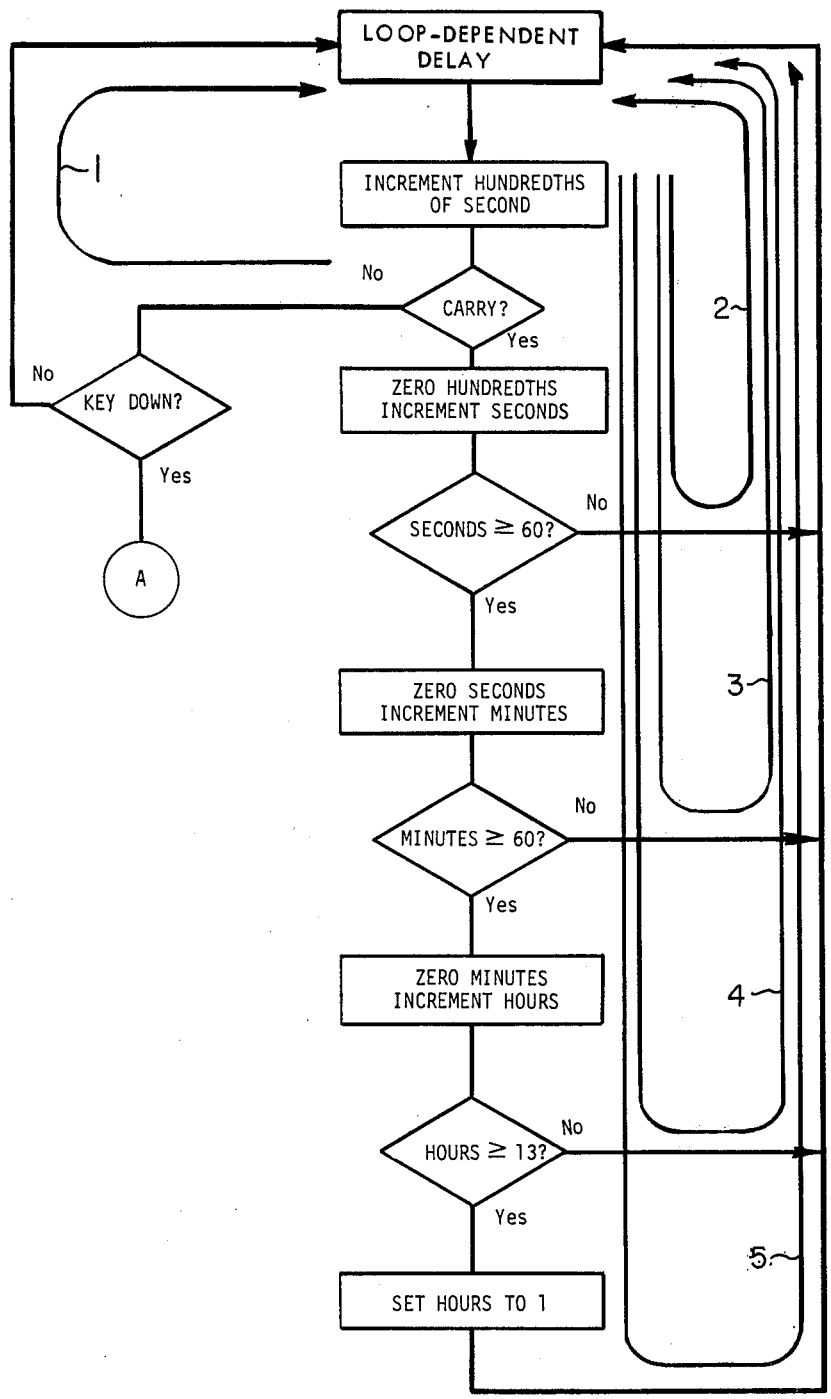
FIG. 36 is a flow diagram of the program clock of the calculator of FIGS. 1 and 2 showing loops depicting hundredths of a second, seconds, minutes and hours.

The clock mode is based on the characteristic that the same number of instructions are executed by the calculator every one-hudredth of a second as controlled by the 800 KHz oscillator 100 shown in FIG. 17. Referring to FIG. 36, loops 1, 2, 3, 4 and 5 each never contain more than 35 instructions which is equal to the time taken to increment the hundredths-of-a-second register. While 35 instructions are required to adhere to the clock standard, many fewer than 35 instructions are required to execute any loop of the program. Therefore, loop execution must include additional instructions equivalent to the difference between 35 instructions and the number of instructions required to execute the loop. However, the amount of delay, i.e. the number of no-op code or other instructions to be added that are unrelated to operation of the clock, is "loop-dependent," since the number of instructions required to execute each loop is different. For example, during execution of loop 1, which is executed when there is no carry in the hudredths-of-a-second register, the status of the keys associated with clock control on the keybord is determined every one hundredth of a second until there is such a carry. During execution of loop 2, a few of the remainder of the 35 instructions available are used to zero the hundreds-of-a-second register and to add one to the seconds register. Every 59 seconds, a few more of the remainder of the 35 available instructions for execution of loop 3 are used to zero the seconds register and add one to the minutes register; every 59 minutes, some more of the remainder of the 35 available instructions for execution of loop 4 are used to zero the minutes register and increment the hours register; and finally every 12 hours a few more of the remainder of the 35 available instructions for execution of loop 5 are used to reset the hours register to one. Thus, every 12 hours the hundreds-of-a-second register is zeroed 360,000 times, the seconds register is zeroed 3,600 times and the minutes register is zeroed 60 times.

Detailed Listing of Routines and Subroutines of Instructions

A complete listing of all of the routines and subroutines of instructions employed by the calculator and of all of the constants employed by these routines and subroutines is given below. All of these routines, subroutines, and constants are stored in ROM's 0–7, as indicated at the top of the first page associated with each ROM. Each line in each ROM is separately numbered in the first column from the left-hand side of the page. This facilitates reference to different parts of the listing. Each address in ROM's 0–7 is represented in octal form in the second column from the left-hand side of the page. The first digit identifies which ROM, and the next three digits represent a nine-bit address (the L preceding these four digits is merely an address identifier). The instruction or constant stored in each address of ROM's 0–7 is represented in binary form in the third column from the left-hand side of the page. Branching addresses are represented in octal form by four digits in the fourth column from the left-hand side of the page. Explanatory comments are given in the remaining columns.

ROM 0

```
0   L00000:  ..1.11.1   -> L0053         PW01  : JSB PW02
1   L00001:  11...1....  -> L6002  ***** TMS5  : SELECT ROM 6
2   L00002:  .1..1.1..1  -> L0112        TMS2  : JSB FRAC
3   L00003:  11..1.111.                         A EXCHANGE B[W]
4   L00004:  11111..11.                         A + 1 -> A[M]
5   L00005:  .1..111.1.                         A -> B[XS]
6   L00006:  11.1111.1.                         A - 1 -> A[XS]
7   L00007:  111...111.                         A + B -> A[W]
8   L00010:  1.111.1.1.                         0 -> A[X]
9   L00011:  111...1..1  -> L0343               JSB NLOP
10  L00012:  111...1..1  -> L0342               JSB NLOP
11  L00013:  1.111.1.1.                         0 -> A[X]
12  L00014:  11..1..1.1  -> L0311               JSB NORM
13  L00015:  .11..1..11  -> L0144               GO TO TMS4
14  L00016:  1.'...1.1..         DNDTZ4:        IF S8 # 1
15  L00017:  .1.1...111  -> L0121                  THEN GO TO DMT2
16  L00020:  1....111.1  -> L0207        TDMS  : JSB MODE
17  L00021:  111.1.111.                         A EXCHANGE C[W]
18  L00022:  .11...111.                         C -> A[W]
19  L00023:  ......1.11  -> L0002               GO TO TMS2
20  L00024:  1.1..1....  -> L5025  ***** PW03  : SELECT ROM 5
21  L00025:  1....111.1  -> L0207        TPL4  : JSB MODE
22  L00026:  111.1.111.                         A EXCHANGE C[W]
23  L00027:  1....1....  -> L4030  *****        SELECT ROM 4
24  L00030:  ..1..1....  -> L1031  ***** RET1  : SELECT ROM 1
```

```
25  L00031:  ..11.1.1..
26  L00032:  ...11...11    -> L0030
27  L00033:  .1..1.1...
28  L00034:  ..11..111.
29  L00035:  1...111...
30  L00036:  ..........
31  L00037:  1.11111...
32  L00040:  111.1.111.
33  L00041:  1..1111..1    -> L0236
34  L00042:  11...11..1    -> L0306
35  L00043:  .1.1...1.1    -> L0242
36  L00044:  11...11?.1    -> L0306
37  L00045:  1.1111111.
38  L00046:  1.11111...
39  L00047:  .11.1111..
40  L00050:  ..1.11.111    -> L0055
41  L00051:  11.111111.
42  L00052:  ..1.11.1.1    -> L0055
43  L00053:  ...1.1..11    -> L0024
44  L00054:  ...1.1....    -> L1055    *****  SQT1
45  L00055:  111.1.111.
46  L00056:  1.....1.1.
47  L00057:  1111...1.11   -> L0362
48  L00060:  ..1111111.
49  L00061:  1111..1..1    -> L0362
50  L00062:  ...1.1.1..
51  L00063:  ..1.11..11    -> L0054
52  L00064:  1.1..1.1..
53  L00065:  .11.1..111    -> L0151
54  L00066:  ..111.1.11    -> L0072
55  L00067:  ..1..1....    -> L1070    *****  TANX
56  L00070:  .11...111.                       SN12
57  L00071:  ..1..1....    -> L1072    *****
58  L00072:  111.1.111.
59  L00073:  .11...111.
60  L00074:  .11111.1.
61  L00075:  .1...11.11    -> L0106
62  L00076:  .11.1.1.1.
63  L00077:  .1...11.11    -> L0106
64  L00100:  ..11..111.
65  L00101:  ......11..
66  L00102:  .1.1.11...
67  L00103:  11.....11.
68  L00104:  .111..1.1.
69  L00105:  111.1.1111    -> L0353
70  L00106:  1.1.1.1...                        MAG3
71  L00107:  .111.1.111    -> L0165
72  L00110:  111.1.111.
73  L00111:  .111...11     -> L0070
74  L00112:  ..11..1.1.                        FRAC
75  L00113:  ......11..
76  L00114:  .1.1.11...
77  L00115:  11.1..1.1.
78  L00116:  1..1111.1.
79  L00117:  11..11..11    -> L0314
80  L00120:  1111111111    -> L9377
81  L00121:  .1..1.1.1.    -> L0112            DMT2
82  L00122:  111...11.1    -> L0343
83  L00123:  ....1.111.
84  L00124:  11..11..1.
85  L00125:  11..1.111.
86  L00126:  .1....111.
87  L00127:  111..1.1.1    -> L0345
88  L00130:  .111...1..
89  L00131:  11..11..1.1   -> L0311
90  L00132:  ..11..111.
91  L00133:  ..11.11...
92  L00134:  .11..11...
93  L00135:  11....11..
94  L00136:  1..1111..1    -> L0236
95  L00137:  1....11..1    -> L0206
96  L00140:  .11111.111    -> L0175
97  L00141:  .1111.1.1.                         RTFG
98  L00142:  ..1111...1
99  L00143:  1.....1111    -> L0203
```

```
TRC1Z1:  IF S3 # 1
             THEN GO TO RET1
         C -> STACK
         0 -> C[W]
         C -> DATA ADDRESS
         NO OPERATION
         DATA -> C
         A EXCHANGE C[W]
         JSB DIV1
         JSB EXCH
         JSB MUL1
         JSB EXCH
         0 -> A[S]
         DATA -> C
         IF C[S] = 0
             THEN GO TO TRC2
         A - 1 -> A[S]
         JSB TRC2
PW02  :  GO TO PW03
SQT1  :  SELECT ROM 1
TRC2  :  A EXCHANGE C[W]
         IF S8 # 1
             THEN GO TO REG9Z4
         0 - C - 1 -> C[S]
         JSB REG9Z4
SQRTZ3:  IF S1 # 1
             THEN GO TO SQT1
         IF S10 # 1
             THEN GO TO TN12
         GO TO MAG1Z1
TANX  :  SELECT ROM 1
SN12  :  C -> A[W]
         SELECT ROM 1
MAG1Z1:  A EXCHANGE C[W]
         C -> A[W]
         C + 1 -> C[XS]
         IF NO CARRY GO TO MAG3
         IF C[X] = 0
             THEN GO TO MAG3
         0 -> C[W]
         0 -> P
         LOAD CONSTANT 5
         12 -> P
         A + C -> C[X]
         IF NO CARRY GO TO MAG4
MAG3  :  IF S10 # 1
             THEN GO TO ROM1
         A EXCHANGE C[W]
         GO TO SN12
FRAC  :  0 -> C[X]
         0 -> P
         LOAD CONSTANT 5
         A - C -> A[X]
         IF A[XS] >= 1
             THEN GO TO FRC1
         GO TO ERR2
DMT2  :  JSB FRAC
         JSB MLP0
         0 -> B[W]
         A EXCHANGE B[WP]
         A EXCHANGE B[W]
         SHIFT LEFT A[W]
         JSB MLP2
         1 -> S7
         JSB NORM
         0 -> C[W]
         LOAD CONSTANT 3
         LOAD CONSTANT 6
         12 -> P
         JSB DIV1
         JSB MOD0
         GO TO FST0
RTFG  :  C + 1 -> C[X]
         C + 1 -> C[P]
         IF NO CARRY GO TO DVML
```

```
100  L00144:  ..11.111.                        TMS4  :  0 -> C[W]
101  L00145:  ..1...11..                                2 -> P
102  L00146:  .1...11...                                LOAD CONSTANT 4
103  L00147:  111.1.111.                                A EXCHANGE C[W]
104  L00150:  .......111  -> L0001                      GO TO TMS5
105  L00151:  ...1.1....  -> L1152  *****  TN12 :      SELECT ROM 1
106  L00152:  .111...1..                        TPOL  :  1 -> S7
107  L00153:  .1...1.1..                                IF S4 # 1
108  L00154:  .111.1111   -> L0163                          THEN GO TO TPL3
109  L00155:  1.1.1.111.                                C + C -> C[W]
110  L00156:  .111.1111.                                A + C -> C[S]
111  L00157:  1..11..11.                                IF A[M] >= 1
112  L00160:  .111.1.11   -> L0162                          THEN GO TO TPL2
113  L00161:  ..1111111.                                0 - C - 1 -> C[S]
114  L00162:  1.1.11..1   -> L0246              TPL2 :  JSB SUB1
115  L00163:  ...1...1..                        TPL3 :  1 -> S1
116  L00164:  ...1.1.111  -> L0025                      GO TO TPL4
117  L00165:  ...1.1....  -> L1166  *****  ROM1 :      SELECT ROM 1
118  L00166:  1....1.1..                        DRG1Z1: IF S8 # 1
119  L00167:  .11.1.1.11  -> L0152                          THEN GO TO TPOL
120  L00170:  1....111.1  -> L0207              DRG0 :  JSB MODE
121  L00171:  ...1...1..                                1 -> S1
122  L00172:  1.1..1.1..                                IF S10 # 1
123  L00173:  ..111.1.11  -> L0072                          THEN GO TO MAG1Z1
124  L00174:  1111..1111  -> L0363                      GO TO REGX
125  L00175:  111.1.111.                        FST0 :  A EXCHANGE C[W]
126  L00176:  .11..1....  -> L3177  *****  FST1 :      SELECT ROM 3
127  L00177:  ..1.11.1.1                        GTFD :  C - 1 -> C[X]
128  L00200:  .1.11.1..1                                C - 1 -> C[X]
129  L00201:  .111...1..                                1 -> S7
130  L00202:  .1.11..1..                        DTFR :  C - 1 -> C[P]
131  L00203:  1.1...1.1..                       DVML :  IF S10 # 1
132  L00204:  1..1111.11  -> L0236                          THEN GO TO DIV1
133  L00205:  1.1...1.11  -> L0242                      GO TO MUL1
134  L00206:  1.1.1..1..                        MOD0 :  0 -> S10
135  L00207:  .111...1..                        MODE :  1 -> S7
136  L00210:  .1..1..1..                                0 -> S4
137  L00211:  .11...1.1.                                1 -> S6
138  L00212:  1.1.1....                                 M -> C
139  L00213:  .11.11111.                                IF C[S] = 0
140  L00214:  1...111.11  -> L0216                          THEN GO TO MOD2
141  L00215:  .1.....1..                                1 -> S4
142  L00216:  .11111111.                        MOD2 :  C + 1 -> C[S]
143  L00217:  1..1...111  -> L0221                      IF NO CARRY GO TO MOD3
144  L00220:  .11..1..1.                                0 -> S6
145  L00221:  ..11..111.                        MOD3 :  0 -> C[W]
146  L00222:  .1111.1.1.                                C + 1 -> C[X]
147  L00223:  ...1.1.1..                                IF S1 # 1
148  L00224:  11......11  -> L0300                          THEN GO TO DEGR
149  L00225:  .1...1.1..                                IF S4 # 1
150  L00226:  111....111  -> L0341                          THEN GO TO RET0
151  L00227:  .1111..1..                                0 -> S7
152  L00230:  .11..1.1..                                IF S6 # 1
153  L00231:  1.....1.11  -> L0202                          THEN GO TO DTFR
154  L00232:  .11...111   -> L0141                      GO TO RTFG
155  L00233:  1.1.1.1.11  -> L0252              ADD3Z1: GO TO ADD3
156  L00234:  1.1...1.1..                       MLDV :  IF S10 # 1
157  L00235:  1.1....1.11 -> L0242                          THEN GO TO MUL1
158  L00236:  1..11....1.                       DIV1 :  1 -> S11
159  L00237:  ....11..1..                       DIV0 :  0 -> S1
160  L00240:  ....1.111.                                0 -> B[W]
161  L00241:  1.1..1.111  -> L0245                      GO TO DIVX
162  L00242:  1.11...1..                        MUL1 :  1 -> S11
163  L00243:  ...11...1..                       MUL0 :  0 -> S1
164  L00244:  ...1.1....  -> L1245  *****  MULX :      SELECT ROM 1
165  L00245:  ...1.1....  -> L1246  *****  DIVX :      SELECT ROM 1
166  L00246:  1.11....1..                       SUB1 :  1 -> S11
167  L00247:  ..1111111.                        SUB0 :  0 - C - 1 -> C[S]
168  L00250:  ....11..1..                       ADD0ZX: 0 -> S1
169  L00251:  ...1.1.1..                                0 -> S2
170  L00252:  ....1.111.                        ADD3 :  0 -> B[W]
171  L00253:  1111111.1.                                A + 1 -> A[XS]
172  L00254:  1111111.1.                                A + 1 -> A[XS]
173  L00255:  .111111.1.                                C + 1 -> C[XS]
174  L00256:  .111111.1.                                C + 1 -> C[XS]
```

```
175   L00257:   ....1...1.1.
176   L00260:   1.11..1.11    -> L0262
177   L00261:   111.1.111.
178   L00262:   111.1...11.
179   L00263:   ..11..11..
180   L00264:   1..11.11.11   -> L0266
181   L00265:   111.1.111.
182   L00266:   1...1..11.
183   L00267:   ...1..1.1.
184   L00270:   1.11111.11    -> L0276
185   L00271:   1.1...111.
186   L00272:   11111.1.1
187   L00273:   ......111.
188   L00274:   1.11111.11    -> L0276
189   L00275:   1.11.1111.    -> L0267
190   L00276:   ...1..1....   -> L1277    *****
191   L00277:   111111111.    -> L0377
192   L00300:   .11..1.1..
193   L00301:   111....111    -> L0341
194   L00302:   .1111..1..
195   L00303:   .1...1.1..
196   L00304:   1.....1.11    -> L0262
197   L00305:   .111111111    -> L0177
198   L00306:   .11.1.1...
199   L00307:   .1..1.1...
200   L00310:   ....11....
201   L00311:   1.11...1..
202   L00312:   ..1..1....    -> L1313    *****
203   L00313:   ..1..1....    -> L1314    *****
204   L00314:   1...1..11.
205   L00315:   1.1...111.
206   L00316:   11111.1.1.
207   L00317:   11..11.111    -> L0315
208   L00320:   1.111.111.
209   L00321:   .11...11..
210   L00322:   ....11....
211   L00323:   1.11.1.1..
212   L00324:   11.11...11    -> L0330
213   L00325:   1.1.1.111.
214   L00326:   .111...1..
215   L00327:   1..111..11    -> L0234
216   L00330:   ..1..1.1..    -> L1331    *****
217   L00331:   11....11..
218   L00332:   11.1.1111.    -> L0323
219   L00333:   1.11.1.1..
220   L00334:   11111..111    -> L0371
221   L00335:   1.11...1..
222   L00336:   .111.1.1..
223   L00337:   11..1.1111    -> L0313
224   L00340:   1.111...1.
225   L00341:   ....11....
226   L00342:   ....1.1.1.
227   L00343:   11..11..1.
228   L00344:   1.1...111.
229   L00345:   1.1...11..
230   L00346:   111...111.
231   L00347:   .....111.
232   L00350:   .1..11.11.
233   L00351:   111..11.11    -> L0346
234   L00352:   ....11....
235   L00353:   ..11..111.
236   L00354:   .1111....1.
237   L00355:   1.1...1.1.
238   L00356:   ..11.11111    -> L0067
239   L00357:   .11.1..111    -> L0151
240   L00360:   ...1.1.1..
241   L00361:   .11111.11     -> L0176
242   L00362:   111.1.111.
243   L00363:   .11..111.
244   L00364:   .1.11...1.
245   L00365:   .1..111....
246   L00366:   ..11..111.
247   L00367:   1.1111....
248   L00370:   .11111.111    -> L2175
```

```
              IF A >= C[X]
                THEN GO TO ADD4
            A EXCHANGE C[W]
ADD4    :   A EXCHANGE C[M]
            IF C[M] = 0
                THEN GO TO ADD5
            A EXCHANGE C[W]
ADD5    :   B EXCHANGE C[M]
ADD6    :   IF A >= C[X]
                THEN GO TO ADD7
ADD8    :   SHIFT RIGHT B[W]
            A + 1 -> A[X]
            IF B[W] = 0
                THEN GO TO ADD7
            GO TO ADD8
ADD7    :   SELECT ROM 1
ERR2Z1  :   GO TO ERR2
DSGR    :   IF S6 # 1
                THEN GO TO RET0
            0 -> S7
            IF S4 # 1
                THEN GO TO DTFR
            GO TO GTFD
EXCH    :   STACK -> A
            C -> STACK
            RETURN
NORM    :   1 -> S11
            SELECT ROM 1
PII2    :   SELECT ROM 1
FRC1    :   B EXCHANGE C[M]
FRC2    :   SHIFT RIGHT B[W]
            A + 1 -> A[X]
            IF NO CARRY GO TO FRC2
            0 -> A[W]
            6 -> P
            RETURN
PII4    :   IF S11 # 1
                THEN GO TO PIRT
            C + C -> C[W]
            1 -> S7
            GO TO MLDV
PIRT    :   SELECT ROM 1
PII4Z1  :   12 -> P
            GO TO PII4
RETNZ1  :   IF S11 # 1
                THEN GO TO RTRN
            1 -> S11
            IF S7 # 1
                THEN GO TO PII2
            0 -> S11
RET0    :   RETURN
MLOP    :   0 -> B[W]
MLP0    :   A EXCHANGE B[WP]
            SHIFT RIGHT B[W]
MLP2    :   10 -> P
MLP3    :   A + B -> A[W]
            P - 1 -> P
            IF P # 4
                THEN GO TO MLP3
            RETURN
MAG4    :   0 -> C[W]
            C + 1 -> C[P]
            IF S10 # 1
                THEN GO TO TANX
            GO TO TN12
REG9    :   IF S1 # 1
                THEN GO TO FST1
REG9Z4  :   A EXCHANGE C[W]
REGX    :   0 -> C[W]
            C - 1 -> C[P]
            C -> DATA ADDRESS
            0 -> C[W]
            C -> DATA
            GO TO FST0
```

```
249  L00371:  ..11.1.1..                    RTN4 :  IF S3 # 1
250  L00372:  1111....11  -> L0360                    THEN GO TO REG9
251  L00373:  1.1..1.1..                            IF S10 # 1
252  L00374:  1111111.11  -> L0376                    THEN GO TO RET5
253  L00375:  1....1....  -> L4376   *****  RET4 :  SELECT ROM 4
254  L00376:  1.1..1....  -> L5377   *****  RET5 :  SELECT ROM 5
255  L00377:  .1...1....  -> L2400   *****  ERR2 :  SELECT ROM 2
```

ROM 1

```
 0   L1000:  1...11111.                            B EXCHANGE C[S]
 1   L1001:  1111..1111  -> L1363                  GO TO TAN13
 2   L1002:  11..1.111.                    TAN15 : A EXCHANGE B[W]
 3   L1003:  ..11.....1  -> L1060                  JSB TNM11
 4   L1004:  1.11111...                            DATA -> C
 5   L1005:  111.1.111.                            A EXCHANGE C[W]
 6   L1006:  ..11.....1  -> L1060                  JSB TNM11
 7   L1007:  1.11111...                            DATA -> C
 8   L1010:  111.1.111.                            A EXCHANGE C[W]
 9   L1011:  1..1.1.1..                    TANX :  IF S9 # 1
10   L1012:  ....11..11  -> L1014                    THEN GO TO TAN16
11   L1013:  111.1.111.                            A EXCHANGE C[W]
12   L1014:  .1.1.1.1..                    TAN16 : IF S5 # 1
13   L1015:  ...11.1.11  -> L1032                    THEN GO TO ASN12
14   L1016:  ...111111.                            IF C[S] >= 1
15   L1017:  ...1...111  -> L1021                    THEN GO TO TAN17
16   L1020:  1...1..1..                            0 -> S8
17   L1021:  ..11.1111.                    TAN17 : 0 -> C[S]
18   L1022:  1.1..11..1  -> L1246                  JSB DIV11
19   L1023:  1..1111...                    ASN11 : C -> DATA
20   L1024:  1.1...1.1  -> L1245                   JSB MPY11
21   L1025:  1..11...1  -> L1230                   JSB ADD10
22   L1026:  ..1.11.1.1  -> L1055                  JSB SQT11
23   L1027:  1.11111...                            DATA -> C
24   L1030:  .....1....  -> L0031   *****          SELECT ROM 0
25   L1031:  111.1.111.                    ASN1Z0: A EXCHANGE C[W]
26   L1032:  1.1..11..1  -> L1246   ASN12 :        JSB DIV11
27   L1033:  1.1..1.1..                            IF S10 # 1
28   L1034:  11.11.1.11  -> L1332                    THEN GO TO RTN12
29   L1035:  1.111.111.                    ATN11 : 0 -> A[W]
30   L1036:  11111...1.                            A + 1 -> A[P]
31   L1037:  .1..1..11.                            A -> B[M]
32   L1040:  111.1..11.                            A EXCHANGE C[M]
33   L1041:  .1.11.1.1.                    ATN12 : C - 1 -> C[X]
34   L1042:  1.1..1.1..                            SHIFT RIGHT B[WP]
35   L1043:  .11.111.1.                            IF C[XS] = 0
36   L1044:  ..1....111  -> L1041                    THEN GO TO ATN12
37   L1045:  1.11..1..1                    ATN13 : SHIFT RIGHT A[WP]
38   L1046:  .1111.1.1.                            C + 1 -> C[X]
39   L1047:  ..1..1.111  -> L1045                  IF NO CARRY GO TO ATN13
40   L1050:  1.11..111.                            SHIFT RIGHT A[W]
41   L1051:  1.1...111.                            SHIFT RIGHT B[W]
42   L1052:  1.1111....                            C -> DATA
43   L1053:  1...1.111.                    ATN14 : B EXCHANGE C[W]
44   L1054:  .1...11.11  -> L1106                  GO TO ATN18
45   L1055:  1...1.111.                    SQT11 : B EXCHANGE C[W]
46   L1056:  .1....11..                            4 -> P
47   L1057:  11.1111.11  -> L1336                  GO TO SQT14
48   L1060:  1.1111....                    TNM11 : C -> DATA
49   L1061:  111.1.111.                            A EXCHANGE C[W]
50   L1062:  ..11.1..1.                            IF C[P] = 0
51   L1063:  ..11.1.111  -> L1065                    THEN GO TO TNM12
52   L1064:  ..1.1.111.                            0 - C -> C[W]
53   L1065:  .11...111.                    TNM12 : C -> A[W]
54   L1066:  ..1....1.1                            B -> C[X]
55   L1067:  11..1.1111  -> L1313                  GO TO ADD15
56   L1070:  ....1..111  -> L1011   TANXZ0:        GO TO TANX
57   L1071:  ......1...  -> L0072   *****  TPLOZJ: SELECT ROM 0
58   L1072:  .1.1.1.1..                    SIM12 : IF S5 # 1
59   L1073:  ...111.111  -> L1035                    THEN GO TO ATN11
60   L1074:  ..1111111.                            0 - C - 1 -> C[S]
61   L1075:  111.11111.                            A EXCHANGE C[S]
62   L1076:  ...1.1111  -> L1023                   GO TO ASN11
63   L1077:  1.1..1..1.                    ATN15 : SHIFT RIGHT B[WP]
64   L1100:  11.111111.                    ATN16 : A - 1 -> A[S]
```

|     |         |             |          |        |         |                         |
| --- | ------- | ----------- | -------- | ------ | ------- | ----------------------- |
| 65  | L1101:  | ..11111111  | -> L1077 |        |         | IF NO CARRY GO TO ATN15 |
| 66  | L1102:  | .11111111.  |          |        |         | C + 1 -> C[S]           |
| 67  | L1103:  | 11..11..1.  |          |        |         | A EXCHANGE B[WP]        |
| 68  | L1104:  | .111.1..1.  |          |        |         | A + C -> C[WP]          |
| 69  | L1105:  | 11..1.111.  |          |        |         | A EXCHANGE B[W]         |
| 70  | L1106:  | .1..1.111.  |          |        | ATN18 : | A -> B[W]               |
| 71  | L1107:  | 11.1.1..1.  |          |        |         | A - C -> A[WP]          |
| 72  | L1110:  | .1......11  | -> L1100 |        |         | IF NO CARRY GO TO ATN16 |
| 73  | L1111:  | 111.1.111.  |          |        |         | A EXCHANGE C[W]         |
| 74  | L1112:  | 1.11111...  |          |        |         | DATA -> C               |
| 75  | L1113:  | 1..1.111.   |          |        |         | SHIFT RIGHT C[W]        |
| 76  | L1114:  | 111.11111.  |          |        |         | A EXCHANGE C[S]         |
| 77  | L1115:  | 11..1.111.  |          |        |         | A EXCHANGE B[W]         |
| 78  | L1116:  | .1...1..1.  |          |        |         | SHIFT LEFT A[WP]        |
| 79  | L1117:  | 1.1111....  |          |        |         | C -> DATA               |
| 80  | L1120:  | 111111111.  |          |        |         | A + 1 -> A[S]           |
| 81  | L1121:  | 111111111.  |          |        |         | A + 1 -> A[S]           |
| 82  | L1122:  | ..1.1.1111  | -> L1053 |        |         | IF NO CARRY GO TO ATN14 |
| 83  | L1123:  | ..11..111.  |          |        |         | 0 -> C[W]               |
| 84  | L1124:  | ....1.1.1.  |          |        |         | 0 -> B[X]               |
| 85  | L1125:  | 1.11.1.11.  |          |        |         | SHIFT RIGHT A[MS]       |
| 86  | L1126:  | 1.11..1..1  | -> L1262 |        |         | JSB DIV14               |
| 87  | L1127:  | 11.11...1.  |          |        |         | A - 1 -> A[P]           |
| 88  | L1130:  | 1.11111...  |          |        |         | DATA -> C               |
| 89  | L1131:  | .1.....11.. |          |        |         | 4 -> P                  |
| 90  | L1132:  | 1.1..1..1   | -> L1244 |        | ATN17 : | JSB PQ013               |
| 91  | L1133:  | .11...11..  |          |        |         | 6 -> P                  |
| 92  | L1134:  | 1..11.11.1  | -> L1233 |        |         | JSB PMU11               |
| 93  | L1135:  | 1.....11..  |          |        |         | 8 -> P                  |
| 94  | L1136:  | 1..11.11.1  | -> L1233 |        |         | JSB PMU11               |
| 95  | L1137:  | ..1...11..  |          |        |         | 2 -> P                  |
| 96  | L1140:  | 1....11...  |          |        |         | LOAD CONSTANT 8         |
| 97  | L1141:  | 1.1...11..  |          |        |         | 10 -> P                 |
| 98  | L1142:  | 1..11.11.1  | -> L1233 |        |         | JSB PMU11               |
| 99  | L1143:  | 1...111.1   | -> L1216 |        |         | JSB ATCD1               |
| 100 | L1144:  | 1..111.11.1 | -> L1233 |        |         | JSB PMU11               |
| 101 | L1145:  | 11..11...1  | -> L1314 |        |         | JSB ATC1                |
| 102 | L1146:  | .1....111.  |          |        |         | SHIFT LEFT A[W]         |
| 103 | L1147:  | 1..11.11.1  | -> L1233 |        |         | JSB PMU11               |
| 104 | L1150:  | ..1...111.  |          |        |         | B -> C[W]               |
| 105 | L1151:  | 11.1.11.1   | -> L1313 |        |         | JSB ADD15               |
| 106 | L1152:  | 11..11...1  | -> L1314 |        | TAN12 : | JSB ATC1                |
| 107 | L1153:  | 1.1.1.111.  |          |        |         | C + C -> C[W]           |
| 108 | L1154:  | 1.1..1.111. |          |        |         | IF S10 # 1              |
| 109 | L1155:  | .111.1.111  | -> L1165 |        |         | THEN GO TO ROM0         |
| 110 | L1156:  | 1..1.1..    |          |        |         | IF S9 # 1               |
| 111 | L1157:  | .111.1.111  | -> L1165 |        |         | THEN GO TO ROM0         |
| 112 | L1160:  | 111.1.111.  |          |        |         | A EXCHANGE C[W]         |
| 113 | L1161:  | ...1111111. |          |        |         | 0 - C - 1 -> C[S]       |
| 114 | L1162:  | 1..11.1..1  | -> L1232 |        |         | JSB ADD11               |
| 115 | L1163:  | 11..11...1  | -> L1314 |        |         | JSB ATC1                |
| 116 | L1164:  | 1.1.1.111.  |          |        |         | C + C -> C[W]           |
| 117 | L1165:  | .....1....  | -> L0166 | *****  | ROM0 :  | SELECT ROM 0            |
| 118 | L1166:  | 11.....1    | -> L1314 |        | LPI11 : | JSB ATC1                |
| 119 | L1167:  | 1.1.1.111.  |          |        |         | C + C -> C[W]           |
| 120 | L1170:  | 1.1.1.111.  |          |        |         | C + C -> C[W]           |
| 121 | L1171:  | 1.1.1.1.1   | -> L1225 |        |         | JSB RTN11               |
| 122 | L1172:  | 1.1.1.111.  |          |        |         | C + C -> C[W]           |
| 123 | L1173:  | 111.1.11.1  | -> L1353 |        |         | JSB PRE11               |
| 124 | L1174:  | 11..11...1  | -> L1314 |        |         | JSB ATC1                |
| 125 | L1175:  | 1..1.11..   |          |        |         | 10 -> P                 |
| 126 | L1176:  | 1..111...1  | -> L1234 |        |         | JSB PQ011               |
| 127 | L1177:  | 1...111..1  | -> L1216 |        |         | JSB ATCD1               |
| 128 | L1200:  | 1.....11..  |          |        |         | 8 -> P                  |
| 129 | L1201:  | 1..111.1.1  | -> L1235 |        |         | JSB PQ012               |
| 130 | L1202:  | ..1...11..  |          |        |         | 2 -> P                  |
| 131 | L1203:  | 1....11...  |          |        |         | LOAD CONSTANT 8         |
| 132 | L1204:  | .11...11..  |          |        |         | 6 -> P                  |
| 133 | L1205:  | 1..111...1  | -> L1234 |        |         | JSB PQ011               |
| 134 | L1206:  | .1....11..  |          |        |         | 4 -> P                  |
| 135 | L1207:  | 1..111...1  | -> L1234 |        |         | JSB PQ011               |
| 136 | L1210:  | 1..111...1  | -> L1234 |        |         | JSB PQ011               |
| 137 | L1211:  | 11.1.111.   |          |        |         | A EXCHANGE B[W]         |
| 138 | L1212:  | 1..1.111.   |          |        |         | SHIFT RIGHT C[W]        |
| 139 | L1213:  | 11.1..11.   |          |        |         | 13 -> P                 |
| 140 | L1214:  | .1.1.11...  |          |        |         | LOAD CONSTANT 5         |

```
141  L1215:  111111..11  -> L1374                    GO TO TAN14
142  L1216:  .11...11..                      ATCD1 : 6 -> P
143  L1217:  1.....11...                             LOAD CONSTANT 8
144  L1220:  ..11..11...                             LOAD CONSTANT 6
145  L1221:  .1.1.11...                              LOAD CONSTANT 5
146  L1222:  ...1..11...                             LOAD CONSTANT 2
147  L1223:  ..1...11..                              LOAD CONSTANT 4
148  L1224:  1..1.11...                              LOAD CONSTANT 9
149  L1225:  ...1.1.1..                      RTN11 : IF S1 # 1
150  L1226:  11.11.1.11  -> L1332                          THEN GO TO RTN12
151  L1227:  .....11....                             RETURN
152  L1230:  1.111.111.                      ADD10 : 0 -> A[W]
153  L1231:  11111...1.                              A + 1 -> A[P]
154  L1232:  .....1....  -> L0233    *****  ADD11 : SELECT ROM 0
155  L1233:  .1...1....  -> L2234    *****  PMU11 : SELECT ROM 2
156  L1234:  .1....111.                      PQ011 : SHIFT LEFT A[W]
157  L1235:  1.1..1.11.                      PQ012 : SHIFT RIGHT B[MS]
158  L1236:  1...1.111.                              B EXCHANGE C[W]
159  L1237:  1.1....111  -> L1241                    GO TO PQ016
160  L1240:  .11111111.                      PQ015 : C + 1 -> C[S]
161  L1241:  11...111..                      PQ016 : A - B -> A[W]
162  L1242:  1.1....11   -> L1240                    IF NO CARRY GO TO PQ015
163  L1243:  111...111.                              A + B -> A[W]
164  L1244:  .1..1....   -> L2245    *****  PQ013 : SELECT ROM 2
165  L1245:  .1..1....   -> L2246    *****  MPY11 : SELECT ROM 2
166  L1246:  .1.1..1.1.                      DIV11 : A - C -> C[X]
167  L1247:  .1...1....  -> L2250    *****          SELECT ROM 2
168  L1250:  .1111...1.                      SQT15 : C + 1 -> C[P]
169  L1251:  11.1..111.                      SQT16 : A - C -> A[W]
170  L1252:  1.1.1..11   -> L1250                    IF NO CARRY GO TO SQT15
171  L1253:  1111..111.                              A + C -> A[W]
172  L1254:  .1....111.                              SHIFT LEFT A[W]
173  L1255:  .....111..                              P - 1 -> P
174  L1256:  1..1.1..1.                      SQT17 : SHIFT RIGHT C[WP]
175  L1257:  ....1.11..                              IF P # 0
176  L1260:  1.1.1..111  -> L1251                          THEN GO TO SQT15
177  L1261:  ..11.1.111  -> L1065                    GO TO TNM12
178  L1262:  .1111...1.                      DIV14 : C + 1 -> C[P]
179  L1263:  11...1.11.                      DIV15 : A - B -> A[MS]
180  L1264:  1.11..1.11  -> L1262                    IF NO CARRY GO TO DIV14
181  L1265:  111..1.11.                              A + B -> A[MS]
182  L1266:  .1..1.11..                              SHIFT LEFT A[MS]
183  L1267:  .....111..                      DIV16 : P - 1 -> P
184  L1270:  .....1.11..                             IF P # 0
185  L1271:  1.11.1111   -> L1263                          THEN GO TO DIV15
186  L1272:  ..11.1.111  -> L1065                    GO TO TNM12
187  L1273:  .....111..                      SQT12 : P - 1 -> P
188  L1274:  111..1.11.                              A + B -> A[MS]
189  L1275:  11.11.1111  -> L1333                    IF NO CARRY GO TO SQT18
190  L1276:  .....1....  -> L0277    *****          SELECT ROM 0
191  L1277:  .1.1111.1.                      ADD12 : C - 1 -> C[XS]
192  L1300:  .1.1111.1.                              C - 1 -> C[XS]
193  L1301:  1.111.1.1.                              0 -> A[X]
194  L1302:  11.1.1111.                              A - C -> A[S]
195  L1303:  1..111111.                              IF A[S] >= 1
196  L1304:  11...11.11  -> L1306                          THEN GO TO ADD13
197  L1305:  .1...1....  -> L2306    *****          SELECT ROM 2
198  L1306:  1......11.                      ADD13 : IF A >= B[M]
199  L1307:  11..1.1.11  -> L1312                          THEN GO TO ADD14
200  L1310:  ..1111111.                              0 - C - 1 -> C[S]
201  L1311:  11..1.111.                              A EXCHANGE B[W]
202  L1312:  11....111.                      ADD14 : A - B -> A[W]
203  L1313:  .1...1....  -> L2314    *****  ADD15 : SELECT ROM 2
204  L1314:  ..11..111.                      ATC1  : 0 -> C[W]
205  L1315:  1.11..11..                              11 -> P
206  L1316:  .111.11...                              LOAD CONSTANT 7
207  L1317:  1....11...                              LOAD CONSTANT 8
208  L1320:  .1.1.11...                              LOAD CONSTANT 5
209  L1321:  ..11.11...                              LOAD CONSTANT 3
210  L1322:  1..1.11...                              LOAD CONSTANT 9
211  L1323:  1....11...                              LOAD CONSTANT 8
212  L1324:  ....1.11..                              LOAD CONSTANT 1
213  L1325:  .11..11...                              LOAD CONSTANT 6
214  L1326:  ..11.11...                              LOAD CONSTANT 3
215  L1327:  .1.1.11...                              LOAD CONSTANT 5
216  L1330:  .....1....  -> L0331    *****          SELECT ROM 0
```

```
217  L1331:  ....11....
218  L1332:  .....1....  -> L0333
219  L1333:  111....1.1.
220  L1334:  11.1111.11  -> L1336
221  L1335:  .1.11...1.
222  L1336:  .11111111.
223  L1337:  ....1.11..
224  L1340:  1.111.1111  -> L1273
225  L1341:  111.1.1.1.
226  L1342:  1.111.1.1.
227  L1343:  ...11...1.
228  L1344:  111..11.11  -> L1346
229  L1345:  1.11..111.
230  L1346:  1..1..111.
231  L1347:  1...1.1.1.
232  L1350:  ..11..1.1.
233  L1351:  11....11..
234  L1352:  1.1.111.11  -> L1256
235  L1353:  .1...1....  -> L2354
236  L1354:  1.1...1.1.
237  L1355:  1.1..1.1.
238  L1356:  .1.111111.
239  L1357:  111.11..11  -> L1354
240  L1360:  .111..1.1.
241  L1361:  11...1..1.
242  L1362:  1...11..1.
243  L1363:  ..1...111.
244  L1364:  11.111111.
245  L1365:  111.111.11  -> L1356
246  L1366:  111.11111.
247  L1367:  1.11111...
248  L1370:  111.1.111.
249  L1371:  .....1111.
250  L1372:  ......1.11  -> L1002
251  L1373:  .1....111.
252  L1374:  111.11..1.
253  L1375:  1.1111....
254  L1376:  1.1...1.1.
255  L1377:  .1.111111.
```

ROM 2

```
 0  L2000:  11...1....  -> L6001
 1  L2001:  11..11111.
 2  L2002:  111111111..
 3  L2003:  1..1.1.11.
 4  L2004:  .1...1.1..
 5  L2005:  ....1.1.11  -> L2022
 6  L2006:  .11.1.1...
 7  L2007:  1.1..11..1  -> L2246
 8  L2010:  .11...111.
 9  L2011:  1....1.1..
10  L2012:  .1....1.11  -> L2192
11  L2013:  1.111.111.
12  L2014:  11.1...11.
13  L2015:  .......11   -> L2000
14  L2016:  1.11..111.
15  L2017:  .1.111111.
16  L2020:  .......11   -> L2000
17  L2021:  .11111111.
18  L2022:  .1..1.111.
19  L2023:  1..1.11..1  -> L2226
20  L2024:  11.11...1.
21  L2025:  ...1..111   -> L2021
22  L2026:  11..11..1.
23  L2027:  111..1111.
24  L2030:  .......111  -> L2001
25  L2031:  .111..11..
26  L2032:  .11.11.1.1  -> L2155
27  L2033:  1......11.
28  L2034:  1..111.1.1  -> L2235
29  L2035:  1..1..11..
30  L2036:  1..111...1  -> L2234
31  L2037:  1111111..1  -> L2376
32  L2040:  1.1...11..
33  L2041:  1..111...1  -> L2234
```

```
        RETURN
*****   RTN12 : SELECT ROM 0
        SQT18 : A + B -> A[X]
                IF NO CARRY GO TO SQT14
                C - 1 -> C[P]
        SQT14 : C + 1 -> C[S]
                IF P # 0
                    THEN GO TO SQT12
                A EXCHANGE C[X]
                0 -> A[X]
                IF C[P] >= 1
                    THEN GO TO SQT13
                SHIFT RIGHT A[W]
        SQT13 : SHIFT RIGHT C[W]
                B EXCHANGE C[X]
                0 -> C[X]
                12 -> P
                GO TO SQT17
*****   PRE11 : SELECT ROM 2
        TAN18 : SHIFT RIGHT B[WP]
                SHIFT RIGHT B[WP]
        TAN19 : C - 1 -> C[S]
                IF NO CARRY GO TO TAN13
                A + C -> C[WP]
                A - B -> A[WP]
                B EXCHANGE C[WP]
        TAN13 : B -> C[W]
                A - 1 -> A[S]
                IF NO CARRY GO TO TAN19
                A EXCHANGE C[S]
                DATA -> C
                A EXCHANGE C[W]
                IF B[S] = 0
                    THEN GO TO TAN15
                SHIFT LEFT A[W]
        TAN14 : A EXCHANGE C[WP]
                C -> DATA
                SHIFT RIGHT B[WP]
                C - 1 -> C[S]
*****   ERR21 : SELECT ROM 6
        LN24  : A EXCHANGE B[S]
                A + 1 -> A[S]
                SHIFT RIGHT C[MS]
                SHIFT LEFT A[WP]
                GO TO LN25
        XTY22 : STACK -> A
                JSB MPY21
        XTY21 : C -> A[W]
                IF S8 # 1
                    THEN GO TO EXP21
        LN22  : 0 -> A[W]
                A - C -> A[M]
                IF NO CARRY GO TO ERR21
                SHIFT RIGHT A[W]
                C - 1 -> C[S]
                IF NO CARRY GO TO ERR21
        LN25  : C + 1 -> C[S]
        LN26  : A -> B[W]
                JSB ECA22
                A - 1 -> A[P]
                IF NO CARRY GO TO LN25
                A EXCHANGE B[WP]
                A + B -> A[S]
                IF NO CARRY GO TO LN24
                7 -> P
                JSB PQ023
                8 -> P
                JSB PMU22
                9 -> P
                JSB PMU21
                JSB LNCD3
                10 -> P
                JSB PMU21
```

```
34   L2042:  .11111.1.1  -> L2175
35   L2043:  1.11..11..
36   L2044:  1..111...1  -> L2234
37   L2045:  11.11111.1  -> L2337
38   L2046:  1...111...1 -> L2234
39   L2047:  1.111..1.1  -> L2271
40   L2050:  1..111...1  -> L2234
41   L2051:  1111.11..1  -> L2366
42   L2052:  111.1.111.
43   L2053:  .1.1..111.
44   L2054:  .....11.1.
45   L2055:  ...1.111111 -> L2057
46   L2056:  .1.1..111.
47   L2057:  11..1.111.
48   L2060:  .....111..
49   L2061:  .1....111.
50   L2062:  ...11.11..
51   L2063:  ..11....11  -> L2060
52   L2064:  111.1.111.
53   L2065:  .11.11111.
54   L2066:  ..111...11  -> L2070
55   L2067:  ..111..11.
56   L2070:  .1111.1.1.
57   L2071:  1.11..11..
58   L2072:  11...1.1.1  -> L2305
59   L2073:  1..1.1.1..
60   L2074:  .....11.11  -> L2006
61   L2075:  .1.1.1.1..
62   L2076:  1..1.1..11  -> L2224
63   L2077:  1111.11..1  -> L2366
64   L2100:  1.1..111.1  -> L2247
65   L2101:  1...1.1..11 -> L2224
66   L2102:  1111.11..1  -> L2366
67   L2103:  111.11...1  -> L2354
68   L2104:  1.111..1.1  -> L2271
69   L2105:  1.11..11..
70   L2106:  1..11.11.1  -> L2233
71   L2107:  11.11111.1  -> L2337
72   L2110:  1.1...11..
73   L2111:  1..11.11.1  -> L2233
74   L2112:  .11111.1.1  -> L2175
75   L2113:  1..1...11.
76   L2114:  1..11.11.1  -> L2233
77   L2115:  1111111..1  -> L2376
78   L2116:  1.....11..
79   L2117:  1..11.11.1  -> L2233
80   L2120:  1..11.11.1  -> L2233
81   L2121:  1..11.11.1  -> L2233
82   L2122:  .11...11..
83   L2123:  1.1111..1.
84   L2124:  11.1..11..
85   L2125:  1...1.111.
86   L2126:  111.1.111.
87   L2127:  .11..11...
88   L2130:  1...111.11  -> L2216
89   L2131:  ..1...1.1.
90   L2132:  .1.1111.11  -> L2136
91   L2133:  11111.1.1.
92   L2134:  1..1111.1.
93   L2135:  11...1.11   -> L2302
94   L2136:  11...1.11.
95   L2137:  .1.11..111  -> L2131
96   L2140:  111..1.11.
97   L2141:  .1....111.
98   L2142:  .1.11.1.1.
99   L2143:  .1.111..11  -> L2134
100  L2144:  1.11..111.
101  L2145:  ..11.1..1.
102  L2146:  111.1.1.1.
103  L2147:  .11.11111.
104  L2150:  .11.11..11  -> L2154
105  L2151:  11..1.111.
106  L2152:  11....111.
107  L2153:  ..111.111.
108  L2154:  1.11..111.
```

```
             JSB LNCD2
             11 -> P
             JSB PMU21
             JSB LNCD1
             JSB PMU21
             JSB LNC2
             JSB PMU21
             JSB LNC10
             A EXCHANGE C[W]
             A - C -> C[W]
             IF B[XS] = 0
                 THEN GO TO LN27
             A - C -> C[W]
LN27  :      A EXCHANGE B[W]
LN28  :      P - 1 -> P
             SHIFT LEFT A[W]
             IF P # 1
                 THEN GO TO LN28
             A EXCHANGE C[W]
             IF C[S] = 0
                 THEN GO TO LN29
             0 - C - 1 -> C[M]
LN29  :      C + 1 -> C[X]
             11 -> P
             JSB MPY27
             IF S9 # 1
                 THEN GO TO XTY22
             IF S5 # 1
                 THEN GO TO RTN21
             JSB LNC10
             JSB MPY22
             GO TO RTN21
EXP21 :      JSB LNC10
             JSB PRE21
             JSB LNC2
             11 -> P
             JSB PO021
             JSB LNCD1
             10 -> P
             JSB PO021
             JSB LNCD2
             9 -> P
             JSB PO021
             JSB LNCD3
             8 -> P
             JSB PO021
             JSB PO021
             JSB PO021
             6 -> P
             0 -> A[WP]
             13 -> P
             B EXCHANGE C[W]
             A EXCHANGE C[W]
             LOAD CONSTANT 6
             GO TO EXP23
PRE23 :      IF S2 # 1
                 THEN GO TO PRE24
             A + 1 -> A[X]
PRE29 :      IF A[XS] >= 1
                 THEN GO TO PRE27
PRE24 :      A - B -> A[MS]
             IF NO CARRY GO TO PRE23
             A + B -> A[MS]
             SHIFT LEFT A[W]
             C - 1 -> C[X]
             IF NO CARRY GO TO PRE29
PRE25 :      SHIFT RIGHT A[W]
             0 -> C[WP]
             A EXCHANGE C[X]
PRE26 :      IF C[S] = 0
                 THEN GO TO PRE28
             A EXCHANGE B[W]
             A - B -> A[W]
             0 - C - 1 -> C[W]
PRE28 :      SHIFT RIGHT A[W]
```

```
109  L2155:  1...1.111.
110  L2156:  ..11..111.
111  L2157:  .1.11..11.
112  L2160:  ..1..1.1..
113  L2161:  .111.11.11  -> L2166
114  L2162:  .1...11...
115  L2163:  .1111..11.
116  L2164:  .1111..111  -> L2171
117  L2165:  .11..11...
118  L2166:  ...11.11..
119  L2167:  .111.1.111  -> L2165
120  L2170:  1..1..111.
121  L2171:  1..1..111..
122  L2172:  ...1..1.1.
123  L2173:  1..1.1..11  -> L2224
124  L2174:  ....11....
125  L2175:  .111..11..
126  L2176:  ..11.11...
127  L2177:  ..11.11...
128  L2200:  .....11...
129  L2201:  1....11...
130  L2202:  .1.1.11...
131  L2203:  .....11...
132  L2204:  1..1..11..
133  L2205:  111.1.1.11  -> L2352
134  L2206:  1..1.11..1  -> L2226
135  L2207:  11111...1.
136  L2210:  .1..1.111.
137  L2211:  .1.111111.
138  L2212:  1....11.11  -> L2206
139  L2213:  1.11.1..1.
140  L2214:  111.1.111.
141  L2215:  .1...1.11.
142  L2216:  111.1.111.
143  L2217:  11.111111.
144  L2220:  1...1...11  -> L2210
145  L2221:  11..1.111.
146  L2222:  11111...1.
147  L2223:  11..11...1  -> L2314
148  L2224:  ...1..1...  -> L1225  *****
149  L2225:  1.11.1..1.
150  L2226:  11.111111.
151  L2227:  1..1.1.111  -> L2225
152  L2230:  1.1111111.
153  L2231:  111...111.
154  L2232:  ....1r....
155  L2233:  ..1..1....  -> L1234  *****
156  L2234:  1.11..111.
157  L2235:  1...1.111.  -> L2240
158  L2236:  1.1.....11  -> L2240
159  L2237:  111...111.
160  L2240:  .1.111111.
161  L2241:  1..1111111  -> L2237
162  L2242:  111.1.111.
163  L2243:  .1...1.11.
164  L2244:  111.1.111.
165  L2245:  .11.11.111  -> L2155
166  L2246:  ..11..11..
167  L2247:  .111..1.1.
168  L2250:  .1.1.1111.
169  L2251:  1.1.1.1111  -> L2253
170  L2252:  ..1.11111.
171  L2253:  11..1..11.
172  L2254:  1.111.111.
173  L2255:  11..1.11..
174  L2256:  11...1.111  -> L2305
175  L2257:  ...11..11.
176  L2260:  1.11.11.11  -> L2266
177  L2261:  ....1.1.1.
178  L2262:  ........11  -> L2300
179  L2263:  1.1.1.....  -> L5264  *****
180  L2264:  11.11.1111  -> L2333
181  L2265:  ..........
182  L2266:  1...11..1.
183  L2267:  111.1..11.
```

```
PQ023 : B EXCHANGE C[W]
        0 -> C[W]
        C - 1 -> C[M]
        IF S2 # 1
           THEN GO TO PQ028
        LOAD CONSTANT 4
        C + 1 -> C[M]
        IF NO CARRY GO TO PQ024
PQ027 : LOAD CONSTANT 6
PQ028 : IF P # 1
           THEN GO TO PQ027
        SHIFT RIGHT C[M]
PQ024 : SHIFT RIGHT C[W]
NRM26 : IF S2 # 1
           THEN GO TO RTN21
        RETURN
LNCD2 : 7 -> P
LNC6  : LOAD CONSTANT 3
        LOAD CONSTANT 3
        LOAD CONSTANT 0
LNC7  : LOAD CONSTANT 8
        LOAD CONSTANT 5
        LOAD CONSTANT 0
        LOAD CONSTANT 9
        GO TO LNC9
EXP29 : JSB ECA22
        A + 1 -> A[P]
EXP22 : A -> B[W]
        C - 1 -> C[S]
        IF NO CARRY GO TO EXP29
        SHIFT RIGHT A[WP]
        A EXCHANGE C[W]
        SHIFT LEFT A[MS]
EXP23 : A EXCHANGE C[W]
        A - 1 -> A[S]
        IF NO CARRY GO TO EXP22
        A EXCHANGE B[W]
        A + 1 -> A[P]
        JSB NRM21
RTN21 : SELECT ROM 1
ECA21 : SHIFT RIGHT A[WP]
ECA22 : A - 1 -> A[S]
        IF NO CARRY GO TO ECA21
        0 -> A[S]
        A + B -> A[W]
        RETURN
PQ021 : SELECT ROM 1
PMU21 : SHIFT RIGHT A[W]
PMU22 : B EXCHANGE C[W]
        GO TO PMU24
PMU23 : A + B -> A[W]
PMU24 : C - 1 -> C[S]
        IF NO CARRY GO TO PMU23
        A EXCHANGE C[W]
        SHIFT LEFT A[MS]
        A EXCHANGE C[W]
        GO TO PQ023
MPY21 : 3 -> P
MPY22 : A + C -> C[X]
DIV21 : A - C -> C[S]
        IF NO CARRY GO TO DIV22
        0 - C -> C[S]
DIV22 : A EXCHANGE B[M]
        0 -> A[W]
        IF P # 12
           THEN GO TO MPY27
        IF C[M] >= 1
           THEN GO TO DIV23
        IF S1 # 1
           THEN GO TO ERR21
        SELECT ROM 5
        GO TO NRM25
        NO OPERATION
DIV23 : B EXCHANGE C[WP]
        A EXCHANGE C[M]
```

```
184  L2270:  ...1.1....   -> L1271    *****       SELECT ROM 1
185  L2271:  1...1..1..              LNC2  :     0 -> S0
186  L2272:  .11..11...                          LOAD CONSTANT 6
187  L2273:  1...1.11...                         LOAD CONSTANT 9
188  L2274:  ..11..11...                         LOAD CONSTANT 3
189  L2275:  ...1.11...                          LOAD CONSTANT 1
190  L2276:  .1...11...                          LOAD CONSTANT 4
191  L2277:  .111.11...                          LOAD CONSTANT 7
192  L2300:  ...1.11...                          LOAD CONSTANT 1
193  L2301:  111..11.11    -> L2346              GO TO LNC8
194  L2302:  11111..11.              PRE27 :     A + 1 -> A[M]
195  L2303:  .11..1..11    -> L2144              IF NO CARRY GO TO PRE25
196  L2304:  111...111.              MPY26 :     A + B -> A[W]
197  L2305:  .1.11...1.              MPY27 :     C - 1 -> C[P]
198  L2306:  11...1..11    -> L2304              IF NO CARRY GO TO MPY26
199  L2307:  1.11..111.              MPY28 :     SHIFT RIGHT A[W]
200  L2310:  ....1111..                          P + 1 -> P
201  L2311:  11.11.11..                          IF P # 13
202  L2312:  11...1.111    -> L2305                  THEN GO TO MPY27
203  L2313:  .1111.1.1.              NRM20 :     C + 1 -> C[X]
204  L2314:  1.1111111.              NRM21 :     0 -> A[S]
205  L2315:  11....11..                          12 -> P
206  L2316:  ....1.111.                          0 -> B[W]
207  L2317:  1..11...1.              NRM23 :     IF A[P] >= 1
208  L2320:  11.1.11.11    -> L2326                  THEN GO TO NRM24
209  L2321:  .1....111.                          SHIFT LEFT A[W]
210  L2322:  .1.11.1.1.                          C - 1 -> C[X]
211  L2323:  1..11..111.                         IF A[W] >= 1
212  L2324:  1..111111     -> L2317                  THEN GO TO NRM23
213  L2325:  ..11..111.                          0 -> C[W]
214  L2326:  .1..1.1.1.              NRM24 :     A -> B[X]
215  L2327:  111...111.                          A + B -> A[W]
216  L2330:  1..111111.                          IF A[S] >= 1
217  L2331:  11...11111    -> L2307                  THEN GO TO MPY28
218  L2332:  111.1..11.                          A EXCHANGE C[M]
219  L2333:  .11...111.              NRM25 :     C -> A[W]
220  L2334:  ....1.111.                          0 -> B[W]
221  L2335:  11....11..              NRM27 :     12 -> P
222  L2336:  .1111.1.11    -> L2172              GO TO NRM26
223  L2337:  1..1..11..              LNCD1 :     9 -> P
224  L2340:  ..11.11...                          LOAD CONSTANT 3
225  L2341:  ...1.11...                          LOAD CONSTANT 1
226  L2342:  .....11...                          LOAD CONSTANT 0
227  L2343:  ....1.11..                          LOAD CONSTANT 1
228  L2344:  .111.11...                          LOAD CONSTANT 7
229  L2345:  1..1.11...                          LOAD CONSTANT 9
230  L2346:  1....11...              LNC8  :     LOAD CONSTANT 8
231  L2347:  .....11...                          LOAD CONSTANT 0
232  L2350:  .1.1.11...                          LOAD CONSTANT 5
233  L2351:  .1.1.11...                          LOAD CONSTANT 5
234  L2352:  ...11.11...             LNC9  :     LOAD CONSTANT 3
235  L2353:  11.111.111    -> L2335              GO TO NRM27
236  L2354:  111.1.111.              PRE21 :     A EXCHANGE C[W]
237  L2355:  .1..1.111.                          A -> B[W]
238  L2356:  .11....11.                          C -> A[M]
239  L2357:  1.1.111.1.                          C + C -> C[XS]
240  L2360:  .1.1111.11    -> L2136              IF NO CARRY GO TO PRE24
241  L2361:  .111111.1.                          C + 1 -> C[XS]
242  L2362:  1.11..111.              PRE22 :     SHIFT RIGHT A[W]
243  L2363:  .1111.1.1.                          C + 1 -> C[X]
244  L2364:  1111..1.11    -> L2362              IF NO CARRY GO TO PRE22
245  L2365:  .11..11111    -> L2147              GO TO PRE26
246  L2366:  ..11..111.              LNC10 :     0 -> C[W]
247  L2367:  11....11..                          12 -> P
248  L2370:  ..1..11...                          LOAD CONSTANT 2
249  L2371:  ..11.11...                          LOAD CONSTANT 3
250  L2372:  ......11..                          LOAD CONSTANT 0
251  L2373:  ...1..11..                          LOAD CONSTANT 2
252  L2374:  .1.1.11...                          LOAD CONSTANT 5
253  L2375:  1......111    -> L2201              GO TO LNC7
254  L2376:  .1.1..11..              LNCD3 :     5 -> P
255  L2377:  .111111.11    -> L2176              GO TO LNC6
```

ROM 3

```
 0  L3000:  1....1....   -> L4001   *****  PIK2   :  SELECT ROM 4
 1  L3001:  .........                              NO OPERATION
 2  L3002:  .1..1.1.11   -> L3112           FIX1   :  GO TO FIX2
 3  L3003:  .1.11..111   -> L3131           EXPN   :  GO TO EXP1
 4  L3004:  .1.11.1.11   -> L3132           LNNN   :  GO TO LNN24
 5  L3005:  .........                              NO OPERATION
 6  L3006:  .1....1.11   -> L3104           INVV   :  GO TO INV1
 7  L3007:  .1.......   -> L2010   *****  LEXX   :  SELECT ROM 2
 8  L3010:  1....1....   -> L4011   *****  PERC   :  SELECT ROM 4
 9  L3011:  11...1....   -> L6012   *****  RHOS   :  SELECT ROM 6
10  L3012:  .11..11.11   -> L3146           ROHL   :  GO TO RCL8
11  L3013:  .11.1...11   -> L3150           STOR   :  GO TO STP8
12  L3014:  11..1.1...                      ROLD   :  DOWN ROTATE
13  L3015:  .111111111   -> L3177                   GO TO FST1ZX
14  L3016:  .11..1.1..                      EXC1   :  STACK -> A
15  L3017:  .1..1.1...                              C -> STACK
16  L3020:  .111111.11   -> L3176                   GO TO FSTXZJ
17  L3021:  ..11111111   -> L3077           FST2Z5 :  GO TO ENT2
18  L3022:  11111.111.                      DIG6   :  A + 1 -> A[W]
19  L3023:  11111.111.                      DIG5   :  A + 1 -> A[W]
20  L3024:  11111.111.                      DIG4   :  A + 1 -> A[W]
21  L3025:  ...11.1.11   -> L3032                   IF NO CARRY GO TO DIG3
22  L3026:  1....1....   -> L4027   *****  ADDD   :  SELECT ROM 4
23  L3027:  1....111.1   -> L3207           FIX3   :  JSB DSP0Z4
24  L3030:  .1....111.                              SHIFT LEFT A[W]
25  L3031:  .1.1..1.11   -> L3122                   GO TO FMT1
26  L3032:  11111.111.                      DIG3   :  A + 1 -> A[W]
27  L3033:  11111.111.                      DIG2   :  A + 1 -> A[W]
28  L3034:  11111.111.                      DIG1   :  A + 1 -> A[W]
29  L3035:  ....11....                              RETURN
30  L3036:  1....1....   -> L4037   *****  MULT   :  SELECT ROM 4
31  L3037:  ..11.1....                      TKRA   :  KEYS -> ROM ADDRESS
32  L3040:  1...1.1..                       SIG1   :  0 -> S8
33  L3041:  1....1....   -> L4042   *****           SELECT ROM 4
34  L3042:  ..1.....11   -> L3040           SIGP   :  GO TO SIG1
35  L3043:  ..11..11..                      DCPT   :  3 -> P
36  L3044:  ....11....                      DIG0   :  RETURN
37  L3045:  1....1....   -> L4046   *****  DVID   :  SELECT ROM 4
38  L3046:  ..1..1.111   -> L3045           DIVD   :  GO TO DVID
39  L3047:  .1.1...1..                      TAN2   :  1 -> S5
40  L3050:  .11..1..1   -> L3144            TANG   :  JSB SAV9
41  L3051:  .1....1.11   -> L3102                   GO TO SQT1Z4
42  L3052:  .1..11..11   -> L3114           COSS   :  GO TO COS2
43  L3053:  ..1..11111   -> L3047           SINN   :  GO TO TAN2
44  L3054:  1....1....   -> L4055   *****  TPOL   :  SELECT ROM 4
45  L3055:  .........                              NO OPERATION
46  L3056:  .11....1.1   -> L3141           SQAR   :  JSB SAVE
47  L3057:  .1...1..11   -> L3110                   GO TO MUL0
48  L3060:  .........                              NO OPERATION
49  L3061:  .....1....   -> L0062   *****  SQT2   :  SELECT ROM 0
50  L3062:  11111.111.                      DIG9   :  A + 1 -> A[W]
51  L3063:  11111.111.                      DIG8   :  A + 1 -> A[W]
52  L3064:  11111.111.                      DIG7   :  A + 1 -> A[W]
53  L3065:  ...1..1.11   -> L3022                   IF NO CARRY GO TO DIG6
54  L3066:  1....1....   -> L4067   *****  SUBT   :  SELECT ROM 4
55  L3067:  .........                              NO OPERATION
56  L3070:  1.1..11..1   -> L3246           CLRX   :  JSB OFL2
57  L3071:  1......111   -> L3201                   GO TO FST2ZX
58  L3072:  1.111.1111   -> L3273           EEXX   :  GO TO EEX2
59  L3073:  11.....111   -> L3301           CHS1   :  GO TO CHS2
60  L3074:  ....1.111.                      CLOK   :  0 -> B[W]
61  L3075:  111..1....   -> L7076   *****           SELECT ROM 7
62  L3076:  .1..1.1...                      ENT1   :  C -> STACK
63  L3077:  1.1..1111.   -> L3247           ENT2   :  JSB OFL3
64  L3100:  1......111   -> L3201                   GO TO FST2ZX
65  L3101:  .11....1.1   -> L3141           SQT0   :  JSB SAVE
66  L3102:  1..11.1...                      SQT1Z4 :  0 -> S9
67  L3103:  ..11...111   -> L3051           SQT1   :  GO TO SQT2
68  L3104:  .11....1.1   -> L3141           INV1   :  JSB SAVE
69  L3105:  1.111.111.                              0 -> A[W]
70  L3106:  11111...1.                              A + 1 -> A[P]
71  L3107:  .1..1..111   -> L3111                   IF NO CARRY GO TO DIV0
72  L3110:  1....1....   -> L4111   *****  MUL0   :  SELECT ROM 4
```

```
 73   L3111:  1....1....  -> L4112   *****  DIV0   :  SELECT ROM 4
 74   L3112:  1..11..1..                  FIX2   :  0 -> S9
 75   L3113:  ...1.11111  -> L3027                   GO TO FIX3
 76   L3114:  .11..1...1  -> L3144        COS2   :  JSB SAV9
 77   L3115:  1..1...1..                  COS2Z4 :  1 -> S9
 78   L3116:  .1.1..1..                   TRECZ4 :  1 -> S5
 79   L3117:  ..11..111   -> L3061                   GO TO SQT2
 80   L3120:  .1....111.                  FRMT   :  SHIFT LEFT A[W]
 81   L3121:  11111.111.                             A + 1 -> A[W]
 82   L3122:  .1....111.                  FMT1   :  SHIFT LEFT A[W]
 83   L3123:  ..1.1.1...                             C EXCHANGE M
 84   L3124:  111.1.1.1.                             A EXCHANGE C[X]
 85   L3125:  ..1.1.1...                             C EXCHANGE M
 86   L3126:  .111..1.11  -> L3162        FSTPZ4 :  GO TO FSTP
 87   L3127:  ..........                             NO OPERATION
 88   L3130:  ..........                             NO OPERATION
 89   L3131:  1...1..1..                  EXP1   :  0 -> S8
 90   L3132:  1..1..1..                   LNN2Z4 :  1 -> S9
 91   L3133:  .11....1.1  -> L3141                   JSB SAVE
 92   L3134:  ...1...1..                  NTY1Z4 :  1 -> S2
 93   L3135:  .....11111  -> L3007                   GO TO LEXX
 94   L3136:  1...111..1  -> L3207        SCI2Z4 :  JSB DSP0Z4
 95   L3137:  .1.1....11  -> L3120                   GO TO FRMT
 96   L3140:  ..11..1...                  SAV1   :  1 -> S3
 97   L3141:  1.1.1..1..                  SAVE   :  0 -> S10
 98   L3142:  11...1....  -> L6143   *****          SELECT ROM 6
 99   L3143:  11...1....  -> L6144   *****  SAV2   :  SELECT ROM 6
100   L3144:  ...1...1..                  SAV9   :  1 -> S1
101   L3145:  .11....111  -> L3141                   GO TO SAVE
102   L3146:  1..1..1...                  RCL0   :  1 -> S9
103   L3147:  .11.1..111  -> L3151                   GO TO STR1
104   L3150:  1..11..1..                  STR0   :  0 -> S9
105   L3151:  ..1.....1..                 STR1   :  1 -> S2
106   L3152:  1....111.1  -> L3207                   JSB DSP0Z4
107   L3153:  .111.1.1.1  -> L3165                   JSB CHK0
108   L3154:  .11...11.1  -> L3143                   JSB SAV2
109   L3155:  1..1.1.1..                             IF S9 # 1
110   L3156:  .111...111  -> L3161                       THEN GO TO STR2
111   L3157:  1111.11..1  -> L3366                   JSB FST4
112   L3160:  .111111.11  -> L3176                   GO TO FSTXZJ
113   L3161:  1.1111....                  STR2   :  C -> DATA
114   L3162:  .111.1.1..                  FSTP   :  IF S7 # 1
115   L3163:  ..11111111  -> L3077                       THEN GO TO ENT2
116   L3164:  .111111111  -> L3177                   GO TO FST1ZX
117   L3165:  ........11..                CHK0   :  0 -> P
118   L3166:  .1..11...1.                            IF A[P] >= 1
119   L3167:  1111111111  -> L3377                       THEN GO TO RETNZX
120   L3170:  .111..1.11  -> L3162        FSTPZ5 :  GO TO FSTP
121   L3171:  1....111.1  -> L3207        ASMDZ4 :  JSB DSP0Z4
122   L3172:  .111.1.1.1  -> L3165                   JSB CHK0
123   L3173:  1....1....  -> L4174   *****          SELECT ROM 4
124   L3174:  ..........                             NO OPERATION
125   L3175:  ..........                             NO OPERATION
126   L3176:  111.1.111.                  FSTXZJ :  A EXCHANGE C[W]
127   L3177:  1.1..111.1  -> L3247        FST1ZX :  JSB OFL3
128   L3200:  .111...1..                  FST1ZJ :  1 -> S7
129   L3201:  1....1.1.1  -> L3205        FST2ZX :  JSB DSP1
130   L3202:  1111.1.1.1  -> L3365                   JSB FST3
131   L3203:  11.11.11.11 -> L3326                   GO TO DEN2
132   L3204:  ..1111111.                  CHS3   :  0 - C - 1 -> C[S]
133   L3205:  1.1.1..1..                  DSP1   :  0. -> S10
134   L3206:  1...1...11  -> L3210                   GO TO DSP7
135   L3207:  1.11..111.                  DSP0Z4 :  SHIFT RIGHT A[W]
136   L3210:  .11..1111.                  DSP7   :  C -> A[S]
137   L3211:  1..1...1..                             0 -> S8
138   L3212:  1.1.1..111  -> L3224                   GO TO DSP8
139   L3213:  .111111.1.                  DSP2   :  C + 1 -> C[XS]
140   L3214:  1...1..1..                  DSP3   :  1 -> S8
141   L3215:  .1.1.1.1..                             IF S5 # 1
142   L3216:  1..1..1.11  -> L3222                       THEN GO TO DSP5
143   L3217:  .1111.1.1.                             C + 1 -> C[X]
144   L3220:  1...1.1111  -> L3213                   IF NO CARRY GO TO DSP2
145   L3221:  ....1.1...                  DSP4   :  DISPLAY TOGGLE
146   L3222:  ....1.1...                  DSP5   :  IF S0 # 1
147   L3223:  1..11..1.11 -> L3214                       THEN GO TO DSP3
148   L3224:  ....1..1..                  DSP8   :  0 -> S0
```

```
149  L3225:  .....111..
150  L3226:  11..1.11..
151  L3227:  1..1.1.111  -> L3225
152  L3230:  1...1.1...
153  L3231:  1....1.1..
154  L3232:  1..1...111  -> L3221
155  L3233:  .1....111.
156  L3234:  .1.11..1..
157  L3235:  1.1..1.1..  -> L3037
158  L3236:  ...1111111  -> L3037
159  L3237:  1....1....  -> L4240    *****
160  L3240:  ..........
161  L3241:  ..11.1..1.
162  L3242:  .1.111..1.
163  L3243:  ..11.11.1.
164  L3244:  111...1.1.
165  L3245:  1.1..11111  -> L3247
166  L3246:  ..11..111.
167  L3247:  ....11.1..
168  L3250:  .11...111.
169  L3251:  11....11..
170  L3252:  .1..1.1.1.
171  L3253:  .11...1.1.
172  L3254:  .11.111.1.
173  L3255:  1.11...111  -> L3261
174  L3256:  ..1.1.1.1.
175  L3257:  .1.1111.1.
176  L3260:  1.1....111  -> L3241
177  L3261:  111.1.1.1.
178  L3262:  .1...1.1..
179  L3263:  ....1..111  -> L3011
180  L3264:  11..1.1.1.
181  L3265:  ....1.1.1.
182  L3266:  1....1.1.1  -> L3205
183  L3267:  11..1.11..
184  L3270:  1....11411  -> L3207
185  L3271:  .1.....1..
186  L3272:  1.11111.11  -> L3276
187  L3273:  .1......1.
188  L3274:  1.11.1.1..
189  L3275:  1...111..11 -> L3034
190  L3276:  1.11..111.
191  L3277:  111.11..1.
192  L3300:  11...11.11  -> L3306
193  L3301:  1.11..111.
194  L3302:  .1...1.1..
195  L3303:  1....1..11  -> L3204
196  L3304:  111.11..1.
197  L3305:  ..11111.1.
198  L3306:  .11...111.
199  L3307:  .11.111.1.
200  L3310:  11..1.1111  -> L3313
201  L3311:  ..11..1.1.
202  L3312:  ...1.1.1.1.
203  L3313:  11.1..11..
204  L3314:  .1...1.11.
205  L3315:  .1.11.1.1.
206  L3316:  1..111111.
207  L3317:  111.11..11  -> L3354
208  L3320:  1..111.11.
209  L3321:  11...11.11  -> L3314
210  L3322:  ..11..1.1.
211  L3323:  1....1.1.1  -> L3205
212  L3324:  1.11.1.11.
213  L3325:  .11..1111.
214  L3326:  11..1.11..
215  L3327:  11.1111111  -> L3337
216  L3330:  ..1...111.
217  L3331:  .1111.111.
218  L3332:  ...1..11..
219  L3333:  .1...1.1..
220  L3334:  ....1111..
221  L3335:  .11.1...1.
222  L3336:  11.11.1111  -> L3333
223  L3337:  111.1.111.
224  L3340:  ..111.11..
```

```
DSP6  :  P - 1 -> P
         IF P # 12
             THEN GO TO DSP6
         DISPLAY OFF
         IF S8 # 1
             THEN GO TO DSP4
         SHIFT LEFT A[W]
         0 -> S5
         IF S10 # 1
             THEN GO TO TKRA
         SELECT ROM 4
         NO OPERATION
OFL1  :  0 -> C[WP]
         C - 1 -> C[WP]
         0 -> C[XS]
         A + B -> A[X]
         IF NO CARRY GO TO OFL3
OFL2  :  0 -> C[W]
OFL3  :  CLEAR STATUS
         C -> A[W]
OFL4  :  12 -> P
         A -> B[X]
         C -> A[X]
         IF C[XS] = 0
             THEN GO TO OFL5
         0 - C -> C[X]
         C - 1 -> C[XS]
         IF NO CARRY GO TO OFL1
OFL5  :  A EXCHANGE C[X]
         IF S4 # 1
             THEN GO TO FND0
         A EXCHANGE B[X]
         0 -> B[X]
         JSB DSP1
         IF P # 12
             THEN GO TO DSPQZ4
         SHIFT LEFT A[X]
         GO TO EEX3
EEX2  :  1 -> S4
         IF S11 # 1
             THEN GO TO DIG1
EEX3  :  SHIFT RIGHT A[W]
         A EXCHANGE C[WP]
         GO TO EEX4
CHS2  :  SHIFT RIGHT A[W]
         IF S4 # 1
             THEN GO TO CHS3
         A EXCHANGE C[WP]
         0 - C - 1 -> C[XS]
EEX4  :  C -> A[W]
         IF C[XS] = 0
             THEN GO TO EEX5
         0 -> C[XS]
         0 - C -> C[X]
EEX5  :  13 -> P
EEX6  :  SHIFT LEFT A[MS]
         C - 1 -> C[X]
         IF A[S] >= 1
             THEN GO TO EEX8
         IF A[MS] >= 1
             THEN GO TO EEX6
         0 -> C[X]
DEN1  :  JSB DSP1
         SHIFT RIGHT A[MS]
DEN7  :  C -> A[S]
DEN2  :  IF P # 12
             THEN GO TO DEN4
         B -> C[W]
         C + 1 -> C[W]
         1 -> P
DEN3  :  SHIFT LEFT A[WP]
         P + 1 -> P
         IF C[P] = 0
             THEN GO TO DEN3
DEN4  :  A EXCHANGE C[W]
         IF P # 3
```

```
225  L3341:  111..1.111  -> L3345                    THEN GO TO DEN5
226  L3342:  ..11..1.1.                              0 -> C[X]
227  L3343:  .11....1..                              1 -> S6
228  L3344:  11...11.11  -> L3306                    GO TO EEX4
229  L3345:  .11..1.1.              DEN5  :  IF S6 # 1
230  L3346:  111..1..11  -> L3350                          THEN GO TO DEN6
231  L3347:  .....111..                              P - 1 -> P
232  L3350:  1.1..1..1.             DEN6  :  SHIFT RIGHT B[WP]
233  L3351:  11..11..1   -> L3306                    JSB EEX4
234  L3352:  .....111..             EEX7  :  P - 1 -> P
235  L3353:  .1111.1.1.                              C + 1 -> C[X]
236  L3354:  ........1.             EEX8  :  IF B[P] = 0
237  L3355:  111.1.1.11  -> L3352                          THEN GO TO EEX7
238  L3356:  1.11...1..                              1 -> S11
239  L3357:  1.11.1.11.                              SHIFT RIGHT A[MS]
240  L3360:  111.1..11.                              A EXCHANGE C[M]
241  L3361:  .1...1.1.*                              IF S4 # 1
242  L3362:  11.1..1111  -> L3323                          THEN GO TO DEN1
243  L3363:  1.1.1..1.1  -> L3251   EEX9  :  JSB OFL4
244  L3364:  1......111  -> L3201            GO TO FST2ZX
245  L3365:  1.1111.11.             FST3  :  0 -> A[MS]
246  L3366:  .111.1.1..             FST4  :  IF S7 # 1
247  L3367:  11111.111   -> L3371                          THEN GO TO FST5
248  L3370:  .1..1.1...                              C -> STACK
249  L3371:  .111..1..              FST5  :  1 -> S7
250  L3372:  ..11..111.                              0 -> C[W]
251  L3373:  .1.11.111.                              C - 1 -> C[W]
252  L3374:  ..1.11111.                              0 - C -> C[S]
253  L3375:  .1111111.                               C + 1 -> C[S]
254  L3376:  1...1.111.                              B EXCHANGE C[W]
255  L3377:  ....11....             RETNZX:  RETURN
```

ROM 4

```
 0   L4000:  ..........              PRFX    :  NO OPERATION
 1   L4001:  1.....1.11  -> L4204    PRFXZ3:  GO TO PFX1
 2   L4002:  .1.111..11  -> L4134    SCI1    :  GO TO SCI2
 3   L4003:  11..1...11  -> L4310    TENX    :  GO TO TNX2
 4   L4004:  .1.11...11  -> L4130    LOGG    :  GO TO LOG2
 5   L4005:  11...1....  -> L6006   ***** TNX3  :  SELECT ROM 6
 6   L4006:  .11....1.1  -> L4141    XTOY    :  JSB SAVE
 7   L4007:  .1.11.1.11  -> L4132            GO TO XTY1
 8   L4010:  1..11...11  -> L4230    DPCT    :  GO TO DPC1
 9   L4011:  .1....1.11  -> L4102    PERCZ3:  GO TO PCT1
10   L4012:  1...1..1..              DMST    :  0 -> S8
11   L4013:  ...1....11  -> L4020    TDMS    :  GO TO TDM1
12   L4014:  ..1....11   -> L4040    STDD    :  GO TO STD1
13   L4015:  .....1....  -> L0016   ***** DMSD  :  SELECT ROM 0
14   L4016:  .11....1.1  -> L4141    FACT    :  JSB SAVE
15   L4017:  1111111111  -> L4377            GO TO FAC2
16   L4020:  .11....1.1  -> L4141    TDM1    :  JSB SAVE
17   L4021:  ....11.111  -> L4015            GO TO DMSD
18   L4022:  1.....1.11  -> L4202    DIG6    :  GO TO DSP0
19   L4023:  1.....1.11  -> L4202    DIG5    :  GO TO DSP0
20   L4024:  1.....1.11  -> L4202    DIG4    :  GO TO DSP0
21   L4025:  1.1..1....  -> L5026   ***** SIG2  :  SELECT ROM 5
22   L4026:  ..........              ADDD    :  NO OPERATION
23   L4027:  .11.1...11  -> L4150    ADDDZ3:  GO TO AMD1
24   L4030:  1.11.1.111  -> L4265    TPOLZ0:  GO TO TPL3
25   L4031:  ..........                      NO OPERATION
26   L4032:  1.....1.11  -> L4202    DIG3    :  GO TO DSP0
27   L4033:  1.....1.11  -> L4202    DIG2    :  GO TO DSP0
28   L4034:  1.....1.11  -> L4202    DIG1    :  GO TO DSP0
29   L4035:  ..........                      NO OPERATION
30   L4036:  ..........              MULT    :  NO OPERATION
31   L4037:  .11.111.11  -> L4156    MULTZ3:  GO TO AMD4
32   L4040:  .11......1  -> L4140    STD1    :  JSB SAV1
33   L4041:  1.1..1....  -> L5042   ***** SELECT ROM 5
34   L4042:  11.1....11  -> L4320    SIGMZ3:  GO TO SGMA
35   L4043:  .111..1.11  -> L4162    DCPT    :  GO TO PIII
36   L4044:  .111...111  -> L4161    DIG0    :  GO TO CONS
37   L4045:  ..........                      NO OPERATION
38   L4046:  .111..1111  -> L4163    DIVDZ3:  GO TO AMD5
39   L4047:  .1.1...1..              ATN2    :  1 -> S5
40   L4050:  .1.1111..1  -> L4136    ATAN    :  JSB SAV9
```

```
 41   L4051:  .1.....111   -> L4101              GO TO SQT1
 42   L4052:  .1...1.1111  -> L4113    ACOS  :   GO TO ACS1
 43   L4053:  ...1..11111  -> L4047    ASIN  :   GO TO ATN2
 44   L4054:  1..1..1111   -> L4223    TREC  :   GO TO TRC1
 45   L4055:  1.1.1...11   -> L4250    TPOLZ3:  GO TO TPL1
 46   L4056:  .11....1.1   -> L4141    SQRT  :   JSB SAVE
 47   L4057:  .1....111    -> L4101              GO TO SQT1
 48   L4060:  ..........                         NO OPERATION
 49   L4061:  ..........                         NO OPERATION
 50   L4062:  11111.111.               DIG9  :   A + 1 -> A[W]
 51   L4063:  11111.111.               DIG8  :   A + 1 -> A[W]
 52   L4064:  .111....11   -> L4160    DIG7  :   IF NO CARRY GO TO CON1
 53   L4065:  1.1..1....   -> L5066  ***** TPL6 :  SELECT ROM 5
 54   L4066:  ..........               SUBT  :   NO OPERATION
 55   L4067:  .11.1.1111   -> L4153    SUBTZ3:  GO TO AMD2
 56   L4070:  .11....1.1   -> L4141    CLER  :   JSB SAVE
 57   L4071:  1111.1.111   -> L4365              GO TO CLR2
 58   L4072:  11111.111.               GRAD  :   A + 1 -> A[W]
 59   L4073:  ..11111111   -> L4077    RADN  :   IF NO CARRY GO TO MODE
 60   L4074:  ..........               CLOK  :   NO OPERATION
 61   L4075:  ..........                         NO OPERATION
 62   L4076:  11.11.111.               DEGR  :   A - 1 -> A[W]
 63   L4077:  ......11..               MODE  :   0 -> P
 64   L4100:  .1..111.11   -> L4116              GO TO SHFT
 65   L4101:  .11..1....   -> L3102  ***** SQT1 :  SELECT ROM 3
 66   L4102:  .11......1   -> L4140    PCT1  :   JSB SAV1
 67   L4103:  1...1..1..                         0 -> S8
 68   L4104:  11..1.1...               C100  :   DOWN ROTATE
 69   L4105:  .1..1.1..:                         C -> STACK
 70   L4106:  .1.11.1.1.                         C - 1 -> C[X]
 71   L4107:  .1.11.1.1.                         C - 1 -> C[X]
 72   L4110:  1....1.1..                         IF S8 # 1
 73   L4111:  1.1..1111    -> L4243    MUL0Z3:      THEN GO TO MUL0
 74   L4112:  1.1....111   -> L4241    DIV0Z3:  GO TO DIV0
 75   L4113:  .1.1111..1   -> L4136    ACS1  :   JSB SAV9
 76   L4114:  .11..1....   -> L3115  *****       SELECT ROM 3
 77   L4115:  .11..1....   -> L3116  ***** TRC2 :  SELECT ROM 3
 78   L4116:  .1....111.               SHFT  :   SHIFT LEFT A[W]
 79   L4117:  ....1111..                         P + 1 -> P
 80   L4120:  11.11.11..                         IF P # 13
 81   L4121:  .1..111.11   -> L4116              THEN GO TO SHFT
 82   L4122:  ..1.1.1...               MRG0  :   C EXCHANGE M
 83   L4123:  111.1..1..                         A EXCHANGE C[P]
 84   L4124:  ..1.1.1...               MREG  :   C EXCHANGE M
 85   L4125:  .11..1....   -> L3126  *****       SELECT ROM 3
 86   L4126:  ..........                       . NO OPERATION
 87   L4127:  ..........                         NO OPERATION
 88   L4130:  .1.1...1..               LOG2  :   1 -> S5
 89   L4131:  .11..1....   -> L3132  *****       SELECT ROM 3
 90   L4132:  1....111.1   -> L4207    XTY1  :   JSB EXCH
 91   L4133:  .11..1....   -> L3134  *****       SELECT ROM 3
 92   L4134:  1.1.1..1..               SCI2  :   0 -> S10
 93   L4135:  .11..1....   -> L3136  *****       SELECT ROM 3
 94   L4136:  ...1.?.1..               SAV9  :   1 -> S1
 95   L4137:  .11....111   -> L4141              GO TO SAVE
 96   L4140:  ..11...1..               SAV1  :   1 -> S3
 97   L4141:  1.1.....1.               SAVE  :   1 -> S10
 98   L4142:  11...1....   -> L6143  *****       SELECT ROM 6
 99   L4143:  11...1....   -> L6144  ***** SAVX :  SELECT ROM 6
100   L4144:  11...1....   -> L6145  ***** ADR9 :  SELECT ROM 6
101   L4145:  1.1.....1.               SAV2  :   1 -> S10
102   L4146:  ..11...1..                         1 -> S3
103   L4147:  .11..1111    -> L4143              GO TO SAVX
104   L4150:  .11....1..               AMD1  :   1 -> S6
105   L4151:  .1.....1..                         1 -> S4
106   L4152:  .111.1.111   -> L4165              GO TO AMD7
107   L4153:  .11.1.1..                AMD2  :   0 -> S5
108   L4154:  .1.....1..               AMD3  :   1 -> S4
109   L4155:  .111.1.111   -> L4165              GO TO AMD7
110   L4156:  .11....1..               AMD4  :   1 -> S6
111   L4157:  .111.1..11   -> L4164              GO TO AMD6
112   L4160:  11111.111.               CON1  :   A + 1 -> A[W]
113   L4161:  11...1....   -> L6162  ***** CONS :  SELECT ROM 6
114   L4162:  11...1....   -> L6163  ***** PIII :  SELECT ROM 6
115   L4163:  .11.1.1..                AMD5  :   0 -> S6
```

| | | | | | | | |
|---|---|---|---|---|---|---|---|
| 116 | L4164: | .1..1..1.. | | | AMD6 | : | 0 -> S4 |
| 117 | L4165: | ..1..1.1.. | | | AMD7 | : | IF S2 # 1 |
| 118 | L4166: | .111111111 | -> L4177 | | | | THEN GO TO AMD8 |
| 119 | L4167: | 1.1..1.1.. | | | | | 0 -> S10 |
| 120 | L4170: | .11..1..1. | -> L3171 | ***** | | | SELECT ROM 3 |
| 121 | L4171: | 1.1..1.1... | | | AM13 | : | 0 -> S10 |
| 122 | L4172: | 1..1..1.... | -> L5173 | ***** | | | SELECT ROM 5 |
| 123 | L4173: | .......... | | | | | NO OPERATION |
| 124 | L4174: | 1...1.1111 | -> L4213 | | AMD9Z3: | | GO TO AMD9 |
| 125 | L4175: | .......... | | | | | NO OPERATION |
| 126 | L4176: | .11..1.... | -> L3177 | ***** | FST1 | : | SELECT ROM 3 |
| 127 | L4177: | .11.....1 | -> L4141 | | AMD8 | : | JSB SAVE |
| 128 | L4200: | .11.1... | | | | | STACK -> A |
| 129 | L4201: | .1111..111 | -> L4171 | | | | GO TO AM13 |
| 130 | L4202: | 1.1..1..1.. | | | DSP0 | : | 0 -> S10 |
| 131 | L4203: | 1....1.111 | -> L4205 | | | | GO TO DSPX |
| 132 | L4204: | 1.1.....1.. | | | PFX1 | : | 1 -> S10 |
| 133 | L4205: | 1..11..1.. | | | DSPX | : | 0 -> S9 |
| 134 | L4206: | .11..1.... | -> L3207 | ***** | | | SELECT ROM 3 |
| 135 | L4207: | .11.1..1... | | | EXCH | : | STACK -> A |
| 136 | L4210: | .1..1.1... | | | EXC1 | : | C -> STACK |
| 137 | L4211: | 111.1.111. | | | | | A EXCHANGE C[W] |
| 138 | L4212: | ....11.... | | | | | RETURN |
| 139 | L4213: | 1..1.1.1.. | | | AMD9 | : | IF S9 # 1 |
| 140 | L4214: | 1..1....11 | -> L4220 | | | | THEN GO TO AM12 |
| 141 | L4215: | .11......1 | -> L4140 | | AM10 | : | JSB SAV1 |
| 142 | L4216: | 111.1.111. | | | AM11 | : | A EXCHANGE C[W] |
| 143 | L4217: | .1111..111 | -> L4171 | | | | GO TO AM13 |
| 144 | L4220: | .11..1.1.1 | -> L4145 | | AM12 | : | JSB SAV2 |
| 145 | L4221: | 1.1111.... | | | | | C -> DATA |
| 146 | L4222: | 1...111.11 | -> L4216 | | | | GO TO AM11 |
| 147 | L4223: | .1.1111..1 | -> L4136 | | TRC1 | : | JSB SAV9 |
| 148 | L4224: | .11.1.1... | | | | | STACK -> A |
| 149 | L4225: | ..11...1.. | | | | | 1 -> S3 |
| 150 | L4226: | 1.1..1.1.. | | | | | 0 -> S10 |
| 151 | L4227: | .1..11.111 | -> L4115 | | | | GO TO TRC2 |
| 152 | L4230: | .11......1 | -> L4140 | | DPC1 | : | JSB SAV1 |
| 153 | L4231: | 11..1.1... | | | | | DOWN ROTATE |
| 154 | L4232: | .1..1.1... | | | | | C -> STACK |
| 155 | L4233: | 1.1..11..1 | -> L4246 | | | | JSB SUB1 |
| 156 | L4234: | .1...1..11 | -> L4104 | | | | GO TO C100 |
| 157 | L4235: | .......... | | | | | NO OPERATION |
| 158 | L4236: | .......... | | | | | NO OPERATION |
| 159 | L4237: | 1.1..1.... | -> L5240 | ***** | RCXY | : | SELECT ROM 5 |
| 160 | L4240: | ..11.1.... | | | TKRAZ3: | | KEYS -> ROM ADDRESS |
| 161 | L4241: | ..111..1.. | | | DIV0 | : | 0 -> S3 |
| 162 | L4242: | 1.1..1.1.11 | -> L4245 | | | | GO TO DIV1 |
| 163 | L4243: | ..111..1.. | | | MUL0 | : | 0 -> S3 |
| 164 | L4244: | ..1..1.... | -> L1245 | ***** | MUL1 | : | SELECT ROM 1 |
| 165 | L4245: | ..1..1.... | -> L1246 | ***** | DIV1 | : | SELECT ROM 1 |
| 166 | L4246: | ..1111111. | | | SUB1 | : | 0 - C - 1 -> C[S] |
| 167 | L4247: | .....1.... | -> L0250 | ***** | ADD1 | : | SELECT ROM 0 |
| 168 | L4250: | .1.1111..1 | -> L4136 | | TPL1 | : | JSB SAV9 |
| 169 | L4251: | ...11...1.. | | | | | 1 -> S3 |
| 170 | L4252: | .1..1..1.. | | | | | 0 -> S4 |
| 171 | L4253: | .11.11111. | | | | | IF C[S] = 0 |
| 172 | L4254: | 1.1.111.11 | -> L4256 | | | | THEN GO TO TPL2 |
| 173 | L4255: | .1.....1.. | | | | | 1 -> S4 |
| 174 | L4256: | 11..1.1... | | | TPL2 | : | DOWN ROTATE |
| 175 | L4257: | 1...1....1 | -> L4210 | | | | JSB EXC1 |
| 176 | L4260: | 1..11..11. | | | | | IF A[M] >= 1 |
| 177 | L4261: | ..11.1.111 | -> L4065 | | | | THEN GO TO TPL6 |
| 178 | L4262: | ..11.1..1. | | | | | 0 -> C[WP] |
| 179 | L4263: | .1111...1. | | | | | C + 1 -> C[P] |
| 180 | L4264: | ..11.1.1.1 | -> L4065 | | | | JSB TPL6 |
| 181 | L4265: | ...11...1.. | | | TPL3 | : | 0 -> S1 |
| 182 | L4266: | 1....111.1 | -> L4207 | | | | JSB EXCH |
| 183 | L4267: | .11...111. | | | | | C -> A[W] |
| 184 | L4270: | 1.1..1...1 | -> L4244 | | | | JSB MUL1 |
| 185 | L4271: | 1.1111.... | | | | | C -> DATA |
| 186 | L4272: | 11..1.11.1 | -> L4313 | | | | JSB REST |
| 187 | L4273: | .11..1...1 | -> L4144 | | | | JSB ADR9 |
| 188 | L4274: | 1.1..1..1 | -> L4244 | | | | JSB MUL1 |
| 189 | L4275: | 1.11111... | | | | | DATA -> C |
| 190 | L4276: | 1.1..111.1 | -> L4247 | | | | JSB ADD1 |
| 191 | L4277: | 11.1111.1. | | | | | A - 1 -> A[XS] |

| | | | | | |
|---|---|---|---|---|---|
| 192 | L4300: | 11.1111.1. | | | A - 1 -> A[XS] |
| 193 | L4301: | 11.1111.1. | | | A - 1 -> A[XS] |
| 194 | L4302: | 11...1.111 | -> L4305 | | IF NO CARRY GO TO TPL5 |
| 195 | L4303: | .11.1111.1 | | | C - 1 -> C[XS] |
| 196 | L4304: | 1111...1.1 | -> L4361 | | JSB REG9 |
| 197 | L4305: | .11...111. | | TPL5 : | C -> A[W] |
| 198 | L4306: | .1.....1.1 | -> L4101 | | JSB SQT1 |
| 199 | L4307: | 1111...111 | -> L4361 | | GO TO REG9 |
| 200 | L4310: | .11....1.1 | -> L4141 | TNX2 : | JSB SAVE |
| 201 | L4311: | ...1.....1.. | | | 1 -> S2 |
| 202 | L4312: | .....1.111 | -> L4005 | | GO TO TNX3 |
| 203 | L4313: | ...11..111. | | REST : | 0 -> C[W] |
| 204 | L4314: | 1..111.... | | | C -> DATA ADDRESS |
| 205 | L4315: | .......... | | | NO OPERATION |
| 206 | L4316: | 1.11111... | | | DATA -> C |
| 207 | L4317: | ....11.... | | | RETURN |
| 208 | L4320: | 1..1.1.1.. | | SGMA : | IF S9 # 1 |
| 209 | L4321: | 11.1.1111 | -> L4323 | | THEN GO TO SIG1 |
| 210 | L4322: | 1..1111111 | -> L4237 | | GO TO RCXY |
| 211 | L4323: | .11......1 | -> L4140 | SIG1 : | JSB SAV1 |
| 212 | L4324: | ...1.1.111 | -> L4025 | | GO TO SIG2 |
| 213 | L4325: | .......... | | | NO OPERATION |
| 214 | L4326: | .......... | | | NO OPERATION |
| 215 | L4327: | .......... | | | NO OPERATION |
| 216 | L4330: | .......... | | | NO OPERATION |
| 217 | L4331: | .......... | | | NO OPERATION |
| 218 | L4332: | .......... | | | NO OPERATION |
| 219 | L4333: | .......... | | | NO OPERATION |
| 220 | L4334: | .......... | | | NO OPERATION |
| 221 | L4335: | .......... | | | NO OPERATION |
| 222 | L4336: | .......... | | | NO OPERATION |
| 223 | L4337: | .......... | | | NO OPERATION |
| 224 | L4340: | .......... | | | NO OPERATION |
| 225 | L4341: | .......... | | | NO OPERATION |
| 226 | L4342: | .......... | | | NO OPERATION |
| 227 | L4343: | .......... | | | NO OPERATION |
| 228 | L4344: | .......... | | | NO OPERATION |
| 229 | L4345: | .......... | | | NO OPERATION |
| 230 | L4346: | .......... | | | NO OPERATION |
| 231 | L4347: | .......... | | | NO OPERATION |
| 232 | L4350: | .......... | | | NO OPERATION |
| 233 | L4351: | .......... | | | NO OPERATION |
| 234 | L4352: | .......... | | | NO OPERATION |
| 235 | L4353: | .......... | | | NO OPERATION |
| 236 | L4354: | .......... | | | NO OPERATION |
| 237 | L4355: | .......... | | | NO OPERATION |
| 238 | L4356: | .......... | | | NO OPERATION |
| 239 | L4357: | .......... | | | NO OPERATION |
| 240 | L4360: | .......... | | | NO OPERATION |
| 241 | L4361: | .....1.... | -> L0362 | ***** REG9 : | SELECT ROM 0 |
| 242 | L4362: | .......... | | | NO OPERATION |
| 243 | L4363: | .......... | | | NO OPERATION |
| 244 | L4364: | .......... | | | NO OPERATION |
| 245 | L4365: | 1.1.1..... | -> L5366 | ***** CLR2 : | SELECT ROM 5 |
| 246 | L4366: | .......... | | | NO OPERATION |
| 247 | L4367: | .......... | | | NO OPERATION |
| 248 | L4370: | .......... | | | NO OPERATION |
| 249 | L4371: | .......... | | | NO OPERATION |
| 250 | L4372: | .......... | | | NO OPERATION |
| 251 | L4373: | .......... | | | NO OPERATION |
| 252 | L4374: | .......... | | | NO OPERATION |
| 253 | L4375: | .......... | | | NO OPERATION |
| 254 | L4376: | ....11.... | | RETNZX: | RETURN |
| 255 | L4377: | 11...1.... | -> L6400 | ***** FAC2 : | SELECT ROM 6 |

ROM 5

| | | | | | |
|---|---|---|---|---|---|
| 0 | L05000: | 11...1.... | -> L0371 | ***** R32 : | SELECT ROM 0 |
| 1 | L05001: | .1111....1 | | R3 : | C + 1 -> C[P] |
| 2 | L05002: | .1111....1 | | R6 : | C + 1 -> C[P] |
| 3 | L05003: | .1111....1 | | R7 : | C + 1 -> C[P] |
| 4 | L05004: | .1111....1 | | R9 : | C + 1 -> C[P] |
| 5 | L05005: | .1111....1 | | R9 : | C + 1 -> C[P] |
| 6 | L05006: | .1.1..111. | | R30 : | A - C -> C[W] |
| 7 | L05007: | 1..111.... | | | C -> DATA ADDRESS |

| | | | | |
|---|---|---|---|---|
| 8 | L05010: | .......... | | NO OPERATION |
| 9 | L05011: | 1.11111... | | DATA -> C |
| 10 | L05012: | .1...1.1.. | | IF S4 # 1 |
| 11 | L05013: | 1111111111 | -> L5377 | THEN GO TO RETNZX |
| 12 | L05014: | 111.1.111. | | A EXCHANGE C[W] |
| 13 | L05015: | 1.....1.1.. | | IF S8 # 1 |
| 14 | L05016: | 1.1..11111 | -> L5247 | THEN GO TO ADD1 |
| 15 | L05017: | 1.1..11.11 | -> L5246 | GO TO SUB1 |
| 16 | L05020: | .11..1.... | -> L3021 | ***** FST2 : SELECT ROM 3 |
| 17 | L05021: | .......... | | NO OPERATION |
| 18 | L05022: | .......... | | NO OPERATION |
| 19 | L05023: | .......... | | NO OPERATION |
| 20 | L05024: | .......... | | NO OPERATION |
| 21 | L05025: | 111..1..11 | -> L5344 | PWO2Z0: GO TO PWO2 |
| 22 | L05026: | .1.....1.. | | SGMAZ4: 1 -> S4 |
| 23 | L05027: | 1.1.1.1... | | 0 -> S10 |
| 24 | L05030: | 1.1..1...1 | -> L5244 | JSB MUL1 |
| 25 | L05031: | .....1..1 | -> L5002 | JSB ADR6 |
| 26 | L05032: | 1.111.11.1 | -> L5273 | JSB STOR |
| 27 | L05033: | ..1.11.1.1 | -> L5055 | JSB REST |
| 28 | L05034: | .11...111. | | C -> A[W] |
| 29 | L05035: | ......11.1 | -> L5003 | JSB ADR7 |
| 30 | L05036: | ..1...1111 | -> L5043 | GO TO SIG1 |
| 31 | L05037: | .......... | | NO OPERATION |
| 32 | L05040: | .......... | | NO OPERATION |
| 33 | L05041: | .......... | | NO OPERATION |
| 34 | L05042: | .1....1.11 | -> L5102 | STDDZ4: GO TO STDD |
| 35 | L05043: | 1.111.11.1 | -> L5273 | SIG1 : JSB STOR |
| 36 | L05044: | ..11..1..1 | -> L5062 | JSB YGET |
| 37 | L05045: | ......1...1 | -> L5004 | JSB ADR8 |
| 38 | L05046: | 1.111.11.1 | -> L5273 | JSB STOR |
| 39 | L05047: | ..11..111. | | 0 -> C[W] |
| 40 | L05050: | .1111...1. | | C + 1 -> C[P] |
| 41 | L05051: | .11..111. | | C -> A[W] |
| 42 | L05052: | ......1.1 | -> L5001 | JSB ADR5 |
| 43 | L05053: | 1.111 11.1 | -> L5273 | JSB STOR |
| 44 | L05054: | ...1....11 | -> L5020 | GO TO FST2 |
| 45 | L05055: | ..11..111. | | REST : 0 -> C[W] |
| 46 | L05056: | 1..111.... | | C -> DATA ADDRESS |
| 47 | L05057: | .......... | | NO OPERATION |
| 48 | L05060: | 1.11111... | | DATA -> C |
| 49 | L05061: | ....11.... | | RETURN |
| 50 | L05062: | 11..1.1... | | YGET : DOWN ROTATE |
| 51 | L05063: | .1..1.1... | | C -> STACK |
| 52 | L05064: | .11...111. | | C -> A[W] |
| 53 | L05065: | ....11.... | | RETURN |
| 54 | L05066: | 1...1..1.. | | TPLOZ4: 0 -> S8 |
| 55 | L05067: | 1..11..1.. | | 0 -> S9 |
| 56 | L05070: | 1.1..1.1.1 | -> L5245 | TPLOZJ: JSB DIV1 |
| 57 | L05071: | .......... | | NO OPERATION |
| 58 | L05072: | .......... | | NO OPERATION |
| 59 | L05073: | .......... | | NO OPERATION |
| 60 | L05074: | .......... | | NO OPERATION |
| 61 | L05075: | .......... | | NO OPERATION |
| 62 | L05076: | .......... | | NO OPERATION |
| 63 | L05077: | .......... | | NO OPERATION |
| 64 | L05100: | .......... | | NO OPERATION |
| 65 | L05101: | .11..1.... | -> L3102 | ***** SQT1 : SELECT ROM 2 |
| 66 | L05102: | 1.1.1.1... | | STDD : 0 -> S10 |
| 67 | L05103: | .1..1.1... | | 0 -> S4 |
| 68 | L05104: | .....11.1 | -> L5003 | JSB ADR7 |
| 69 | L05105: | .11...111. | | C -> A[W] |
| 70 | L05106: | 1.1..1...1 | -> L5244 | JSB MUL1 |
| 71 | L05107: | ......1..1 | -> L5001 | JSB ADR5 |
| 72 | L05110: | ...111111. | | IF C[S] >= 1 |
| 73 | L05111: | ........11 | -> L5000 | THEN GO TO ERR2 |
| 74 | L05112: | 1.1..1.1.1 | -> L5245 | JSB DIV1 |
| 75 | L05113: | .....1..1 | -> L5002 | JSB ADR6 |
| 76 | L05114: | 111.1.111. | | A EXCHANGE C[W] |
| 77 | L05115: | 1.1..11..1 | -> L5246 | JSB SUB1 |
| 78 | L05116: | .1..1.1... | | C -> STACK |
| 79 | L05117: | ......1..1 | -> L5001 | JSB ADR5 |
| 80 | L05120: | 111.1.111. | | A EXCHANGE C[W] |
| 81 | L05121: | ..11..111. | | 0 -> C[W] |
| 82 | L05122: | .1111...1. | | C + 1 -> C[P] |

```
 83    L05123:  1.1..11..1   -> L5246              JSB SUB1
 84    L05124:  .11.1.1...                         STACK -> A
 85    L05125:  1.1..1.1.1   -> L5245              JSB DIV1
 86    L05126:  .1.....1.1   -> L5101              JSB SQT1
 87    L05127:  .1..1.1...                         C -> STACK
 88    L05130:  ......11.1   -> L5003              JSB ADR7
 89    L05131:  .11...111.                         C -> A[W]
 90    L05132:  ......1.1    -> L5001              JSB ADR5
 91    L05133:  1.1....1.1   -> L5241              JSB DIV0
 92    L05134:  .1..1..1..              RCXY  :    0 -> S4
 93    L05135:  .111.1.1..                         IF S7 # 1
 94    L05136:  .11.....11   -> L5140                  THEN GO TO RXY1
 95    L05137:  .1..1.1...                         C -> STACK
 96    L05140:  .11....111.             RXY1  :    C -> A[W]
 97    L05141:  ......1..1   -> L5004              JSB ADR0
 98    L05142:  .1..1.1...                         C -> STACK
 99    L05143:  .11...111.                         C -> A[W]
100    L05144:  ......11.1   -> L5003              JSB ADR7
101    L05145:  .111111.11   -> L5176              GO TO FST1
102    L05146:  ..........                         NO OPERATION
103    L05147:  ..........                         NO OPERATION
104    L05150:  ..........                         NO OPERATION
105    L05151:  ..........                         NO OPERATION
106    L05152:  ..........                         NO OPERATION
107    L05153:  ..........                         NO OPERATION
108    L05154:  ..........                         NO OPERATION
109    L05155:  ..........                         NO OPERATION
110    L05156:  ..........                         NO OPERATION
111    L05157:  ..........                         NO OPERATION
112    L05160:  ..........                         NO OPERATION
113    L05161:  ..........                         NO OPERATION
114    L05162:  ..........                         NO OPERATION
115    L05163:  ..........                         NO OPERATION
116    L05164:  ..........                         NO OPERATION
117    L05165:  1.111.11.1   -> L5273    AM10  :   JSB STOR
118    L05166:  111.1.111.                         A EXCHANGE C[W]
119    L05167:  .11.1....    -> L3170    *****     SELECT ROM 3
120    L05170:  ..........                         NO OPERATION
121    L05171:  ..........                         NO OPERATION
122    L05172:  ..........                         NO OPERATION
123    L05173:  11.111...1   -> L5334    AM20Z4:   JSB ..
124    L05174:  1..1.1.1..                         IF S9 # 1
125    L05175:  .111.1.111   -> L5165                  THEN GO TO AM10
126    L05176:  .11.1....    -> L3177    ***** FST1 : SELECT ROM 3
127    L05177:  ..........                         NO OPERATION
128    L05200:  ..........                         NO OPERATION
129    L05201:  ..........                         NO OPERATION
130    L05202:  ..........                         NO OPERATION
131    L05203:  ..........                         NO OPERATION
132    L05204:  ..........                         NO OPERATION
133    L05205:  ..........                         NO OPERATION
134    L05206:  ..........                         NO OPERATION
135    L05207:  ..........                         NO OPERATION
136    L05210:  ..........                         NO OPERATION
137    L05211:  ..........                         NO OPERATION
138    L05212:  ..........                         NO OPERATION
139    L05213:  ..........                         NO OPERATION
140    L05214:  ..........                         NO OPERATION
141    L05215:  ..........                         NO OPERATION
142    L05216:  ..........                         NO OPERATION
143    L05217:  ..........                         NO OPERATION
144    L05220:  ..........                         NO OPERATION
145    L05221:  ..........                         NO OPERATION
146    L05222:  ..........                         NO OPERATION
147    L05223:  ..........                         NO OPERATION
148    L05224:  ..........                         NO OPERATION
149    L05225:  ..........                         NO OPERATION
150    L05226:  ..........                         NO OPERATION
151    L05227:  ..........                         NO OPERATION
152    L05230:  ..........                         NO OPERATION
153    L05231:  ..........                         NO OPERATION
154    L05232:  ..........                         NO OPERATION
155    L05233:  ..........                         NO OPERATION
156    L05234:  ..........                         NO OPERATION
157    L05235:  ..........                         NO OPERATION
```

```
158  L05236:  ..........                           NO OPERATION
159  L05237:  ..........                           NO OPERATION
160  L05240:  .1.111..11  -> L5134        RCXYZ4:  GO TO RCXY
161  L05241:  ..111..1..                  DIV0  :  0 -> S3
162  L05242:  1.1..1?.111 -> L5245                 GO TO DIV1
163  L05243:  .111..1..                   MUL0  :  0 -> S3
164  L05244:  ..1..1....  -> L1245  ***** MUL1  :  SELECT ROM 1
165  L05245:  ..1..1....  -> L1245  ***** DIV1  :  SELECT ROM 1
166  L05246:  ..1111111.                  SUB1  :  0 - C - 1 -> C[S]
167  L05247:  .....1....  -> L0250  ***** ADD1  :  SELECT ROM 0
168  L05250:  ..........                           NO OPERATION
169  L05251:  ..........                           NO OPERATION
170  L05252:  ..........                           NO OPERATION
171  L05253:  ..........                           NO OPERATION
172  L05254:  ..........                           NO OPERATION
173  L05255:  ..........                           NO OPERATION
174  L05256:  ..........                           NO OPERATION
175  L05257:  ..........                           NO OPERATION
176  L05260:  ..11.1..1.                  DVOF  :  0 -> C[WP]
177  L05261:  .1.111..1.                           C - 1 -> C[WP]
178  L05262:  ..11.11.1.                           0 -> C[XS]
179  L05263:  .1...1....  -> L2264  ***** SELECT ROM 2
180  L05264:  1.11...1.11 -> L5268        DVOFZ2:  GO TO DVOF
181  L05265:  ..11.1..1.                  OFL1  :  0 -> C[WP]
182  L05266:  .1.111..1.                           C - 1 -> C[WP]
183  L05267:  ..11.11.1.                           0 -> C[XS]
184  L05270:  111...1.1.                           A + 9 -> A[X]
185  L05271:  1.1.1.1111  -> L5273                 IF NO CARRY GO TO STOR
186  L05272:  ..11..111.                           0 -> C[W]
187  L05273:  .11.. 111                   STOR  :  C -> A[W]
188  L05274:  11.....11..                 OFL4  :  12 -> P
189  L05275:  .1..1.1.1.                           A -> B[X]
190  L05276:  .11...1.1.                           C -> A[X]
191  L05277:  .11.111.1.                           IF C[XS] = 0
192  L05300:  11...1..11  -> L5304                    THEN GO TO OFL5
193  L05301:  ..1.1.1.1.                           0 - C -> C[X]
194  L05302:  .1.1111.1.                           C - 1 -> C[XS]
195  L05303:  1.11.1.111  -> L5265                 IF NO CARRY GO TO OFL1
196  L05304:  111.11.11.                  OFL5  :  A EXCHANGE C[M2]
197  L05305:  1.11111...                           DATA -> C
198  L05306:  111.1.111.                           A EXCHANGE C[W]
199  L05307:  1.1111....                           C -> DATA
200  L05310:  ....11....                           RETURN
201  L05311:  ..........                           NO OPERATION
202  L05312:  ..........                           NO OPERATION
203  L05313:  ..........                           NO OPERATION
204  L05314:  ..........                           NO OPERATION
205  L05315:  ..........                           NO OPERATION
206  L05316:  ..........                           NO OPERATION
207  L05317:  ..........                           NO OPERATION
208  L05320:  ..........                           NO OPERATION
209  L05321:  ..........                           NO OPERATION
210  L05322:  ..........                           NO OPERATION
211  L05323:  ..........                           NO OPERATION
212  L05324:  ..........                           NO OPERATION
213  L05325:  ..........                           NO OPERATION
214  L05326:  ..........                           NO OPERATION
215  L05327:  ..........                           NO OPERATION
216  L05330:  ..........                           NO OPERATION
217  L05331:  ..........                           NO OPERATION
218  L05332:  ..........                           NO OPERATION
219  L05333:  ..........                           NO OPERATION
220  L05334:  .1...1.1..                  DCOD  :  IF S4 # 1
221  L05335:  111....111  -> L5341                    THEN GO TO DCD1
222  L05336:  ..11..1.1.                           IF S6 # 1
223  L05337:  1.1..11.11  -> L5246                    THEN GO TO SUB1
224  L05340:  1.1..11111  -> L5247                 GO TO ADD1
225  L05341:  .11..1?.1..                 DCD1  :  IF S6 # 1
226  L05342:  1.1..1.111  -> L5245                    THEN GO TO DIV1
227  L05343:  1.1..1..11  -> L5244                 GO TO MUL1
228  L05344:  ..11..111.                  PWO2  :  0 -> C[W]
229  L05345:  .1.111111.                           C - 1 -> C[S]
230  L05346:  ..11..11..                           2 -> P
231  L05347:  ..11..11...                          LOAD CONSTANT 2
232  L05350:  ..1.1.1...                           C EXCHANGE M
```

```
233  L05351:  ..11..111.
234  L05352:  1.111.111.
235  L05353:  11....11..
236  L05354:  .1.11...1.   
237  L05355:  1..111....
238  L05356:  111.1.111.
239  L05357:  .1..1.1...
240  L05360:  1.1111....
241  L05361:  111.1.111.
242  L05362:  .1111...1.
243  L05363:  .1111...1.
244  L05364:  111.11..11   -> L5354
245  L05365:  .111111.11   -> L5176
246  L05366:  ..11..111.
247  L05367:  .11..11...
248  L05370:  111.1.1.11   -> L5352
249  L05371:  ..........
250  L05372:  ..........
251  L05373:  ..........
252  L05374:  ..........
253  L05375:  ..........
254  L05376:  ..........
255  L05377:  ....11....
```

```
                         0 -> C[W]
             CLR2   :    0 -> A[W]
                         12 -> P
             CLR3   :    C - 1 -> C[P]
                         C -> DATA ADDRESS
                         A EXCHANGE C[W]
                         C -> STACK
                         C -> DATA
                         A EXCHANGE C[W]
                         C + 1 -> C[P]
                         C + 1 -> C[P]
                         IF NO CARRY GO TO CLR3
                         GO TO FST1
             CLR1Z4:     0 -> C[W]
                         LOAD CONSTANT 5
                         GO TO CLR2
                         NO OPERATION
                         NO OPERATION
                         NO OPERATION
                         NO OPERATION
                         NO OPERATION
                         NO OPERATION
             RETNZX:     RETURN
```

ROM 6

```
 0   L6000:  1.1111..11   -> L6274
 1   L6001:  .....11111   -> L6007
 2   L6002:  ....11.1..
 3   L6003:  .111111111   -> L6177
 4   L6004:  .111111.1.
 5   L6005:  .111111.1    -> L6176
 6   L6006:  1111.1...1   -> L6364
 7   L6007:  ..11..111.
 8   L6010:  ....11.1..
 9   L6011:  .1.1..1..
10   L6012:  .11...111.
11   L6013:  1.1.1.1...
12   L6014:  111.1.111.
13   L6015:  ...11..111   -> L6031
14   L6016:  1.11..111.
15   L6017:  11111.1.1.
16   L6020:  ....111.11   -> L6016
17   L6021:  11.1..11..
18   L6022:  11..111.1.
19   L6023:  .1..111.1.
20   L6024:  .....111..
21   L6025:  ..1.1.11..
22   L6026:  ..1.11.111   -> L6055
23   L6027:  1.111.111.
24   L6030:  11.11.1.1.
25   L6031:  ....1.111.
26   L6032:  1......1..
27   L6033:  ...1..11..
28   L6034:  .1..111..1
29   L6035:  .11....11.
30   L6036:  .1...1.11.
31   L6037:  1..11...1.
32   L6040:  ...1...111   -> L6021
33   L6041:  1....1..1..
34   L6042:  111...11..
35   L6043:  .11...1.1.
36   L6044:  ...1111.1.
37   L6045:  ....111.11   -> L6016
38   L6046:  .....111..
39   L6047:  ..1.1.11..
40   L6050:  ..1.1.1.11   -> L6052
41   L6051:  ...1.11111   -> L6027
42   L6052:  11.11.1.1.
43   L6053:  ..1..11.11   -> L6046
44   L6054:  ...1..1.11   -> L6022
45   L6055:  11.1111.1.
46   L6056:  ..1.1...11   -> L6024
47   L6057:  .1..1...1.
48   L6060:  .....111..
49   L6061:  1.1111..1.
```

```
             FACTZ4:    GO TO FACT
             ERR2Z1:    GO TO ERRR
             TDMSZ0:    CLEAR STATUS
                        GO TO TDMSZJ
             OFLW  :    C + 1 -> C[XS]
                        JSB FST1
             TENXZJ:    JSB TNX3
             ERRR  :    0 -> C[W]
                        CLEAR STATUS
                        1 -> S5
             RND0Z3:    C -> A[W]
                        M -> C
                        A EXCHANGE C[W]
                        GO TO RNDX
             RND3  :    SHIFT RIGHT A[MS]
                        A + 1 -> A[X]
                        IF NO CARRY GO TO RND3
             RND4  :    13 -> P
             RND5  :    A EXCHANGE B[XS]
                        A -> B[XS]
             RND6  :    P - 1 -> P
                        IF P # 2
                            THEN GO TO RND7
             RNOF  :    0 -> A[W]
                        A - 1 -> A[X]
             RNDX  :    0 -> B[W]
                        1 -> S8
                        1 -> P
                        A -> B[XS]
                        C -> A[M]
                        SHIFT LEFT A[MS]
                        IF A[P] >= 1
                            THEN GO TO RND4
                        0 -> S8
                        14 -> P
                        C -> A[X]
                        IF C[XS] >= 1
                            THEN GO TO RND3
             RND1  :    P - 1 -> P
                        IF P # 2
                            THEN GO TO RND2
                        GO TO RNOF
             RND2  :    A - 1 -> A[X]
                        IF NO CARRY GO TO RND1
                        GO TO RND5
             RND7  :    A - 1 -> A[XS]
                        IF NO CARRY GO TO RND5
                        A -> B[P]
                        P - 1 -> P
                        0 -> A[WP]
```

```
50  L6062:  .11...1.1.
51  L6063:  111..1.11.
52  L6064:  ..111.1.11  -> L6072
53  L6065:  1.11.1.11.
54  L6066:  111111111.
55  L6067:  11111.111.
56  L6070:  1....1.1..
57  L6071:  ..111.1111  -> L6373
58  L6072:  ....1111..
59  L6073:  1.11.1.11.
60  L6074:  ....11.11.
61  L6075:  11.1111.1.
62  L6076:  1..1111.1.
63  L6077:  .1.....111  -> L6101
64  L6100:  ...1.11111  -> L6027
65  L6101:  1111111.1.
66  L6102:  11..1.111.
67  L6103:  11111...1.
68  L6104:  11111...1.
69  L6105:  .....1.11.
70  L6106:  11.1111.1.
71  L6107:  .1...1.111  -> L6105
72  L6110:  1.1111..1.
73  L6111:  11.111..1.
74  L6112:  1.11.1.11.
75  L6113:  11..1.111.
76  L6114:  1....1.1..
77  L6115:  .1.1.1.111  -> L6125
78  L6116:  111.1.1.1.
79  L6117:  ....1.1.1.
80  L6120:  .11.111.1.
81  L6121:  .1.1.1..11  -> L6124
82  L6122:  ..1.1.1.1.
83  L6123:  .1.1111.1.
84  L6124:  111.1.1.1.
85  L6125:  ..1..1.1..
86  L6126:  1111111.11  -> L6376
87  L6127:  1.......11  -> L6200
88  L6130:  ..........
89  L6131:  ..........
90  L6132:  ..........
91  L6133:  ..........
92  L6134:  ..........
93  L6135:  ..........
94  L6136:  ..........
95  L6137:  ..........
96  L6140:  ..........
97  L6141:  ..........
98  L6142:  ..........
99  L6143:  1.11.1..11  -> L6264
100 L6144:  1.1..1..11  -> L6244
101 L6145:  .11....111
102 L6146:  ..11..111.
103 L6147:  .1.11...1.
104 L6150:  1..111....
105 L6151:  111.1.111.
106 L6152:  .11...111.
107 L6153:  11111.1111  -> L6373
108 L6154:  ..........
109 L6155:  ..........
110 L6156:  ..........
111 L6157:  ..........
112 L6160:  ..........
113 L6161:  ..........
114 L6162:  1......111  -> L6201
115 L6163:  .111.11..1  -> L6166
116 L6164:  .....11.1.
117 L6165:  ...1..1...  -> L1166   *****
118 L6166:  .111.1.1..
119 L6167:  .1111..111  -> L6171
120 L6170:  .1..1.1...
121 L6171:  ..11..111.
122 L6172:  ....11....
123 L6173:  ..........
124 L6174:  1.1.1.1...
```

```
                C -> A[X]
                A + B -> A[MS]
                IF NO CARRY GO TO RND8
                SHIFT RIGHT A[MS]
                A + 1 -> A[S]
                A + 1 -> A[X]
                IF S8 # 1
                    THEN GO TO RND9
RND8    :   P + 1 -> P
RND9    :   SHIFT RIGHT A[MS]
            0 -> B[MS]
            A - 1 -> A[XS]
            IF A[XS] >= 1
                THEN GO TO RN10
            GO TO RNOF
RN10    :   A + 1 -> A[XS]
            A EXCHANGE B[W]
            A + 1 -> A[P]
            A + 1 -> A[P]
RN11    :   SHIFT LEFT A[MS]
            A - 1 -> A[XS]
            IF NO CARRY GO TO RN11
            0 -> A[WP]
            A - 1 -> A[WP]
            SHIFT RIGHT A[MS]
            A EXCHANGE B[W]
            IF S8 # 1
                THEN GO TO RNRT
            A EXCHANGE C[X]
            0 -> B[X]
            IF C[XS] = 0
                THEN GO TO RTRN
            0 - C -> C[X]
            C - 1 -> C[XS]
RTRN    :   A EXCHANGE C[X]
RNRT    :   IF S5 # 1
                THEN GO TO RET3
            GO TO FST2
            NO OPERATION
            NO OPERATION
            NO OPERATION
            NO OPERATION
            NO OPERATION
            NO OPERATION
            NO OPERATION
            NO OPERATION
            NO OPERATION
SAVEZX:     GO TO SAVE
SAV2ZX:     GO TO SAV2
ADR9Z4:     C -> A[W]
            0 -> C[W]
            C - 1 -> C[P]
            C -> DATA ADDRESS
            A EXCHANGE C[W]
            C -> A[W]
            GO TO SVRT
            NO OPERATION
            NO OPERATION
            NO OPERATION
            NO OPERATION
            NO OPERATION
CONSZ4:     GO TO CONS
PIIIZ4:     JSB PUSH
            CLEAR STATUS
            SELECT ROM 1
PUSH    :   IF S7 # 1
                THEN GO TO PRET
            C -> STACK
PRET    :   0 -> C[W]
            RETURN
            NO OPERATION
LSTXZJ:     0 -> S1A
```

| # | Addr | Bits | Jump | | Label | Instruction |
|---|---|---|---|---|---|---|
| 125 | L6175: | .11..1...1 | -> L6144 | | | JSB SAV2ZX |
| 126 | L6176: | .11..1.... | -> L3177 | ***** | FST1 : | SELECT ROM 3 |
| 127 | L6177: | ...11..1.1 | -> L6031 | | TBMSZJ: | JSB RNDX |
| 128 | L6200: | .11..1.... | -> L3201 | ***** | FST2 : | SELECT ROM 3 |
| 129 | L6201: | .1....111. | | | CONS : | SHIFT LEFT A[W] |
| 130 | L6202: | .1....111. | | | | SHIFT LEFT A[W] |
| 131 | L6203: | .111.11..1 | -> L6166 | | | JSB PUSH |
| 132 | L6204: | 11.1111.1. | | | | A - 1 -> A[XS] |
| 133 | L6205: | 1....11111 | -> L6207 | | | IF NO CARRY GO TO CON7 |
| 134 | L6206: | .11111..11 | -> L6174 | | | GO TO LSTXZJ |
| 135 | L6207: | 11.1111.1. | | | CON7 : | A - 1 -> A[XS] |
| 136 | L6210: | 1...11.111 | -> L6215 | | | IF NO CARRY GO TO CON8 |
| 137 | L6211: | ..1..11... | | | | LOAD CONSTANT 2 |
| 138 | L6212: | .1.1.11... | | | | LOAD CONSTANT 5 |
| 139 | L6213: | .1...11... | | | | LOAD CONSTANT 4 |
| 140 | L6214: | .111111.11 | -> L6176 | | | GO TO FST1 |
| 141 | L6215: | 11.1111.1. | | | CON8 : | A - 1 -> A[XS] |
| 142 | L6216: | 1..11..111 | -> L6231 | | | IF NO CARRY GO TO CON9 |
| 143 | L6217: | .1...11... | | | | LOAD CONSTANT 4 |
| 144 | L6220: | .1.1.11... | | | | LOAD CONSTANT 5 |
| 145 | L6221: | ..1..11... | | | | LOAD CONSTANT 3 |
| 146 | L6222: | .1.1.11... | | | | LOAD CONSTANT 5 |
| 147 | L6223: | 1..1.11... | | | | LOAD CONSTANT 9 |
| 148 | L6224: | ..1..11... | | | | LOAD CONSTANT 2 |
| 149 | L6225: | ..11.11... | | | | LOAD CONSTANT 3 |
| 150 | L6226: | .111.11... | | | | LOAD CONSTANT 7 |
| 151 | L6227: | .1.11.1.1. | | | | C - 1 -> C[X] |
| 152 | L6230: | .111111..1 | -> L6176 | | | JSB FST1 |
| 153 | L6231: | ..11.11... | | | CON9 : | LOAD CONSTANT 3 |
| 154 | L6232: | .111.11... | | | | LOAD CONSTANT 7 |
| 155 | L6233: | 1....11... | | | | LOAD CONSTANT 8 |
| 156 | L6234: | .1.1.11... | | | | LOAD CONSTANT 5 |
| 157 | L6235: | .1...11... | | | | LOAD CONSTANT 4 |
| 158 | L6236: | ...1.11... | | | | LOAD CONSTANT 1 |
| 159 | L6237: | ...1.11... | | | | LOAD CONSTANT 1 |
| 160 | L6240: | .111.11... | | | | LOAD CONSTANT 7 |
| 161 | L6241: | 1....11... | | | | LOAD CONSTANT 8 |
| 162 | L6242: | .1...11... | | | | LOAD CONSTANT 4 |
| 163 | L6243: | .111111.11 | -> L6176 | | | GO TO FST1 |
| 164 | L6244: | ......11.. | | | SAV2 : | 0 -> P |
| 165 | L6245: | .1....111. | | | SAV1 : | SHIFT LEFT A[W] |
| 166 | L6246: | ....1111.. | | | | P + 1 -> P |
| 167 | L6247: | 11..1.11.. | | | | IF P # 12 |
| 168 | L6250: | 1.1..1.111 | -> L6245 | | | THEN GO TO SAV1 |
| 169 | L6251: | 1.1111111. | | | | 0 -> A[S] |
| 170 | L6252: | 111.1.111. | | | | A EXCHANGE C[W] |
| 171 | L6253: | 1..111..1. | | | | C -> DATA ADDRESS |
| 172 | L6254: | ..1.1..1.. | | | | 0 -> S2 |
| 173 | L6255: | 1.11111... | | | | DATA -> C |
| 174 | L6256: | 111.1.111. | | | | A EXCHANGE C[W] |
| 175 | L6257: | 1.111..1.. | | | | 0 -> S11 |
| 176 | L6260: | ....1.111. | | | | 0 -> S[W] |
| 177 | L6261: | ...1.1.1.. | | | | IF S1 # 1 |
| 178 | L6262: | 11111.1111 | -> L6373 | | | THEN GO TO SVRT |
| 179 | L6263: | .11..1.111 | -> L6145 | | | GO TO ADR924 |
| 180 | L6264: | .1..1.111. | | | SAVE : | A -> C[W] |
| 181 | L6265: | 111.1.111. | | | | A EXCHANGE C[W] |
| 182 | L6266: | ..11..111. | | | | 0 -> C[W] |
| 183 | L6267: | 1..111.... | | | | C -> DATA ADDRESS |
| 184 | L6270: | ..1...111. | | | | B -> C[W] |
| 185 | L6271: | 111.1.111. | | | | A EXCHANGE C[W] |
| 186 | L6272: | 1.1111.... | | | | C -> DATA |
| 187 | L6273: | .11..1..11 | -> L6144 | | | GO TO SAV2ZX |
| 188 | L6274: | ...111111. | | | FACT : | IF C[S] >= 1 |
| 189 | L6275: | .....11111 | -> L6007 | | | THEN GO TO ERRR |
| 190 | L6276: | ...1111.1. | | | | IF C[XS] >= 1 |
| 191 | L6277: | ......11111 | -> L6007 | | | THEN GO TO ERRR |
| 192 | L6300: | ...11.1.1. | | | FAC0 : | IF C[X] >= 1 |
| 193 | L6301: | 11...1..11 | -> L6304 | | | THEN GO TO FAC1 |
| 194 | L6302: | .....111.. | | | | P - 1 -> P |
| 195 | L6303: | 11..1.1111 | -> L6313 | | | GO TO FACT1 |
| 196 | L6304: | .....111.. | | | FAC1 : | P - 1 -> P |
| 197 | L6305: | ..111.11.. | | | | IF P # 3 |
| 198 | L6306: | 11..1...11 | -> L6310 | | | THEN GO TO FAC2 |
| 199 | L6307: | .....1..11 | -> L6004 | | | GO TO OFLW |
| 200 | L6310: | .1.11.1.1. | | | FAC2 : | C - 1 -> C[X] |

```
201   L6311:   11.......1   -> L6300                      JSB FAC0
202   L6312:   .1...1....   -> L2313        *****  NRM20 : SELECT ROM 2
203   L6313:   ...111..1.                          FACT1 : IF C[WP] >= 1
204   L6314:   .....11111   -> L6007                              THEN GO TO ERRR
205   L6315:   111.1.1.1.                                  A EXCHANGE C[X]
206   L6316:   1.11..11..                                  11 -> P
207   L6317:   .11.1.1.1.                                  IF C[X] = 0
208   L6320:   11.1.1.111   -> L6325                              THEN GO TO FACT2
209   L6321:   .1.11.1.1.                                  C - 1 -> C[X]
210   L6322:   ...11.1.1.                                  IF C[X] >= 1
211   L6323:   ....1..11    -> L6004                              THEN GO TO OFLW
212   L6324:   .1....111.                                  SHIFT LEFT A[W]
213   L6325:   111.1.111.                          FACT2 : A EXCHANGE C[W]
214   L6326:   1.111.111.                                  0 -> A[W]
215   L6327:   11111...1.                                  A + 1 -> A[P]
216   L6330:   ..1.1.111.                                  0 - C -> C[W]
217   L6331:   11..1.1.11   -> L6312                       IF NO CARRY GO TO NRM20
218   L6332:   111.1.111.                                  A EXCHANGE C[W]
219   L6333:   1...1.111.                                  SHIFT RIGHT C[W]
220   L6334:   .11111111.                                  C + 1 -> C[S]
221   L6335:   11....11..                          FACT3 : 12 -> P
222   L6336:   .1.1.11.1.                                  A -> B[MS]
223   L6337:   1111..111.                          FACT4 : A + C -> A[W]
224   L6340:   11.1111111   -> L6337                       IF NO CARRY GO TO FACT4
225   L6341:   11.1..111.                                  A - C -> A[W]
226   L6342:   .1....111.                                  SHIFT LEFT A[W]
227   L6343:   1111..111.                          FACT5 : A + C -> A[W]
228   L6344:   111...1111   -> L6343                       IF NO CARRY GO TO FACT5
229   L6345:   111111111.                                  A + 1 -> A[S]
230   L6346:   11..1.111.                                  A EXCHANGE B[W]
231   L6347:   1111.11..1   -> L6366                       JSB SHFT
232   L6350:   1.11..11..                                  11 -> P
233   L6351:   1111.11..1   -> L6366                       JSB SHFT
234   L6352:   ..1...111.                                  B -> C[W]
235   L6353:   ....11..1.                                  0 -> B[WP]
236   L6354:   1.1...111                                   SHIFT RIGHT B[W]
237   L6355:   11..1.111.                                  A EXCHANGE B[W]
238   L6356:   111.1.11.                                   A + B -> A[MS]
239   L6357:   11.111.111   -> L6335                       IF NO CARRY GO TO FACT3
240   L6360:   111.1.111.                                  A EXCHANGE C[W]
241   L6361:   1...1.1.1.                                  B EXCHANGE C[X]
242   L6362:   .1111.1.1.                          FACT6 : C + 1 -> C[X]
243   L6363:   11..1.1..1   -> L6312               FACT7 : JSB NRM20
244   L6364:   1...1.1..                           TNX3  : 0 -> S3
245   L6365:   .1..1....    -> L2366        *****         SELECT ROM 2
246   L6366:   ........1.                          SHFT  : IF B[P] = 0
247   L6367:   11111.1.11   -> L6372                              THEN GO TO SHFR
248   L6370:   1.1...1.1.                                  SHIFT RIGHT B[WP]
249   L6371:   11111.1.1.                                  A + 1 -> A[X]
250   L6372:   ....11....                          SHFR  : RETURN
251   L6373:   1.1..1.1..                          SVRT  : IF S10 # 1
252   L6374:   1111111.11   -> L6376                              THEN GO TO RET3
253   L6375:   1....1....   -> L4376        *****  RET4  : SELECT ROM 4
254   L6376:   .11...1....  -> L3377        *****  RET3  : SELECT ROM 3
255   L6377:   ..........                                  NO OPERATION
```

ROM 7

```
0     L7000:   .....1.111   -> L7005               PRFX  : GO TO WT22
1     L7001:   1.1...1.11   -> L7242               WT30  : GO TO WT29
2     L7002:   .....1.111   -> L7005               FIX1  : GO TO WT22
3     L7003:   .....1.111   -> L7005               EXPN  : GO TO WT22
4     L7004:   .....1.111   -> L7005               LNNN  : GO TO WT22
5     L7005:   ....11.111   -> L7015               WT22  : GO TO WT21
6     L7006:   .....1.111   -> L7005               INVX  : GO TO WT22
7     L7007:   ...1...1.1   -> L7021               WT18  : GO TO WT17
8     L7010:   .....1.111   -> L7005               PERC  : GO TO WT22
9     L7011:   1.1..11111   -> L7247               WT09  : GO TO WT08
10    L7012:   .....1.111   -> L7005               RCAL  : GO TO WT22
11    L7013:   .....1.111   -> L7005               STOR  : GO TO WT22
12    L7014:   .....1.111   -> L7005               ROLD  : GO TO WT22
13    L7015:   1.1..1..11   -> L7244               WT21  : GO TO WT20
14    L7016:   .....1.111   -> L7005               EXC1  : GO TO WT22
15    L7017:   1..1.11...                          REG9  : LOAD CONSTANT 9
16    L7020:   1..1.1111    -> L7223                       GO TO REGA
17    L7021:   1.1..1.111   -> L7245               WT17  : GO TO WT16
```

```
18  L7022:  ..11....11    -> L7060
19  L7023:  ...1111111    -> L7037
20  L7024:  .1...11...
21  L7025:  .11111.111    -> L7175
22  L7026:  .....1.111    -> L7005
23  L7027:  1....11...
24  L7030:  1...1111      -> L7223
25  L7031:  1.1.1...11    -> L7250
26  L7032:  .1111.1.11    -> L7172
27  L7033:  .11111..11    -> L7174
28  L7034:  ...1.11...
29  L7035:  .11111.111    -> L7175
30  L7036:  .....1.111    -> L7005
31  L7037:  .1.1.11...
32  L7040:  1..1..1111    -> L7223
33  L7041:  ..1...1111    -> L7047
34  L7042:  1..1...11     -> L7220
35  L7043:  11.1...111    -> L7321
36  L7044:  .....11...
37  L7045:  .11111.111    -> L7175
38  L7046:  .....1.111    -> L7005
39  L7047:  ....1..111    -> L7011
40  L7050:  .....1.111    -> L7005
41  L7051:  ..1.11.111    -> L7055
42  L7052:  ....1.111     -> L7005
43  L7053:  .....1.111    -> L7005
44  L7054:  .....1.111    -> L7005
45  L7055:  ...1.111111   -> L7057
46  L7056:  .....1.111    -> L7005
47  L7057:  ..11.11111    -> L7067
48  L7060:  .11..11...
49  L7061:  1..1..1111    -> L7223
50  L7062:  ....111111    -> L7017
51  L7063:  ...1.11111    -> L7027
52  L7064:  .111.11...
53  L7065:  .11111.111    -> L7175
54  L7066:  .....1.111    -> L7005
55  L7067:  111111.111    -> L7375
56  L7070:  1.111.111.
57  L7071:  ....11.1.1    -> L7015
58  L7072:  .111.1.11     -> L7164
59  L7073:  1...111.11    -> L7216
60  L7074:  .111..1.11    -> L7162
61  L7075:  .11..1....    -> L3076    *****
62  L7076:  1..1.1.1..
63  L7077:  ..1111.111    -> L7075
64  L7100:  .....11.1.
65  L7101:  ...111111.
66  L7102:  1111111.11    -> L7376
67  L7103:  .1.11.1.1.
68  L7104:  .1.11.1.1.
69  L7105:  .11.111.1.
70  L7106:  1111111.11    -> L7376
71  L7107:  .1..11..111   -> L7111
72  L7110:  1..1...1..
73  L7111:  .1111.1.1.
74  L7112:  .1.1...11     -> L7110
75  L7113:  111.1.111.
76  L7114:  1.1.1.1...
77  L7115:  ...1.11...
78  L7116:  ..11.11...
79  L7117:  ...1...11.
80  L7120:  1111111.11    -> L7376
81  L7121:  .11..11...
82  L7122:  1.1...11..
83  L7123:  ...1.....1.
84  L7124:  1111111.11    -> L7376
85  L7125:  1.....11..
86  L7126:  1.11.1.1..
87  L7127:  .111..11..
88  L7130:  .11..11...
89  L7131:  .111..11..
90  L7132:  ...1.....1.
91  L7133:  1111111.11    -> L7376
92  L7134:  ..1.1.1...
93  L7135:  .1.1...11..
```

```
DIG6  :  GO TO REG6
DIG5  :  GO TO REG5
DIG4  :  LOAD CONSTANT 4
         GO TO REG1
ADDD  :  GO TO WT22
REG8  :  LOAD CONSTANT 8
         GO TO REGA
WT06  :  GO TO WT05
DIG3  :  GO TO REG3
DIG2  :  GO TO REG2
DIG1  :  LOAD CONSTANT 1
         GO TO REG1
MULT  :  GO TO WT22
REG5  :  LOAD CONSTANT 5
         GO TO REGA
WT11  :  GO TO WT10
SIGP  :  GO TO CHS3
DCPT  :  GO TO RETN
DIG0  :  LOAD CONSTANT 0
         GO TO REG1
DIVD  :  GO TO WT22
WT10  :  GO TO WT09
TANG  :  GO TO WT22
DL06  :  GO TO DL05
COSS  :  GO TO WT22
SINN  :  GO TO WT22
TPOL  :  GO TO WT22
DL05  :  GO TO DL04
SQAR  :  GO TO WT22
DL04  :  GO TO DL03
REG6  :  LOAD CONSTANT 6
         GO TO REGA
DIG9  :  GO TO REG9
DIG8  :  GO TO REG8
DIG7  :  LOAD CONSTANT 7
         GO TO REG1
SUBT  :  GO TO WT22
DL03  :  GO TO RTRN
CLRX  :  0 -> A[W].
         JSB WT21
EEXX  :  GO TO EEX1
CHS1  :  GO TO CHS2
CLOK  :  GO TO CHS4
ENT1  :  SELECT ROM 3
ENT1Z3:  IF S9 # 1
           THEN GO TO ENT1
INIT  :  CLEAR STATUS
         IF C[S] >= 1
           THEN GO TO ERR2
         C - 1 -> C[X]
         C - 1 -> C[X]
         IF C[XS] = 0
           THEN GO TO ERR2
         GO TO INT2
INT1  :  SHIFT RIGHT C[M]
INT2  :  C + 1 -> C[X]
         IF NO CARRY GO TO INT1
INT3  :  A EXCHANGE C[W]
         M -> C
         LOAD CONSTANT 1
         LOAD CONSTANT 3
         IF A >= C[M]
           THEN GO TO ERR2
         LOAD CONSTANT 6
         10 -> P
         IF A >= C[P]
           THEN GO TO ERR2
         8 -> P
         SHIFT RIGHT A[WP]
         7 -> P
         LOAD CONSTANT 6
         7 -> P
         IF A >= C[P]
           THEN GO TO ERR2
         C EXCHANGE M
         5 -> P
```

| | | | | |
|---|---|---|---|---|
| 94 | L7136: | 1.11.1..1. | | SHIFT RIGHT A[WP] |
| 95 | L7137: | 1.11.1..1. | | SHIFT RIGHT A[WP] |
| 96 | L7140: | 1.11.1..1. | | SHIFT RIGHT A[WP] |
| 97 | L7141: | 1.11.1..1. | | SHIFT RIGHT A[WP] |
| 98 | L7142: | 11..1.111. | | A EXCHANGE B[W] |
| 99 | L7143: | 11.111..1. | | A - 1 -> A[WP] |
| 100 | L7144: | 1.111.1..1 | | 0 -> A[X] |
| 101 | L7145: | 1......11.. | | 8 -> P |
| 102 | L7146: | 11.11...1. | | A - 1 -> A[P] |
| 103 | L7147: | 1.11..11.. | | 11 -> P |
| 104 | L7150: | 11111...1. | | A + 1 -> A[P] |
| 105 | L7151: | 11111...1. | | A + 1 -> A[P] |
| 106 | L7152: | 11.111111. | | A - 1 -> A[S] |
| 107 | L7153: | 11..1.111. | | A EXCHANGE B[W] |
| 108 | L7154: | .....1..1.. | KEY2 : | 0 -> S0 |
| 109 | L7155: | ..1.1..1.1 -> L7051 | | JSB DL06 |
| 110 | L7156: | ..1.1..1.1 -> L7051 | | JSB DL06 |
| 111 | L7157: | ......1.1.. | | IF S0 # 1 |
| 112 | L7160: | 1...11..11 -> L7214 | | THEN GO TO KEY3 |
| 113 | L7161: | 1.1..11.11 -> L7246 | | GO TO WT12 |
| 114 | L7162: | 1.1....1.. | CHS4 : | 1 -> S10 |
| 115 | L7163: | 1.1....1.11 -> L7244 | | GO TO WT20 |
| 116 | L7164: | ......1.1. | EEX1 : | IF S[X] = 0 |
| 117 | L7165: | 1...1...11 -> L7210 | | THEN GO TO EEX2 |
| 118 | L7166: | ....1.1.1. | | 0 -> B[X] |
| 119 | L7167: | .....11111 -> L7007 | | GO TO WT18 |
| 120 | L7170: | .......... | | NO OPERATION |
| 121 | L7171: | .......... | | NO OPERATION |
| 122 | L7172: | ..11.11... | REG3 : | LOAD CONSTANT 3 |
| 123 | L7173: | 1..1.1111 -> L7223 | | GO TO REGA |
| 124 | L7174: | ..1..11... | REG2 : | LOAD CONSTANT 2 |
| 125 | L7175: | 1..1.1111 -> L7223 | REG1 : | GO TO REGA |
| 126 | L7176: | .11..1.... -> L3177 ***** | FST1 : | SELECT ROM 3 |
| 127 | L7177: | .....1.1.. | KEY1 : | IF S0 # 1 |
| 128 | L7200: | .......111 -> L7001 | | THEN GO TO WT30 |
| 129 | L7201: | 1....1.1.. | | IF S8 # 1 |
| 130 | L7202: | .11.11..11 -> L7154 | | THEN GO TO KEY2 |
| 131 | L7203: | 1...1.1.. | | DISPLAY OFF |
| 132 | L7204: | 1...1.1.. | | 0 -> S8 |
| 133 | L7205: | 11.....11.. | | 12 -> P |
| 134 | L7206: | ..11..111. | | 0 -> C[W] |
| 135 | L7207: | ..11.1.... | | KEYS -> ROM ADDRESS |
| 136 | L7210: | 11..1.1.1. | EEX2 : | A EXCHANGE B[X] |
| 137 | L7211: | 11..1.1.1. | | A - 1 -> A[X] |
| 138 | L7212: | 11..1.1.1. | | A EXCHANGE B[X] |
| 139 | L7213: | 1.1..1.111 -> L7245 | | GO TO WT16 |
| 140 | L7214: | 1......1.. | KEY3 : | 1 -> S8 |
| 141 | L7215: | ..1....111 -> L7041 | | GO TO WT11 |
| 142 | L7216: | 1.1..1.1.. | CHS2 : | IF S10 # 1 |
| 143 | L7217: | .111..1.11 -> L7162 | | THEN GO TO CHS4 |
| 144 | L7220: | 1.1.1..1.. | CHS3 : | 0 -> S10 |
| 145 | L7221: | 1...111... | | C -> DATA ADDRESS |
| 146 | L7222: | 1..1.11.11 -> L7226 | | GO TO CHS5 |
| 147 | L7223: | 1..111.... | REGA : | C -> DATA ADDRESS |
| 148 | L7224: | 1.1..1.1.. | | IF S10 # 1 |
| 149 | L7225: | 1...11.1111 -> L7233 | | THEN GO TO REGB |
| 150 | L7226: | 111.1.111. | CHS5 : | A EXCHANGE C[W] |
| 151 | L7227: | .11...111. | | C -> A[W] |
| 152 | L7230: | 1..1...11. | | SHIFT RIGHT C[M] |
| 153 | L7231: | 1.1111.... | | C -> DATA |
| 154 | L7232: | 1.1..11.11 -> L7246 | | GO TO WT12 |
| 155 | L7233: | 1.11111... | REGB : | DATA -> C |
| 156 | L7234: | 11....11.. | | 12 -> P |
| 157 | L7235: | .11.1....1. | | IF C[P] = 0 |
| 158 | L7236: | 1.1.....11 -> L7240 | | THEN GO TO REGC |
| 159 | L7237: | ...11.111. | | 0 -> C[W] |
| 160 | L7240: | 111.1.111. | REGC : | A EXCHANGE C[W] |
| 161 | L7241: | .1....1.11. | | SHIFT LEFT A[MS] |
| 162 | L7242: | ..1.11.1.1 -> L7055 | WT29 : | JSB DL05 |
| 163 | L7243: | ..1.1111.1 -> L7057 | WT24 : | JSB DL04 |
| 164 | L7244: | ..1.1111.1 -> L7057 | WT20 : | JSB DL04 |
| 165 | L7245: | ..1.1111.1 -> L7057 | WT16 : | JSB DL04 |
| 166 | L7246: | ..1.1111.1 -> L7057 | WT12 : | JSB DL04 |
| 167 | L7247: | ..11.111.1 -> L7067 | WT08 : | JSB DL03 |
| 168 | L7250: | 1.1.1.1... | WT05 : | M -> C |
| 169 | L7251: | 1...1.1... | | DISPLAY OFF |

| | | | |
|---|---|---|---|
| 170 | L7252: | ....1.1... | |
| 171 | L7253: | 1.1..1.1.. | |
| 172 | L7254: | .111111111 | -> L7177 |
| 173 | L7255: | ...1..11.. | |
| 174 | L7256: | 111111..1. | |
| 175 | L7257: | .111111111 | -> L7177 |
| 176 | L7260: | 11...11.. | |
| 177 | L7261: | 11111...1. | |
| 178 | L7262: | 1.1...1.11 | -> L7242 |
| 179 | L7263: | .111..11.. | |
| 180 | L7264: | 11111...1. | |
| 181 | L7265: | ...1...1. | |
| 182 | L7266: | 1.11...11 | -> L7270 |
| 183 | L7267: | 1.1....111 | -> L7243 |
| 184 | L7270: | 1.1111..1. | |
| 185 | L7271: | 1..1..11.. | |
| 186 | L7272: | 11111...1. | |
| 187 | L7273: | ....11.111 | -> L7015 |
| 188 | L7274: | 1.1...11.. | |
| 189 | L7275: | 11111...1. | |
| 190 | L7276: | ...1....1. | |
| 191 | L7277: | 11....111 | -> L7301 |
| 192 | L7300: | 1.1..1.111 | -> L7245 |
| 193 | L7301: | ..11.1..1. | |
| 194 | L7302: | 1.1111..1. | |
| 195 | L7303: | 1.11..11.. | |
| 196 | L7304: | 11111...1. | |
| 197 | L7305: | 11..1.1.11 | -> L7312 |
| 198 | L7306: | 1.111.111. | |
| 199 | L7307: | 11...11.. | |
| 200 | L7310: | 11111...1. | |
| 201 | L7311: | 1.1..11111 | -> L7247 |
| 202 | L7312: | ...1..11.. | |
| 203 | L7313: | 11..11.111 | -> L7315 |
| 204 | L7314: | ....1..111 | -> L7011 |
| 205 | L7315: | 1.111.111. | |
| 206 | L7316: | 1.11..11.. | |
| 207 | L7317: | 11111...1. | |
| 208 | L7320: | ...11..111 | -> L7031 |
| 209 | L7321: | 1.1.1.1... | |
| 210 | L7322: | ..11.1..1. | |
| 211 | L7323: | ..1...11.. | |
| 212 | L7324: | ......1:.1. | |
| 213 | L7325: | 11.11...11 | -> L7330 |
| 214 | L7326: | .1...11.. | |
| 215 | L7327: | 11.11..111 | -> L7331 |
| 216 | L7330: | .11..11... | |
| 217 | L7331: | ..1.1.1... | |
| 218 | L7332: | ..11..111. | |
| 219 | L7333: | 11....11.. | |
| 220 | L7334: | ....1.111. | |
| 221 | L7335: | 1..111.... | |
| 222 | L7336: | 1...1.111. | |
| 223 | L7337: | 1.11111... | |
| 224 | L7340: | ...11...1. | |
| 225 | L7341: | 111..1..11 | -> L7344 |
| 226 | L7342: | 111.1.11.1 | -> L7353 |
| 227 | L7343: | 1.1111.... | |
| 228 | L7344: | 1...1.111. | |
| 229 | L7345: | .1111...1. | |
| 230 | L7346: | 11.111.111 | -> L7335 |
| 231 | L7347: | 1.11..11. | |
| 232 | L7350: | 111.1.111. | |
| 233 | L7351: | 111.1.11.1 | -> L7353 |
| 234 | L7352: | .111111.11 | -> L7176 |
| 235 | L7353: | .11.11..1. | |
| 236 | L7354: | 111111.111 | -> L7375 |
| 237 | L7355: | 111.1.111. | |
| 238 | L7356: | .1....111. | |
| 239 | L7357: | 1.....11.. | |
| 240 | L7360: | .1.....1.1. | |
| 241 | L7361: | .11...11.. | |
| 242 | L7362: | .1...1..1. | |

```
             DISPLAY TOGGLE
             IF S10 # 1
                  THEN GO TO KEY1
TIM0  :      1 -> P
             A + 1 -> A[WP]
             IF NO CARRY GO TO KEY1
             6 -> P
             A + 1 -> A[P]
             IF NO CARRY GO TO WT29
             7 -> P
             A + 1 -> A[P]
             IF A >= C[P]
                  THEN GO TO TIM1
             GO TO WT24
TIM1  :      0 -> A[WP]
             9 -> P
             A + 1 -> A[P]
             IF NO CARRY GO TO WT21
             10 -> P
             A + 1 -> A[P]
             IF A >= C[P]
                  THEN GO TO TIM2
             GO TO WT16
TIM2  :      0 -> C[WP]
             0 -> A[WP]
             11 -> P
             A + 1 -> A[P]
             IF NO CARRY GO TO TIM3
             0 -> A[W]
             12 -> P
             A + 1 -> A[P]
             IF NO CARRY GO TO WT08
TIM3  :      IF A >= C[M]
                  THEN GO TO TIM4
             GO TO WT09
TIM4  :      0 -> A[W]
             11 -> P
             A + 1 -> A[P]
             IF NO CARRY GO TO WT06
RETN  :      M -> C
             0 -> C[WP]
             2 -> P
             IF B[X] = 0
                  THEN GO TO RET1
             LOAD CONSTANT 4
             GO TO RET2
RET1  :      LOAD CONSTANT 6
RET2  :      C EXCHANGE M
             0 -> C[W]
             12 -> P
             0 -> B[W]
RET3  :      C -> DATA ADDRESS
             B EXCHANGE C[W]
             DATA -> C
             IF C[P] >= 1
                  THEN GO TO RET4
             JSB FIXX
             C -> DATA
RET4  :      B EXCHANGE C[W]
             C + 1 -> C[P]
             IF NO CARRY GO TO RET3
             SHIFT RIGHT A[M]
             A EXCHANGE C[W]
             JSB FIXX
             GO TO FST1
FIXX  :      IF C[WP] = 0
                  THEN GO TO RTRN
             A EXCHANGE C[W]
             SHIFT LEFT A[W]
             8 -> P
             SHIFT LEFT A[WP]
             6 -> P
             SHIFT LEFT A[WP]
```

```
243    L7363:    .1...1..1.
244    L7364:    .1...1..1.
245    L7365:    11....11..
246    L7366:    11111.1.1.
247    L7367:    1..11...1.
248    L7370:    111111..11    -> L7374
249    L7371:    11.11.1.1.
250    L7372:    .1.....11.
251    L7373:    1111.11111    -> L7367
252    L7374:    111.1.111.
253    L7375:    ....11....
254    L7376:    ..11..111.
255    L7377:    .1..1.11.1    -> L7113
```

```
                SHIFT LEFT A[WP]
                SHIFT LEFT A[WP]
                12 -> P
                A + 1 -> A[X]
FIX2    :   IF A[P] >= 1
                    THEN GO TO FXRT
                A - 1 -> A[X]
                SHIFT LEFT A[M]
                GO TO FIX2
FXRT    :   A EXCHANGE C[W]
RTRN    :   RETURN
ERR2    :   0 -> C[W]
                JSB INT3
```

OPERATING INSTRUCTIONS

All of the operations described below are controlled or initiated from the keyborad input unit 12 which is shown in FIG. 1.

Fundamental Operations

Getting Started

Slide the power switch to ON. The display blinks when an improper operations is made. The blinking will stop as soon as

[CLX]

is pressed and you may enter a new problem.

Keyboard

Almost every key performs two distinct functions. The symbol for the primary function appears on the key, and the symbol for the alternate function appears above the key like this $\sqrt{x}$
[$x^2$].

To use the primary function, merely press the selected key; to use the alternate function, press the prefix key 110 before pressing the associated key like this □ $\sqrt{x}$
  [$x^2$].

Alternate functions are indicated like this

□ [$\sqrt{x}$]

throughout the following pages.

Key In And Entering Numbers

Each time a number key is pressed, that number appears left-justified on the display in the order as pressed. Note that a decimal point symbol is included with the number entry keys; it must be keyed in if it is part of the number. For example, 314.32 would be keyed as

[3][1][4][.][3][2].

To signal that the number string keyed in is complete, press

[ENTER ↑].

Now you may key in another number string. If you make a mistake when keying in a number, clear the entire number string by pressing

[CLX].

Then key in the correct number.

Performing Simple Arithmethic

In the calculator arithmetic answers appear on the display immediately after pressing

[+], [−], [×], or [÷] key.

In an adding machine, the

[+] key adds whatever is already in the machine to the last entry, and the

[−] key subtracts this last entry. The calculator not only adds and subtracts the same way as the familiar adding machine, it also multiplies and divides this way too—the

[×] key multiplies whatever is already in the machine by the last entry, and the ⊟ key divides by the last entry.
For example, add 12 and 3.

| Press: | See displayed: |
|---|---|
| 12 ENTER↑ 3 ⊞ → | 15.00 |

This same principle is used for calculating any arithmetic problem having two numbers and one arithmetic operator.

Correcting Input Errors

The calculator automatically stores the last number displayed (last input argument) that precedes the last function performed. For example, if you wanted to verify the last input argument from the example above,

| Press: | See displayed: | |
|---|---|---|
| ☐ Last X → | 3.00 | last input argument |

A special storage register—LAST X—is provided for this purpose. As each new function is keyed (executed), the contents of Last X are overwritten with the new value.

Last X is a very useful feature for correcting errors, such as pressing the wrong arithmetic operator key or entering the wrong number. For example, if you were performing a long calculation where you meant to subtract 3 from 12 and divided instead, you could compensate as follows:

| Press: | See displayed: | |
|---|---|---|
| 12 ENTER↑ 3 ⊟ → | 4.00 | oops— you wanted to subtract |
| ☐ Last X → | 3.00 | retrieves last number displayed preceding operation (division) |
| ⊠ → | 12.00 | reverses division operation; you are back where you started |
| ☐ Last X → | 3.00 | retrieves last number displayed before operation (multiplication) |
| ⊟ → | 9.00 | correct operation produces desired results |

If you want to correct a number in a long calculation,

Last X can save you from starting over. For example, divide 12 by 2.157 after you have divided by 3.157 in error.

| Press: | See displayed: | |
|---|---|---|
| 12 ENTER↑ 3.157 ⊟ → | 3.80 | you wanted to divide by 2.157, not 3.157 |
| ☐ Last X → | 3.16 | retrieves last number displayed preceding operation |
| ⊠ → 2.157 | 12.00 | you're back at the beginning |
| ⊟ → | 5.56 | Eureka! |

Clearing

To clear the display, press

CLX .

To clear the entire calculator (except for certain data storage registers—more about that later), press

☐ CLEAR .

(Notice that is isn't necessary —although it may be comforting — to clear the calculator when starting a new calculation.) To clear everything, including all data storage registers, turn the calculator off then on.

Display And Rounding Options

Up to 15 characters can be displayed: mantissa sign, 10-digit mantissa, decimal point, exponent sign, and 2-digit exponent. Two display modes (fixed decimal and scientific notation) and a variety of rounding options are provided. Rounding options affect the display only; the calculator always maintains full accuracy internally. Fixed decimal notation is specified by pressing

FIX followed by the appropriate number key to specify the number of decimal places (0 – 9) to which the display is to be rounded. The display is left-justified and includes trailing zeros within the setting specified. When the calculator is turned on, the mode and decimal place settings are

FIX 2.

For example,

| Press: | | See displayed: |
|---|---|---|
| 123.456 | → | 123.456 |
| [FIX] 4 | → | 123.4560 |
| [FIX] 1 | → | 123.5 |
| [FIX] 0 | → | 123. |

Scientific notation is useful when you are working with very large or very small numbers. It is specified by pressing

☐ SCI , followed by the appropriate number key to specify the number of decimal places (0 –9) to be displayed. Again, the display is left-justified and includes trailing zeros. For example,

| Press: | | See displayed: |
|---|---|---|
| ☐ [SCI] 6 | → | 1.234560    02 |
| ☐ [SCI] 3 | → | 1.235    02 |

Now return to 2 decimal places in fixed decimal notation.

| Press: | | See displayed: |
|---|---|---|
| [FIX] 2 | → | 123.46 |

Keying In Negative Numbers

To enter a negative number, key in the number, then press

[CHS]

(change sign key). The number, preceded by a minus (−) sign, will appear on the display.
For example,

| Press: | | See displayed: |
|---|---|---|
| 12 [CHS] | → | −12. |

| Press: | | See displayed: |
|---|---|---|
| [ENTER↑] 23 [−] | → | −35.00 |

To change the sign of a negative or positive number on the display, press

[CHS].

For example, to change the sign of −35.00 now in the display,

| Press: | | See displayed: |
|---|---|---|
| [CHS] | → | 35.00 |

Keying In Exponents

You can key in numbers having exponents by pressing

[EEX]

(Enter Exponent). For example, key in 15.6 trillion ($15.6 \times 10^{12}$), and multiply it by 25.

| Press: | | See displayed: |
|---|---|---|
| 15.6 [EEX] | → | 15.6    00 |
| 12 | → | 15.6    12 |
| [ENTER↑] | → | 1.560000000  13 |
| 25 [×] | → | 3.900000000  14 |

You can save time when keying in exact powers of ten by pressing

[EEX]

and then pressing the desired power of ten. For example, key in 1 million ($10^6$) and divide by 52.

| Press: | | See displayed: |
|---|---|---|
| [EEX] 6 | → | 1.    06 |
| [ENTER↑] | → | 1000000.00 |
| 52 [÷] | → | 19230.77 |

To see your answer in scientific notation with 6 decimal places,

| Press: | See displayed: |
|---|---|
| ☐ SCI 6 → | 1.923077  04 |

To key in negative exponents, key in the number,

EEX , press CHS to make the exponent negative, then key in the power of 10. For example, key in Planck's constant ($h$) —roughly, $6.625 \times 10^{-27}$ erg. sec—and multiply it by 50.

| Press: | See displayed: |
|---|---|
| 6.625 EEX → | 6.625     00 |
| 27 → | 6.625     27 |
| CHS → | 6.625    -27 |
| ENTER ↑ → | 6.625000 -27 |
| 50 × → | 3.312500 -25 |

If you return to a

FIX 2 setting, the result is rounded to zero. For example

| Press: | See displayed: |
|---|---|
| FIX 2 → | 0.00 |

Performing Simple Functions

Finding Reciprocals

To calculate reciprocals of a display number, key in the number, then press

1/x .

For example, find the reciprocal of 25.

| Press: | See displayed: |
|---|---|
| 25 1/x → | 0.04 |

You can also calculate the reciprocal of a value in a previous calculation without re-entering the number. For example, calculate 1 (⅓+ 1/6).

| Press: | See displayed: | |
|---|---|---|
| 3 1/x → | 0.33 | reciprocal of 3 |
| 6 1/x → | 0.17 | reciprocal of 6 |
| + → | 0.50 | sum of reciprocals |
| 1/x → | 2.00 | reciprocal of sum |

Finding Square Roots

To calculate the square root of any displayed value, press

☐ √x̄

For example, find the square root of 16.

| Press: | See displayed: |
|---|---|
| 16 ☐ √x̄ → | 4.00 |

Now find the square root of the result.

| Press: | See displayed: |
|---|---|
| ☐ √x̄ → | 2.00 |

Squaring Numbers x² permits you to square numbers with a single keystroke. For example, what is the square of the result in the previous example?

| Press: | See displayed: | |
|---|---|---|
| x² → | 4.00 | 2 squared |

Raising Numbers To Powers $y^x$ permits you to raise a positive number (both integers and decimals) to any power. For example, calculate $2^9$ (2×2×2×2×2×2×2×2×2).

| Press: | See displayed: |
|---|---|
| 2 ENTER↑ 9 □ [Y^x] → | 512.00 |

Check different decimal settings

| Press: | See displayed: |
|---|---|
| [FIX] 6 → | 512.000000 |
| [FIX] 7 → | 511.9999999 |

Because a logarithmic routine is used internally to compute $y^x$, the results may not be accurate to the last decimal place—as illustrated in the example above.

Now change the decimal setting back to 2 places and find $8^{1.2567}$.

| Press: | See displayed: |
|---|---|
| [FIX] 2 → | 512.00 |
| 8 ENTER↑ → | 8.00 |
| 1.2567 □ [y^x] → | 13.64 |

In conjunction with

[1/x], $y^x$ provides a simple way to extract roots. For example, find the cube root of 5.

| Press: | See displayed: |  |
|---|---|---|
| 5 ENTER↑ → | 5.00 | |
| 3 [1/x] → | 0.33 | reciprocal of 3 |
| □ $y^x$ → | 1.71 | cube root of 5 |

Sample Case:

Assume that a body moves along a straight line acording to the equation $S = \frac{1}{2} t^6 - 4t$. T. Determine its velocity ($V = 3t^5 - 4$) and acceleration ($A = 15t^4$) at $t = 2$ seconds, where:

$V = 3 \cdot 2^5 - 4$
$A = 15 \cdot 2^4$

Solution:

| Press: | See displayed: |  |
|---|---|---|
| 2 ENTER↑ 5 □ [y^x] → | 32.00 | |
| 3 [×] → | 96.00 | |
| 4 [−] → | 92.00 | velocity |
| 2 ENTER↑ 4 □ [y^x] → | 16.00 | |
| 15 [×] → | 240.00 | |

Using π

π is one of the fixed constants provided in the calculator. Merely press

□ π whenever you need it in a calculation before executing the applicable operation. For example, calculate 3π.

| Press: | See displayed: |
|---|---|
| 3 ENTER↑ □ π [×] → | 9.42 |

Using Factorials

The n!

function permits you to handle-combinations and permutations with ease. To caluclate the factorial of a displayed number merely press □ n!

Factorials can be calculated for positive integers from 0 through 59. Attempting to calculate the factorial of a fractional on negative value is an improper operation and will result in a blinking display. The equation is:

$$P(12,9) = \frac{12!}{(12-9)!}$$

| Press: | Solution: See displayed: | |
|---|---|---|
| 12 □ n! → | 4.790016000 08 | 12! |
| □ Last X → | 12.00 | value is retrieved from previous operation |
| 9 [−] → | 3.00 | |
| □ [n!] → | 6.00 | 3! |

-continued

| Press: | Solution: See displayed: | |
|---|---|---|
| ÷ → | 79833600.00 | number of different lineups possible |

Sample Case 2, Combinations

Let a pair die be tossed 10 times. What is the probability that you will obtain the number 3 exactly 4 times in the 10 tosses? The required probability is given by the binomial law:

$$C_4^{10}\,(1/6)^4\,(5/6)^6 = C_4^{10}\,5^6/6^{10}$$

where: $C_4^{10}\quad 10!/4!6!$
Solution:

| Press: | See displayed: | |
|---|---|---|
| 5 ENTER↑ 6 □ $y^x$ → | 15625.00 | $5^6$ |
| 6 ENTER↑ 10 □ $y^x$ → | 60466175.86 | $6^{10}$ |
| ÷ → | 0.000 | displayed value rounded to zero |
| FIX 4 → | 0.0003 | value extended to 4 decimal places |
| FIX 2 → | 0.00 | |
| 10 □ n! → | 3628800.00 | 10! |
| × → | 937.71 | |
| 4 □ n! → | 24.00 | 4! |
| ÷ → | 39.07 | |
| 6 □ n! → | 720.00 | 6! |
| ÷ → | 0.05 | probability |

Calculating Percentage Problems

The calculator simplifies the calculation of percentage problems because you do not hve to convert percents to their decimal equivalents before using them; just press the % key after keying in the percent value. Three types of percentage problems are handled:
   Finding percentage of number (base × rate)
   Finding net amount (base + or − percentage)
   Finding percent difference between a number and a base
   (number − base/base).

Finding Percentage

To find the percentage of a number, key in the base number and press

ENTER↑.

Then key in the percent and press

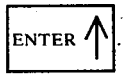.

For example, to find 14% of 300,

| Press: | See displayed: | |
|---|---|---|
| 300 ENTER↑ 14 % → | 42.00 | percentage |

Finding Net Amount

An additional feature is that after finding the percentage, the calculator still contains the original base number from which you may calculate the net amount by simply pressing + or −, respectively. For example,

| Press: | See displayed: | |
|---|---|---|
| 300 ENTER↑ 14 % → | 42.00 | percentage |
| + → | 342.00 | net amount (base plus percentage) | or

| Press: | See displayed: | |
|---|---|---|
| 300 ENTER↑ 14 % → | 42.00 | percentage |
| − → | 258.00 | net amount (base less percentage) |

Finding Percent Difference Between Two Numbers

To find the percent differencee between a number and the base, enter the base number and press

Enter the second number, press

 Δ% .

For example, if you want to find the rate of increase of your current mortgate payment ($240/mo) over what you were paying in rent 15 years ago ($70/mo),

| Press: | | | | See displayed: | |
|---|---|---|---|---|---|
| 70 | ENTER↑ | 240 | ☐ Δ% → | 242.86 | % increase |

OPERATIONAL STACK

Stack Registers

The calculator uses an operational stack and reverse "Polish" (Lukasiewicz notation).

The four temporary memory locations (number registers)-arranged in the form of a vertical stack—are called X (bottom register), Y, Z, and T (top register), respectively.

| Contents | Register Name | |
|---|---|---|
| t | T | To avoid confusion between the name of a register and its contents, the register is designated by a capital letter and the contents by a small letter. Thus, x, y, z and t are the contents of X, Y, Z and T, respectively. |
| z | Z | |
| y | Y | |
| x | X | |

NOTE
The contents of the X register are always displayed.

When you key in a number, it goes into the X-register—the bottom register and the only one displayed. When you press

.

this number is duplicated into the Y-register. At the same time, $y$ is moved up to Z and $z$ is moved up to T like this:

| Press: | Contents Register |
|---|---|
| 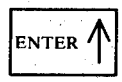 | 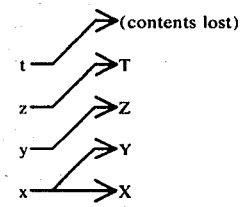 |

When you press

.

$x$ is added to $y$, and the entire stack drops to display the answer in X. The same thing happens for

.

Whenever the stack drops, $t$ is duplicated from T into Z, and $z$ drops to Y, as follows:

| Press | Contents Register |
|---|---|
|  | 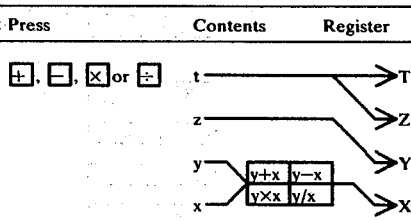 |

Look at the contents of the stack as we calculate (3 × 4) + (5 × 6). Directly above the keys pressed you see the information in X, Y, Z and T after the keystroke.

MANIPULATING THE STACK

The  key

"rolls down" the stack and lets you review the contents (in last in-first out order) without losing data. It is also used to reposition data within the stack. Here is what happens each time you press

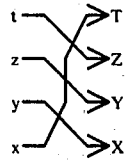

Example:

Load the stack by pressing: 1 [ENTER↑] 2 [ENTER↑] 3 [ENTER↑] 4. (The stack now contains x = 4, y = 3, z = 2, and t = 1). To review the contents of the stack press 

four times. The fourth [R↓] returns the stack to its original position (x = 4, y = 3, z = 2 and t = 1). Note: the stack is raised and t is lost when a keyboard entry or [RCL] operation follows [R↓], unless that entry follows [ENTER↑], [CLX], or [Σ+].

The [x⇌y] key exchanges x and y as shown below.

Press    Contents  Register

You will often find that x and y should be exchanged before a [−], [÷], [Yˣ] operation.

PERFORMING COMBINED ARITHMETIC PROCESSES

The calculator performs combined arithmetic operations —serial, mixed and chained calculations—with ease.

SERIAL CALCULATION

Any time a new number is entered after any calculation, the calculator performs an automatic

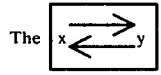

on the result of the calculation. This feature permits a serial calculation having intermediate results to which a series of new values can be applied without your having to write down or store any of the intermediate results. For example, find the sum of 4, 6, 8 and 10.

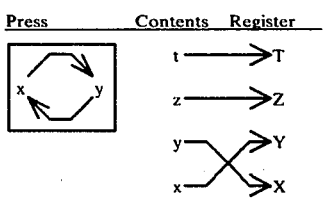

-continued

| Press: | See displayed: |
|---|---|
| 10 [+] → | [28.00] |

The same principle applies to serial multiplication, division and subtraction too. Note that an equals key (=) is not needed since results are displayed when a function key is pressed.

CHAINED CALCULATION

Chained calculations can be used to find the sums of produces (adding the results to two or more multiplication operations) or the product of sums (multiplying the results of two or more addition operations). For example, if you sold 12 items at $1.58 each, 8 items at $2.67 each and 16 items at $0.54 each, the total sale price is:

(12 × 1.58) + (8 × 2.67) + (16 × 0.54)

| Press: | See displayed*: |
|---|---|
| 12 [ENTER↑] 1.58 [×] → | [18.96] |

-continued

| Press: | See displayed*: |
|---|---|
| 8 ENTER↑ 2.67 ×→ | 21.36 |
| +→ | 40.32 |
| 16 ENTER↑ .54 ×→ | 8.64 |
| +→ | 48.96 |

*interpreted as dollars ($)

MIXED CHAINED CALCULATION

Chain calculations can use any arithmetic operator—divide and subtract as well as multiply and divide. In addition, a problem may be calculated with any combination of arithmetic operators in both nested and linked operations. For example, to calculate $[\{(12 \times 5) - 2\} + \{(8 \div 2) + 10\}] \times (213.08 \times 5 \div 1.33) \div 2$

| Press: | See displayed: |
|---|---|
| 12 ENTER↑ 5 ×→ | 60.00 |
| 2 −→ | 58.00 |
| 8 ENTER↑ 2 ÷→ | 4.00 |
| 10 +→ | 14.00 |
| +→ | 72.00 |
| 213.08 ENTER↑ 5 ×→ | 1065.40 |
| 1.33 ÷→ | 801.05 |
| ×→ | 57675.79 |
| 2 ÷→ | 28837.89 |

LAST X REGISTER

The last input argument of a calculation is automatically stored in the Last X register when a function is executed. This feature provides a handy error correction device, as well as a facility for reusing the same argument in multiple calculations-since it allows recall of the argument by pressing ☐ Last X .

The register is cleared only when the calculator is turned off or when a new argument replaces (or overwrites) the previous one.

DATA STORAGE REGISTERS

In addition to the operational stack and Last X registers, the calculator provides 9 registers for user storage.

UNRESTRICTED STORAGE

Registers $R_1 - R_4$

Registers $R_1 - R_4$ can be used for temporary storage without restriction. Values stored in these registers are not affected by calculations or by clearing operations New values are entered by writing over the old contents; that is, by storing a new number. The contents are lost, however, when the calculator is turned off.

RESTRICTED STORAGE

Registers $R_5 - R_8$

Registers $R_5 - R_8$ are used internally when performing summations using

☐ Σ+ and ☐ x,s .

When summations are not being performed, these registers may be used for general purpose storage. However, since registers $R_5 - R_8$ are not overwritten by new values, they must be cleared of existing values by pressing

☐ CLEAR before they are used in summations.

Register $R_9$

Register $R_9$ is required internally when performing trigonometric functions and polar/rectangular conversions; any values stored there will be lost. Otherwise, register $R_9$ may be used for general purpose storage in a manner identical to registers $R_1 - R_4$.

STORING AND RECALLING DATA

To store a value appearing on the display (whether the result of a calculation or a keyboard entry), press

☐ STO , then press the number key ( ☐ 1 − ☐ 9 )

specifying the storage register. To retrieve the value press

☐ RCL , then press the applicable number key. A copy of the recalled value appears on the display (X-register); the original value remains in the specified constant storage register. The number previously on the display is loaded into the Y-register unless the keystroke immediately preceding

 was 

(these keys do not cause the stack to be pushed up by the next data entry).

For example, add 8, 20, 17, 43; store the result in $R_1$; and divide the individual numbers by the stored sum to find what part each is of the total.

| Press: | See displayed: | |
|---|---|---|
| 8 ENTER↑ 20 + 17 + 43 + → | 88.00 | total |
| STO 1 → | 88.00 | |
| 8 RCL 1 ÷ → | 0.09 | or 9% of total |
| 20 RCL 1 ÷ → | 0.23 | or 23% of total |
| 17 RCL 1 ÷ → | 0.19 | or 19% of total |
| 43 RCL 1 ÷ → | 0.49 | or 49% of total |

PERFORMING REGISTER ARITHMETIC

Arithmetic operations (+, −, ×, ÷) can be performed between a data storage register and the X-register (display). To modify the contents of a storage register, press

STO followed by the applicable operator key ( +, −, ×, ÷ ), then the number key specifying the storage register. For example, store 6 in register $R_1$, then increment it by 2.

| Press: | See displayed: | |
|---|---|---|
| 6 STO 1 → | 6.00 | 6 → $R_1$ |
| 2 STO + 1 → | 2.00 | 2 + $r_1$ → $R_1$ | to see what is now stored in register $R_1$,

| Press: | See displayed: | |
|---|---|---|
| RCL 1 → | 8.00 | $r_1$ → display |

Now, subtract the register contents (8) from a displayed value (make it 13) and store the result back in the register $R_1$.

| Press: | See displayed: | |
|---|---|---|
| 13 STO − 1 → | 13.00 | 13 − $r_1$ → $R_1$ |
| RCL 1 → | 5.00 | $r_1$ → display |

Conversely, to alter a displayed value without affecting the stored value, press

RCL , the applicable operator, then the number key specifying the storage register. For example, add the current value stored in register $R_1$ (5.00) to a new entry (2).

| Press: | See displayed: | |
|---|---|---|
| 2 RCL + 1 → | 7.00 | 2 + $r_1$ → display |
| RCL 1 → | 5.00 | $r_1$ → display |

Subtract the contents of register $R_1$ from a new entry (11).

| Press: | See displayed: |
|---|---|
| 11 [RCL] [−] [1] → | [6.00] 11 − $r_1$ → display |
| [RCL] [1] → | [5.00] $r_1$ → display |

Now combine several operations.

| Press: | See displayed: |
|---|---|
| 3 [STO] [1] → | [3.00] (3 → $R_1$) |
| 2 [STO] [+] [1] → | [2.00] (2 + $r_1$ → $R_1$) |
| 35 [STO] [−] [1] → | [35.00] (35 ÷ $r_1$ → $R_1$) |
| [RCL] [1] → | [7.00] ($r_1$ → display) |
| 5 [RCL] [×] [1] → | [35.00] (5 × $r_1$ → display) |

To use a storage register as a counter or tally register, you must set that register to zero--either by clearing or by storing 0. To increment the counter, use a [STO] [+] operation sequence. To decrement the counter, press [CHS] to change the sign of the displayed value before continuing with the [STO] x [+] sequence.

METRIC/U.S. UNIT CONVERSION CONSTANTS

The calculator provides built-in conversion constants (accurate to 10 digits) for:
  centimeters-to-inches and inches-to-centimeters (1 inch = 2.540000000 centimeters)
  kilograms-to-pounds and pounds-to-kilograms (1 lb. = 0.453592370 kilograms)
  liters-to-gallons and gallons-to-liters (1 gal. = 3.785411784 liters)

To use these constants, key in the measure to be converted, press

□.

then press the desired constant key followed by the applicable operator:

[×]

to obtain metric equivalents,

[÷]

to obtain U.S. equivalents.
  Note that it isn't necessary to press

after keying in the initial value; the HP-45 calculator performs an automatic

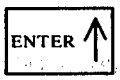

when a preprogrammed constant key is pressed or when a user stored constant is recalled. For example,

| Press: | See displayed: |
|---|---|
| 12 □ cm/in → | [2.54] |
| [×] → | [30.48] |

LOGARITHMIC AND EXPONENTIAL FUNCTIONS

The calculator computes both natural and common logarithms as well as their inverse functions (antilogarithms):

[ln]    is $\log_e$ (natural log); takes log of value in X-register to base e (2.718...)

[$e^x$]    is antilog$_e$ (natural antilog); raises e (e = 2.718...) to the power of value in X-register. (To display the value of e, press [$e^x$].)

□ [log]    is $\log_{10}$ (common log); takes log of value in X-register to base 10

□ [$10^x$]    is antilog$_{10}$ (common antilog); raises 10 to the power of value in X-register.

STATISTICAL FUNCTIONS

The statistical function $\bar{x}, s$ is used to find the mean (arithmetic average) and standard deviation (measure of dispersion around the mean) of data entered and summed. Options are provided to enable you to interact with and modify results by adding new data or correcting errors. Also, the number of entries and sum of the squares-as well as the sum of entries in two dimensions-can be obtained. Summation/averaging calculations also use the $\boxed{\Sigma+}$ (sigma) key to sum the numbers used in calculating means and standard deviations. Because the $\boxed{\Sigma+}$ uses storage registers $R_5$–$R_8$, these registers must be cleared with

☐ CLEAR before pressing $\boxed{\Sigma+}$ or errors could result.
Information is entered as follows:
Press ☐ $\boxed{CLEAR}$ to assure that registers $R_5$–$R_8$ are clear of previous data. Key in each value and sum with $\boxed{\Sigma+}$ key.

To correct an incorrect value before it is loaded with the $\boxed{\Sigma+}$ keystroke, press $\boxed{CLX}$.

After the value is summed, correct by (a) reentering incorrect value, then (b) pressing ☐ $\Sigma-$, followed by (c) entering correct value, and finally (d) pressing $\boxed{\Sigma+}$;

then continue entering values. The last $\boxed{\Sigma+}$ pressed provides the number of entries.
Press ☐ $\boxed{x, s}$ to obtain mean.
Press $\boxed{x \rightleftarrows y}$ to obtain standard deviation.
If there are more values to be included—say, if you want to add to the data sample and modify results—key in and press $\boxed{\Sigma+}$ after each.
Additional information is also available by performing steps 6 – 10 (in any order).

---

Press $\boxed{RCL}$ $\boxed{5}$ to obtain number of entries.

Press $\boxed{RCL}$ $\boxed{6}$ to obtain sum of squares for X-register entries.

Press $\boxed{RCL}$ $\boxed{7}$ to obtain sum of X-register entries.

Press $\boxed{RCL}$ $\boxed{8}$ to obtain sum of Y-register entries.*

Alternatively, press $\boxed{RCL}$ $\boxed{X+}$ to obtain sum of X-register entries.

and $\boxed{x \rightleftarrows y}$ to obtain sum of Y-register entries.

*A Y-register entry is any value residing in the Y-register at the time $\boxed{\Sigma+}$ is pressed; e.g. if the entry sequence is $n_1$ $\boxed{ENTER\uparrow}$ $n_2$ $\boxed{\Sigma+}$ , where: $n_1$ = Y-value
$n_2$ = X-value

TRIGONOMETRIC FUNCTIONS

The following trigonometric functions are provided:

[SIN] (sine)

[SIN⁻¹] (arc sine)

[COS] (cosine)

[COS⁻¹] (arc cosine)

[TAN] (tangent)

[TAN⁻¹] (arc tangent)

To use the [SIN], [COS] and [TAN] functions, key in the number and press the appropriate function key. To use the arc functions, press □, then press the associated function key. For example, find SIN⁻¹ (.866).

Press                           See Displayed:

.866 □ SIN⁻¹ →        |60.00        |/degrees

Note that trigonometric functions use storage register 9; any value stored there will be overwritten during a trigonometric calculation.

Angular Modes

Trigonometric functions can be performed in any one of three angular modes: decimal degrees, decimal radians and decimal grads—the latter being a 100th part of a right angle in the centesimal system of measuring angles. Note that trigonometric functions assume decimal angles regardless of angular mode. To select a mode, press

□.

then press the associated key:

[DEG] or [RAD] or [GRD] .

The mode selected will remain operative until a different mode is selected, or until the calculator is turned off; when turned back on, the calculator automatically defaults to decimal degrees mode.

Sample Case 1

Find the cosine of 35°. If the calculator is not already in degrees mode, press

□ [DEG]

before performing the calculation.

| Press: | Solution: | See displayed: |
|---|---|---|
| 35 [COS] | → | [0.82] |

Sample Case 2

Find the tangent of 6 radians.

| Press: | Solution: | See displayed: |
|---|---|---|
| □ [RAD] 6 [TAN] | → | [−0.29] |

Sample Case 3

Find the arc sine of 0.5 in grads.

| Press: | Solution: | See displayed: |
|---|---|---|
| □ [GRD] .5 □ SIN⁻¹ | → | [33.33] |

Degrees-Minutes-Seconds Conversion

Displayed angles can be converted from any decimal angular mode to degress-minutes-seconds, in the format dd.mmss, by pressing

□ →D.MS .

Conversely, to convert an angle displayed in degrees-minutes-seconds to the decimal equivalent in the specified angular mode, press

□ D.MS → .

This feature is also useful in calculating problems dealing with time (hours-minutes-seconds) too.

Note that the result of a

→D.MS

Conversion is rounded to the nearest second both internally and on the display. Conversions involving angles ≥ 10⁵ degrees are an improper operation.

Sample Case 1

Assume surveyor want to add 2 angles: 10° 8′ 56″ and 2° 17′ 42″. These must first be converted to decimal degrees before adding and then converted back to degrees-minutes-seconds.

Solution:

| Press: | See displayed: | |
|---|---|---|
| ☐ [DEG] 10.0856 ☐ D.MS → → | 10.15 | decimal degrees |
| 2.1742 ☐ D.MS → → | 2.30 | decimal degrees |
| [+] → | 12.44 | decimal degrees |
| ☐ →D.MS → | 12.2638 | 12° 26′ 38″ |

Sample Case 2

Find the arc sine of 0.55 in degrees mode and convert to degrees-minutes-seconds.

Solution:

| Press: | See displayed: | |
|---|---|---|
| ☐ [DEG] .55 ☐ [SIN⁻¹] → | 33.37 | decimal degrees |
| ☐ →D.MS → | 33.2201 | 33°22′01″ |

Sample Case 3

Using the data from Sample Case 2, above, calculate the arc sine of 0.55 in radians mode and convert the result to degrees-minutes-seconds.

| Press: | See displayed: | |
|---|---|---|
| ☐ [RAD] .55 ☐ [SIN⁻¹] → | 0.58 | radians |
| ☐ →D.MS → | 33.2201 | 33° 22′ 01″ |

POLAR/RECTANGULAR COORDINATE CONVERSION

Two functions are provided for polar/rectangular coordinate conversion. To convert values in X and Y-registers, (representing rectangular x, y coordinates, respectively) to polar r, θ coordinates (magnitude and angle, respectively), press

Conversely, to convert values in X and Y-registers (representing polar r, θ, respectively) to rectangular coordinates (x, y, respectively), press

Because polar/rectangular conversions involve trigonometry, storage register 9 is used. Thus, any values previously stored in this register will be overwritten when coordinate conversions are performed.

Sample Case 1

Convert rectangular coordinates (4, 3) to polar form with the angle expressed in degrees.

Solution:

| Press: | See displayed: | |
|---|---|---|
| ☐ [DEG] 3 ENTER↑ 4 [→P] → | 5.00 | magnitude |
| [x↔y] → | 36.87 | angle in degrees |

Sample Case 2

Convert polar coordinates (8, 120°) to rectangular coordinates.

Solution:
Press: See displayed:

-continued

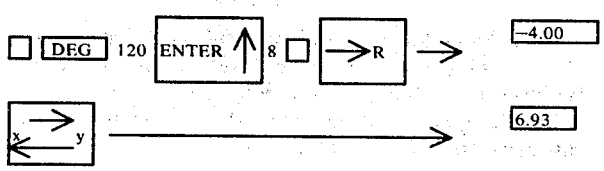
X-coordinate

Y-coordinate

By combining the polar/rectangular function with the accumulation function,

[Σ−ŕ]
[Σ+], you can add and subtract vector components. The sum of these are contained in storage registers $R_7$ and $R_8$:

$r_7 = X_1 \pm X_2 \pm \ldots \pm X_n = \Sigma x$
$r_8 = Y_1 \pm Y_2 \pm \ldots \pm Y_n \Sigma y$ To display the contents of registers $R_7$ and $R_8$, press

[RCL] [Σ+]

to obtain the sum of x-coordinates (register 7); then press

[x⇄y]

to obtain the sum of y-coordinates (register 8).

OPERATING LIMITS

Accuracy

Accuracy specifications for the calculator depend on the operation performed. The elementary operations ( [+], [−], [×], [÷], [1/x], [√x̄], [x²], [DMS→] )

have a maximum error of ± 1 count in the 10th (least significant) digit. Errors in these elementary operations are caused by rounding answers to the 10th (least significant) digit. Percent ( [%], [Δ%] )

and factorial ( [n!] )

functions are accurate to ± 1 count in the ninth digit. Values converted to degrees-minutes-seconds ( [→D.MS] )

are rounded to the nearest second.

An example of round off error is seen when evaluating $(\sqrt{5})^2$. Rounding $\sqrt{5}$ to 10 significant digits gives 2.236067977. Squaring this number gives the 19 digit product 4.999999997764872529. Rounding the square to 10 digits gives 4.999999998. If the next larger approximation (2.236067978) is squared, the result is 5.000000002237008484. Rounding this number to 10 significant digits gives 5.000000002. There simply is no 10-digit number whose square is 5.00000000.

Accurcy specifications for operations using the mean function ( x̄,s )

depend upon the data used and number of entries.

The accuracy of the remaining operations (trigonometric, logarithmic and exponential) depends upon the argument. The answer that is displayed will be the correct answer for an input argument having a value that is within ±N counts (see table below) in the tenth (least significant) digit of the actual input argument. For example, 1.609437912 is given as the natural log of 5.

However, this is an approximation because the result displayed (1.609437912) is actually the natural log of a number between 4.999999998 and 5.000000002 which is ±2 counts (N = 2 for logarithms) in the 10th (least significant) digit of the actual input argument.

Table

| OPERATION | Values for N VALUE OF N |
|---|---|
| [log] x, [ln] x, and [eˣ] | 2* |
| trigonometric | 3** |
| [yˣ] | 4 for y, and 7 for x |
| [10ˣ] | 7 |
| [→P], [→R] | 4 |

*Logarithmic operations have an additional limitation of ±3 counts in the 10th (least significant) digit in the displayed answer.
**Trigonometric operations have an additional accuracy limitation of ±1 × 10⁻⁹ in the displayed answer.

Underflow and Overflow Display Formats

To ensure greater accuracy, the calculator performs all calculations using a ten-digit number and a power of 10. This abbreviated form of expressing numbers is called scientific notation; i.e., $23712.45 = 2.371245 \times 10^4$ in scientific notation.

If a number is too large for the display format specified, the calculator automatically displays the number in scientific notation. For example, if you keyed in 100, and pressed

[FIX] 8, the calculator will display the number in scientific notation because there isn't enough room to display 8 digits after the decimal point

---

Press:                    See displayed:

[FIX] 8

100 ENTER ↑ → [1.000000000 02]

---

Numbers whose magnitude is less than 1, and are too small to be displayed in the specified

[FIX] format , are displayed as zero. For example, the number 0.000396 is displayed in

---

[FIX] 3 format:

Press:                    See displayed:

[FIX] 3

.000396 ENTER ↑ → [0.000]

☐ SCI 3 → [3.960 −0.4]

[FIX] 6 → [0.000396]

---

When a

SCI setting is used, values are displayed rounded to the number of decimal places specified. Values having a magnitude of ≥ $10^{100}$ are displayed as ± 9.99999999999. Values having a magnitude of < $10^{-99}$ are displayed as zero.

Improper Operations

If you attempt a calculation containing an improper operation—say division by zero—an error signal is triggered and a blinking display appears. To clear, press

[CLX] , or any other key that doesn't trigger another error. The following are examples of improper operations:

Division by zero

[$Y^x$] , where Y   O

[$\sqrt{x}$] , where X<O

[1/x] where x = O n! , where n < 1 and > 69

---

APPENDIX A. KEYBOARD SUMMARY

| KEY | FUNCTION/OPERATION |
|---|---|
| OFF [/] ON | Power switch |
| $y^x$ | Exponential |
| [1/x] | Reciprocal |
| log | Common logarithm |
| [ln] | Natural logarithm |
| $10^x$ | Common antilogarithm |
| $e^x$ | Natural antilogarithm |
| SCI | Scientific notation display mode |
| [FIX] | Fixed point notation display mode |
| ☐ | Gold key; alternate function |
| $\sqrt{x}$ | Square root of x |
| $x^2$ | x squared |
| →R | Polar-to-rectangular conversion |
| →P | Rectangular-to-polar conversion |
| $SIN^{-1}$ | Arc sine |
| [SIN] | Sine |
| $COS^{-1}$ | Arc cosine |
| [COS] | Cosine |
| $TAN^{-1}$ | Arc tangent |
| [TAN] | Tangent |
| n! | Factorial |
| X ⇄ Y | Exchange x and y |
| $\bar{x}$,s | Mean, standard deviation |
| R ↓ | Roll down stack |
| →D.MS | Convert to degrees-minutes-seconds |
| [STO] | Store value in $R_n$ (n = 1, 2, ..., 9) |
| D.MS→ | Convert from degrees-minutes-seconds |
| [RCL] | Recall stored value from $R_n$ (n = 1, 2, ..., 9) |
| Δ% | Percent difference |

-continued

| KEY | APPENDIX A. KEYBOARD SUMMARY FUNCTION/OPERATION |
|---|---|
| [%] | x percent of y |
| DEG | Degrees mode |
| [ENTER↑] | Copy x into Y |
| RAD | Radians mode |
| [CHS] | Change sign |
| GRD | Grads mode |
| [EEX] | Enter exponent |
| CLEAR | Clear stack and $R_5 - R_8$ |
| [CLX] | Clear X |
| [−] | Subtract |
| [+] | Add |
| [×] | Multiply |
| [÷] | Divide |
| cm/in | Centimeters/inches conversion |
| kg/lb | Kilograms/pounds conversion |
| ltr/gal | Liters/gallons conversion |
| LAST X | Recall last x argument |
| π | Pi constant (3.14 . . . . ) |
| Σ− | Decrement summation |
| [Σ+] | Summation |
| [0]-[9], [.] | Numeric key set |

We claim:

1. An electronic calculator comprising:
an input unit including a plurality of manually operable non-numeric and numeric keys for entering information and numbers into the calculator;
a first memory unit coupled to the input unit and including a first storage register for storing a first number in units of decimal degrees having an integer portion and a decimal portion received therefrom, said integer portion referring to all digits to the left of the decimal in conventional decimal notation and said decimal portion referring to all digits to the right of the decimal in conventional decimal notation;
a processing unit coupled to the input unit and the first memory unit and including means for converting the first number to a second number having first, second, and third parts representing said first number in units of degrees, minutes, and seconds respectively by multiplying the decimal portion of the first number by a preselected factor to provide a first result having an integer portion and a decimal portion and for multiplying the decimal portion of the first result by said preselected factor to provide a second result having an integer portion and a decimal portion; and
an output display unit coupled to the processing unit for providing a visual display of the second number;
said first part of the second number being the integer portion of the first number and appearing to the left of the decimal in said visual display;
said second part of the second number being the integer portion of the first result and appearing in said visual display as the first two digits to the right of the decimal;
said third part of the second number being the integer portion of the second result and appearing in said visual display as the second two digits to the right of the decimal.

2. An electronic calculator as in claim 1 wherein the preselected is the number 60.

3. An electronic calculator as in claim 1 wherein:
said first number has first, second, and third parts representing units of degrees, minutes, and second, respectively;
said second number has an integer portion and a decimal portion representing units of decimal degrees; and
said means are effective for converting the first number to the second number by dividing the second part of the first number by the preselected factor to provide the first result and for dividing the third part of the first number by the preselected factor to provide the second result;
said integer portion of the second number being the first part of the first number and appearing to the left of the decimal in said visual display;
said first two digits of the decimal portion of the second number being the integer portion of the first result and appearing in said visual display as the first two digits to the right of the decimal;
said second two digits of the decimal portion of the second number being the integer portion of the second result and appearing in said visual display as the second two digits to the right of the decimal.

4. An electronic calculator as in claim 3 wherein the preselected factor is the number 60.

5. An electronic calculator as in claim 3 for converting a first number in units of inches to a second number in units of centimeters wherein:
first memory unit further includes a second storage register for storing a first preselected conversion factor; and
the processing unit includes means responsive to actuation of one or more of the keys of the input unit for automatically multiplying the first number by said first preselected conversion factor to obtain the second number, and for causing the output display unit to provide a visual display thereof.

6. An electronic calculator as in claim 5 wherein the first preselected factor is 2.540000000.

7. An electronic calculator as in claim 3 for converting a first number in units of gallons to a second number in units of liters wherein:
the first memory unit further includes a second storage register for storing a second preselected conversion factor; and
the processing unit includes means reponsive to actuation of one or more of the keys of the input unit for automatically multiplying the first number by said second preselected conversion factor to obtain the second number, and for causing the output display unit to provide a visual display thereof.

8. An electronic claculator as in claim 7 wherein the second preselected factor is 0.453592370.

9. An electronic calculator as in claim 3 for converting a first number in units of pounds to a second number in units of centimeters wherein:

the first memory unit further includes a second storage register for storing a third preselected conversion factor; and the processing unit includes means responsive to actuation of one or more of the keys of the input unit for automatically multiplying the first number by said third preselected conversion factor to obtain the second number, and for causing the output display unit to provide a visual display thereof.

10. An electronic calculator as in claim 9 wherein the third preselected factor is 3.785411784.

* * * * *

UNITED STATES PATENT AND TRADEMARK OFFICE
CERTIFICATE OF CORRECTION

PATENT NO. : 4,001,569
DATED : January 4, 1977
INVENTOR(S) : Peter D. Dickinson et al.

It is certified that error appears in the above-identified patent and that said Letters Patent are hereby corrected as shown below:

Column 1 of the Title page, after "[75] Inventors: please add the names --David S. Cochran, Palo Alto; Chung C. Tung, Santa Clara, Calif. --.

Column 2, line 52, "Rom'0-7" should read --ROM's 0-7--;

Column 6, line 66, the word "and", first occurrence, should be deleted and insert the word --at--;

Column 8, line 48, the word "the", second occurrence, should read --The--;

Column 10, line 12, following the word "circuit" insert --20--;

Column 19, in the Table appearing at the top of this column the line which reads "0 1001     A⟶B     1 1001     ⟷B "
                                                                                                              A should read --

0 1001     A⟶B     1 1001     A⟷B--;

UNITED STATES PATENT AND TRADEMARK OFFICE
CERTIFICATE OF CORRECTION

PATENT NO. : 4,001,569

DATED : January 4, 1977

INVENTOR(S) : Peter D. Dickinson et al.

It is certified that error appears in the above-identified patent and that said Letters Patent are hereby corrected as shown below:

Column 19, in the Table appearing at the top of this column the line which reads

"0 1010    A-C ⟶ C    1 1010    A-C̄ ⟶ Ā"

should read

-- 0 1010    A-C ⟶ C    1 1010    A-C ⟶ A--;

Column 20, line 6, "U V" should read -- $U \geq V$ --;

Column 22, line 34, delete the comma after the word "circuits";

Column 26, line 34, "0 D1S7)" should read --0 (D1S7)--; line 41, "D1s4" should read --D1S4--;

Column 28, line 62, after the word "last" insert the word --number--;

Column 29, line 45, "3,56789" should read --3.56789--; line 47, the word "exaple" should read --example--;

UNITED STATES PATENT AND TRADEMARK OFFICE
CERTIFICATE OF CORRECTION

PATENT NO. : 4,001,569
DATED : January 4, 1977
INVENTOR(S) : Peter D. Dickinson et al.

It is certified that error appears in the above-identified patent and that said Letters Patent are hereby corrected as shown below:

Column 89, line 31,

" ☐ [Last x] → [3.00]   last input argument"

should read

-- ☐ [Last X] ⟶ [3.00]   last input argument --;

Column 89, line 43, "Last X" should read -- [Last X] --;

Column 89, line 59,

" ☐ [Last x] → [3.00]   retrieves last number displayed preceding operation (division)"

should read

-- ☐ [Last x] → [3.00]   retrieves last number displayed preceding operation (division) --;

UNITED STATES PATENT AND TRADEMARK OFFICE
CERTIFICATE OF CORRECTION

PATENT NO. : 4,001,569

DATED : January 4, 1977

INVENTOR(S) : Peter D. Dickinson et al.

It is certified that error appears in the above-identified patent and that said Letters Patent are hereby corrected as shown below:

Column 89, line 63,

" ☐ [Last x] → [3.00]   retrieves last number displayed before operation (multiplication)"

should read

-- ☐ ⌈Last x⌉ → [3.00]   retrieves last number displayed before operation (multiplication) --;

Column 90, line 4, "Last x" should read -- ⌈Last x⌉ --;

Column 90, line 16,

" ☐ [Last x] → [3.16]   retrieves last number displayed preceding operation"

should read

-- ☐ ⌈Last x⌉ → [3.16]   retrieves last number displayed preceding operation --;

UNITED STATES PATENT AND TRADEMARK OFFICE
CERTIFICATE OF CORRECTION

PATENT NO. : 4,001,569
DATED : January 4, 1977
INVENTOR(S) : Peter D. Dickinson et al.

It is certified that error appears in the above-identified patent and that said Letters Patent are hereby corrected as shown below:

Column 90, line 39, "is" should read --it--;

Column 91, line 20, "☐ SCI" should read -- ☐ ⌐SCI¬ --;

Column 91, lines 34 and 36,

" ☐ SCI 6   →   1.234560 02

☐ SCI 3   →   1.235     02 "

should read

-- ☐ ⌐SCI¬ 6   →   1.234560 02

☐ ⌐SCI¬ 3   →   1.235     02 --;

Column 93, line 8,

" ☐ SCI 6   →   1.923077 04 "

should read

-- ☐ ⌐SCI¬ 6   →   1.923077 04 --;

UNITED STATES PATENT AND TRADEMARK OFFICE
CERTIFICATE OF CORRECTION

PATENT NO. : 4,001,569

DATED : January 4, 1977

INVENTOR(S) : Peter D. Dickinson et al.

It is certified that error appears in the above-identified patent and that said Letters Patent are hereby corrected as shown below:

Column 93, line 68, "1(1/3 + 1/6)" should read $$-- \frac{1}{1/3 + 1/6} --;$$

Column 94, line 20, "□ $\sqrt{x}$" should read -- □ $\boxed{\sqrt{x}}$ --;

Column 94, line 28, "16 □ $\boxed{\sqrt{x}}$ → $\boxed{4.00}$" should read -- 16 □ $\boxed{\sqrt{x}}$ → $\boxed{4.00}$ --;

Column 94, line 38, "□ $\boxed{\sqrt{x}}$ → $\boxed{2.00}$" should read -- □ $\boxed{\sqrt{x}}$ → $\boxed{2.00}$ --;

Column 94, line 63, "$\boxed{Y^x}$" should read -- $\boxed{Y^x}$ --;

UNITED STATES PATENT AND TRADEMARK OFFICE
CERTIFICATE OF CORRECTION

PATENT NO. : 4,001,569
DATED : January 4, 1977
INVENTOR(S) : Peter D. Dickinson et al.

It is certified that error appears in the above-identified patent and that said Letters Patent are hereby corrected as shown below:

Column 95, lines 5-6, "2 [ENTER↑] 9 [ ] [$Y^x$] → [512.00]"

should read --2 [ENTER↑] 9 [ ] [$Y^x$] → [512.00] --;

Column 95, line 22, " $Y^x$ ," should read -- [$Y^x$], --;

Column 95, line 38, "1.2567 [ ] [$Y^x$] → [13.64]"

should read -- 1.2567 [ ] [$Y^x$] → [13.64] --;

Column 95, line 45 " [1/x] , $Y^x$ " should read -- [1/x] , [$Y^x$] --;

Column 95, line 58, " [ ] $Y^x$ → [1.71] cube root of 5 "

should read -- [ ] [$Y^x$] → [1.71] cube root of 5 --;

Column 96, line 5, " [$Y^x$] " should read -- [$Y^x$] --;

Column 96, line 12, " [$Y^x$] " should read -- [$Y^x$] --;

UNITED STATES PATENT AND TRADEMARK OFFICE
CERTIFICATE OF CORRECTION

PATENT NO. : 4,001,569                 Page 8 of 15
DATED : January 4, 1977
INVENTOR(S) : Peter D. Dickinson et al.

It is certified that error appears in the above-identified patent and that said Letters Patent are hereby corrected as shown below:

Column 96, line 23, " $\pi$ " should read -- $\boxed{\pi}$ --;

Column 96, line 32, " $\pi$ " should read -- $\boxed{\pi}$ --;

Column 96, line 40, "n!" should read -- $\boxed{n!}$ --;

Column 96, line 47, " $\square$ n!" should read -- $\square$ $\boxed{n!}$ --;

Column 96, line 51, "59" should read --69--;

Column 96, line 63, "12 $\square$ n!" should read --12 $\square$ $\boxed{n!}$ --;

Column 96, line 64, " $\square$ Last X" should read -- $\square$ $\boxed{\text{Last X}}$ --;

Column 96, line 68, " $\square$ $\boxed{n!}$ " should read -- $\square$ $\boxed{n!}$ --;

Column 97, line 22, " 5 $\boxed{\text{ENTER}\uparrow}$ 6 $\square$ $\boxed{y^x}$ → $\boxed{15625.00}$ $5^6$" should read -- 5 $\boxed{\text{ENTER}\uparrow}$ 6 $\square$ $\boxed{y^x}$ → $\boxed{15625.00}$ $5^6$ --;

UNITED STATES PATENT AND TRADEMARK OFFICE
CERTIFICATE OF CORRECTION

PATENT NO. : 4,001,569
DATED : January 4, 1977
INVENTOR(S) : Peter D. Dickinson, et al It is certified that error appears in the above–identified patent and that said Letters Patent are hereby corrected as shown below:

Column 97, line 25, "6 $\boxed{\text{ENTER}\uparrow}$ 10 $\square$ $\boxed{y^2}$ " should read --6 $\boxed{\text{ENTER}\uparrow}$ 10 $\square$ $\boxed{y^2}$ --;

Column 97, line 34, "10 $\square$ $\boxed{n!}$ " should read --10 $\square$ $\boxed{n!}$ --;

Column 97, line 37, "4 $\square$ $\boxed{n!}$ " should read --4 $\square$ $\boxed{n!}$ --;

Column 97, line 40, "6 $\square$ $\boxed{n!}$ " should read --6 $\square$ $\boxed{n!}$ --;

Column 99, line 3, "differencee" should read --difference--;

Column 99, line 14, " $\square$ $\Delta\%$ " should read -- $\square$ $\boxed{\Delta\%}$ --;

Column 99, line 24, " $\boxed{\Delta\%}$ " should read -- $\boxed{\Delta\%}$ --;

Column 99, line 32, "(Lukasiewicz" should read --(Lukasiewicz)--;

UNITED STATES PATENT AND TRADEMARK OFFICE
CERTIFICATE OF CORRECTION

PATENT NO. : 4,001,569
DATED : January 4, 1977
INVENTOR(S) : Peter D. Dickinson, et al It is certified that error appears in the above-identified patent and that said Letters Patent are hereby corrected as shown below:

Column 103, line 64, "☐ Last X" should read -- ☐ ⸢Last X⸥ --;

Column 104, line 8, "$R^4$" should read --$R_4$--;

Column 104, line 22, "x,s" should read -- ⸢x,s⸥ --;

Column 104, line 32, "CLEAR" should read -- ⸢CLEAR⸥ --;

Column 108, line 43, "cm/in" should read -- ⸢cm/in⸥ --;

Column 108, line 62, " log " should read -- ⸢log⸥ --;

Column 108, line 65, " $10^x$ " should read -- ⸢$10^x$⸥ --;

Column 109, line 7, "$\bar{x}$,s" should read -- ⸢$\bar{x}$,s⸥ --;

Column 109, line 34, "CLEAR" should read -- ⸢CLEAR⸥ --;

Column 109, line 46, " CLEAR " should read -- ⸢CLEAR⸥ --;

Column 109, line 67, " Σ- " should read -- ⸢Σ-⸥ --;

Column 110, line 17, " x,s " should read -- ⸢x,s⸥ --;

UNITED STATES PATENT AND TRADEMARK OFFICE
CERTIFICATE OF CORRECTION

PATENT NO. : 4,001,569
DATED : January 4, 1977
INVENTOR(S) : Peter D. Dickinson, et al It is certified that error appears in the above-identified patent and that said Letters Patent are hereby corrected as shown below:

Column 110, line 55, " $\boxed{X+}$ " should read -- $\boxed{\Sigma+}$ --;

Column 111, line 19, "$SIN^1$" should read -- $\boxed{SIN^1}$ --;

Column 111, line 42, " $\boxed{DEG}$ or $\boxed{RAD}$ or $\boxed{GRD}$ " should read -- $\boxed{DEG}$ or $\boxed{RAD}$ or $\boxed{GRD}$ --;

Column 111, line 55, " $\boxed{DEG}$ " should read -- $\boxed{DEG}$ --;

Column 112, line 28, " $\boxed{RAD}$ " should read -- $\boxed{RAD}$ --;

Column 112, line 39, "☐ $\boxed{GRD}$ .5 ☐ $SIN^{-1}$ " should read -- ☐ $\boxed{GRD}$ .5 ☐ $\boxed{SIN^{-1}}$ --;

Column 112, line 50, " $\rightarrow$ D.MS ." should read -- $\boxed{\rightarrow D.MS\ .}$ --;

Column 112, line 58, "D.MS $\rightarrow$ ." should read -- $\boxed{D.MS \rightarrow\ .}$ --;

Column 112, line 66, " $\rightarrow$ D.MS" should read -- $\boxed{\rightarrow D.MS}$ --;

Column 113, line 15, " $\boxed{DEG}$ " should read -- $\boxed{DEG}$ --;

Column 113, line 15, "D.MS $\rightarrow$" should read -- $\boxed{D.MS \rightarrow}$ --;

Column 113, line 17, "D.MS $\rightarrow$ " should read -- $\boxed{D.MS \rightarrow}$ --;

UNITED STATES PATENT AND TRADEMARK OFFICE
CERTIFICATE OF CORRECTION

PATENT NO. : 4,001,569
DATED : January 4, 1977
INVENTOR(S) : Peter D. Dickinson, et al It is certified that error appears in the above-identified patent and that said Letters Patent are hereby corrected as shown below:

Column 113, line 21, "→D.MS" should read --→D.MS--;

Column 113, line 33, "[DEG]" should read --[DEG]--;

Column 113, line 33, "[SIN$^{-1}$]" should read --[SIN$^{-1}$]--;

Column 113, line 35, "[→D.MS]" should read --[→D.MS]--;

Column 113, line 60, "[RAD]" should read --[RAD]--;

Column 113, line 60, "[SIN$^{-1}$]" should read --[SIN$^{-1}$]--;

Column 113, line 62, "[→D.MS]" should read --[→D.MS]--;

Column 114, line 35, "[→R]" should read --[→R]--;

Column 114, line 50, "[DEG]" should read --[DEG]--;

Column 115, line 45, "[√x]" should read --[√x]--;

Column 115, line 45, "[DMS→]" should read --[DMS→]--;

UNITED STATES PATENT AND TRADEMARK OFFICE
CERTIFICATE OF CORRECTION

PATENT NO. : 4,001,569
DATED : January 4, 1977
INVENTOR(S) : Peter D. Dickinson, et al Page 13 of 15

It is certified that error appears in the above-identified patent and that said Letters Patent are hereby corrected as shown below:

Column 115, line 66, "($\boxed{\rightarrow \text{D.MS}}$)" should read --($\boxed{\rightarrow \text{D.MS}}$)--;

Column 116, line 27, "($\bar{x}$,s)" should read --($\bar{x}$,s)--;

Column 116, line 47, "$\boxed{\log}$" should read -- $\boxed{\log}$ --;

Column 116, line 53, "$\boxed{10^x}$" should read -- $\boxed{10^x}$ --;

Column 116, line 55, "$\boxed{\rightarrow R}$" should read --$\boxed{\rightarrow R}$--;

Column 117, line 43, "SCI 3" should read -- $\boxed{\text{SCI}}$ 3 --;

Column 118, line 5, "$\boxed{y^x}$" should read -- $\boxed{y^x}$ --;

Column 118, line 5, "Y 0" should read --Y $\leq$ 0--;

Column 118, line 7, "$\boxed{\sqrt{x}}$" should read -- $\boxed{\sqrt{x}}$ --;

Column 118, line 11, " n! " should read -- $\boxed{n!}$ --;

Column 118, line 20, "$y^x$" should read -- $\boxed{y^x}$ --;

Column 118, line 24, "log" should read -- $\boxed{\log}$ --;

Column 118, line 27, "$10^x$" should read -- $\boxed{10^x}$ --;

Column 118, line 30, "SCI" should read -- $\boxed{\text{SCI}}$ --;

UNITED STATES PATENT AND TRADEMARK OFFICE
CERTIFICATE OF CORRECTION

PATENT NO. : 4,001,569
DATED : January 4, 1977
INVENTOR(S) : Peter D. Dickinson, et al It is certified that error appears in the above-identified patent and that said Letters Patent are hereby corrected as shown below:

Column 118, line 38, " $\longrightarrow$ R" should read -- $\boxed{\longrightarrow R}$ --;

Column 118, line 43, "SIN$^{-1}$" should read -- $\boxed{SIN^{-1}}$ --;

Column 118, line 46, "COS$^{-1}$" should read -- $\boxed{COS^{-1}}$ --;

Column 118, line 49, "TAN$^{-1}$" should read -- $\boxed{TAN^{-1}}$ --;

Column 118, line 52, "n!" should read -- $\boxed{n!}$ --;

Column 118, line 57, "X,s" should read -- $\boxed{X,s}$ --;

Column 118, line 61, " $\longrightarrow$ D.MS" should read -- $\boxed{\longrightarrow D.MS}$ --;

Column 118, line 65, "D.MS $\longrightarrow$ " should read -- $\boxed{D.MS \longrightarrow}$ --;

Column 118, line 68, "$\Delta$%" should read -- $\boxed{\Delta\%}$ --;

Column 119, line 7, "DEG" should read -- $\boxed{DEG}$ --;

Column 119, line 12, "RAD" should read -- $\boxed{RAD}$ --;

UNITED STATES PATENT AND TRADEMARK OFFICE
CERTIFICATE OF CORRECTION

PATENT NO. : 4,001,569

DATED : January 4, 1977

INVENTOR(S) : Peter D. Dickinson, et al

It is certified that error appears in the above-identified patent and that said Letters Patent are hereby corrected as shown below:

Column 119, line 15, "GRD" should read -- GRD --;

Column 119, line 18, "CLEAR" should read -- CLEAR --;

Column 119, line 27, "cm/in" should read -- cm/in --;

Column 119, line 29, "kg/lb" should read -- kg/lb --;

Column 119, line 31, "ltr/gal" should read -- ltr/gal --;

Column 119, line 32, "LAST X" should read -- LAST X --;

Column 119, line 34, "$\pi$" should read -- $\pi$ --; and

Column 119, line 36, "$\Sigma$-" should read -- $\Sigma$- --.

Signed and Sealed this

Third Day of July 1979

[SEAL]

Attest:

*Attesting Officer*

LUTRELLE F. PARKER
*Acting Commissioner of Patents and Trademarks*